US007786921B2

(12) United States Patent
Nitta et al.

(10) Patent No.: US 7,786,921 B2
(45) Date of Patent: *Aug. 31, 2010

(54) DATA PROCESSING METHOD, DATA PROCESSING APPARATUS, SEMICONDUCTOR DEVICE, AND ELECTRONIC APPARATUS

(75) Inventors: Yoshikazu Nitta, Tokyo (JP); Noriyuki Fukushima, Kanagawa (JP); Yoshinori Muramatsu, Kanagawa (JP); Yukihiro Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 908 days.

This patent is subject to a terminal disclaimer.

(21) Appl. No.: 11/179,772

(22) Filed: Jul. 12, 2005

(65) Prior Publication Data

US 2006/0013485 A1 Jan. 19, 2006

(30) Foreign Application Priority Data

Jul. 16, 2004 (JP) .......................... P2004-209886

(51) Int. Cl.
*H03M 1/34* (2006.01)
(52) U.S. Cl. ...................................... 341/164; 341/155
(58) Field of Classification Search ......... 341/155–165, 341/172, 110, 118–125; 382/305, 293; 348/297, 348/294, 307
See application file for complete search history.

(56) References Cited

U.S. PATENT DOCUMENTS

| 4,453,177 A | * | 6/1984 | Berger et al. ................. 348/282 |
| 5,877,715 A | * | 3/1999 | Gowda et al. ................ 341/122 |
| 5,920,274 A | | 7/1999 | Gowda et al. |
| 6,204,795 B1 | * | 3/2001 | Afghahi ........................ 341/166 |

FOREIGN PATENT DOCUMENTS

| JP | 09-200052 | 7/1997 |
| JP | 2002-534918 A | 10/2002 |
| WO | 00/41393 | 7/2003 |

OTHER PUBLICATIONS

Japanese Office Action issued on Aug. 26, 2008.

* cited by examiner

*Primary Examiner*—David L Ometz
*Assistant Examiner*—Antoinette T Spinks
(74) *Attorney, Agent, or Firm*—Sonnenschein Nath & Rosenthal LLP

(57) ABSTRACT

In a solid-state imaging device with an AD converter mounted on the same chip, to enable an efficient product-sum operation while reducing the size of the circuit scale and the number of transmission signal lines. A pixel signal during an n-row readout period is compared with a reference signal for digitizing this pixel signal, and a counting operation is performed in one of a down-counting mode and an up-counting mode while the comparison processing is being performed, and then, the count value when the comparison processing is finished is stored. Subsequently, by using the n-row counting result as the initial value, a pixel signal during an (n+1)-row readout period is compared with the reference signal for digitizing this pixel signal, and also, the counting operation is performed in one of the down-counting mode and the up-counting mode, and then, the count value when the comparison processing is finished is stored. If the count mode for the n+1 row is set to be opposite to the count mode for the n row, the count value obtained by the counting operation for the n+1 row is a subtraction result. If the count modes for the n+1 row and the n row are set to be the same, the count value obtained by the counting operation for the n+1 row is an addition result.

42 Claims, 32 Drawing Sheets

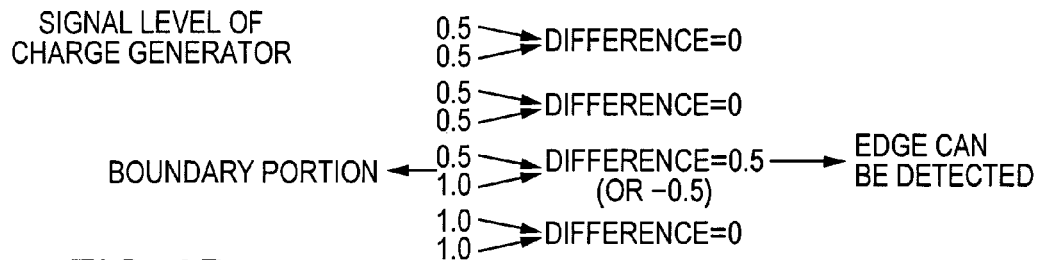
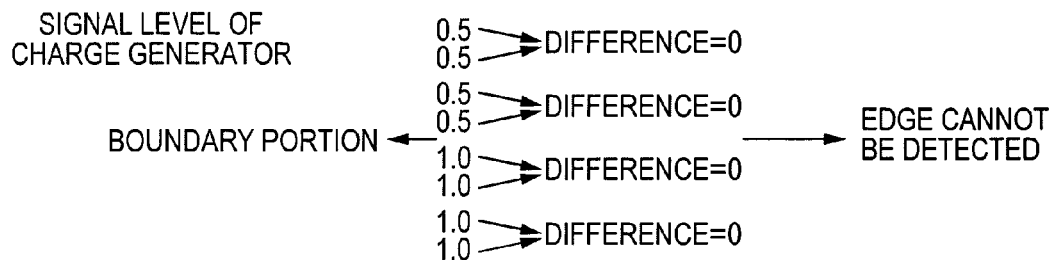
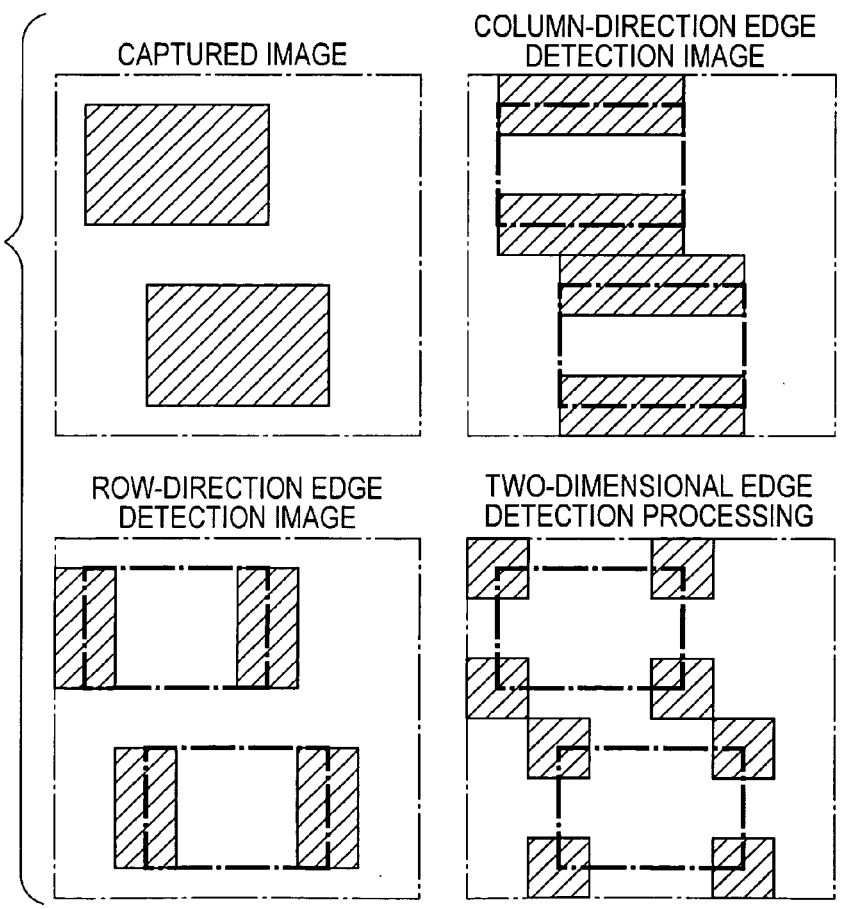

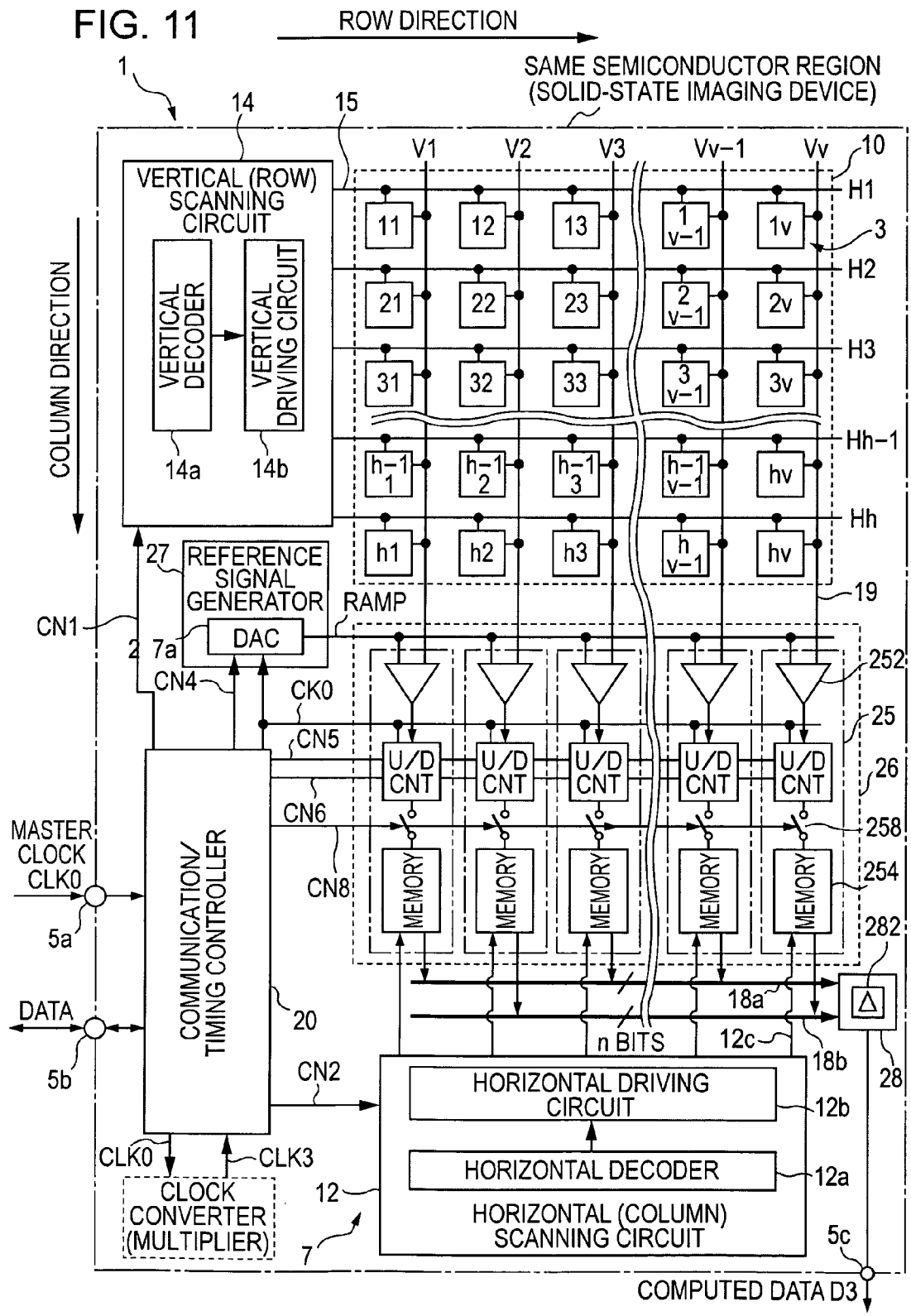

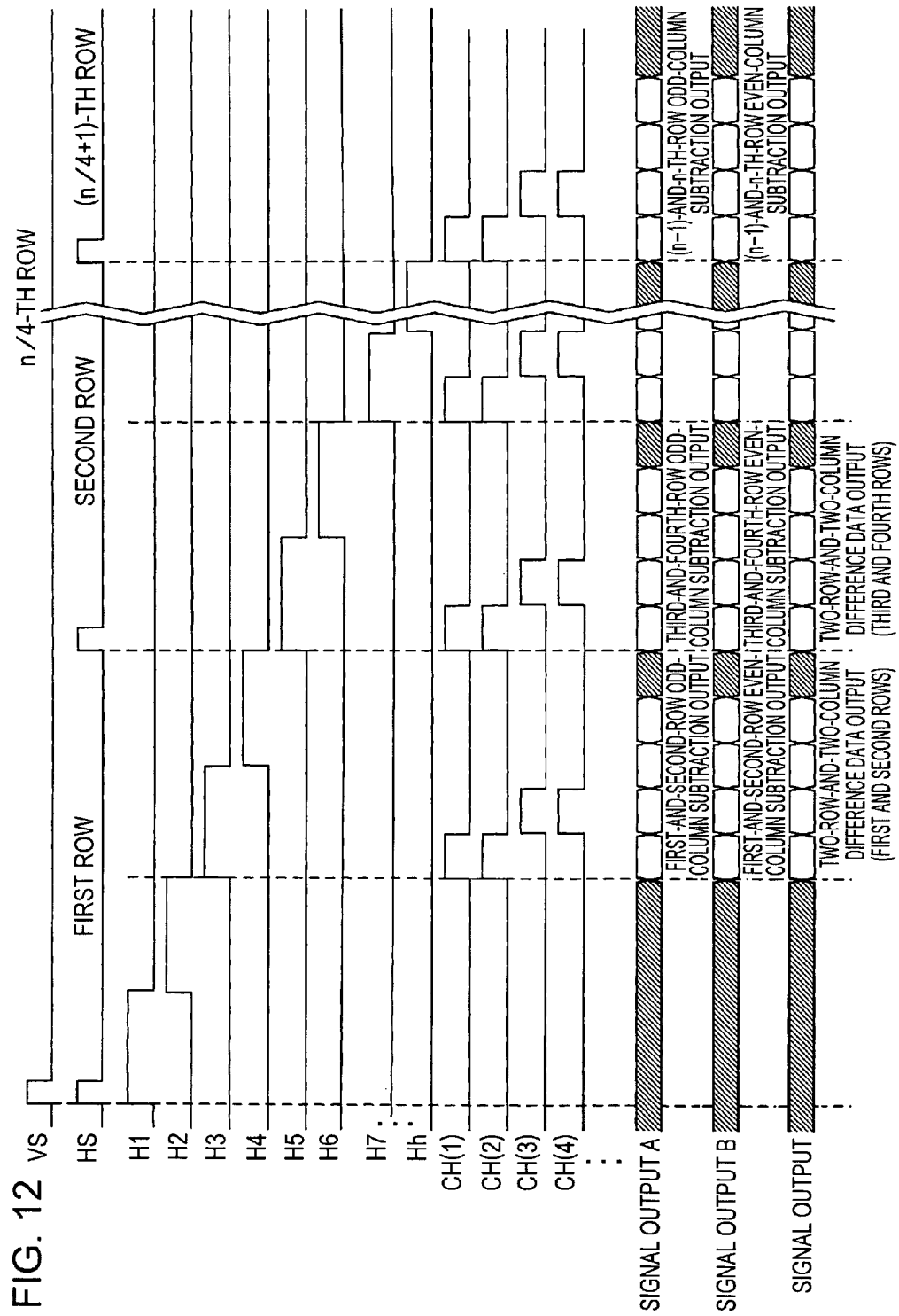

FIG. 19A
| -1/2 | 1 | -1/2 |
|---|---|---|
| -1/2 | 1 | -1/2 |
| -1/2 | 1 | -1/2 |
FIG. 19B
| -1 | 0 | 1 |
|---|---|---|
| -1 | 0 | 1 |
| -1 | 0 | 1 |
FIG. 19C
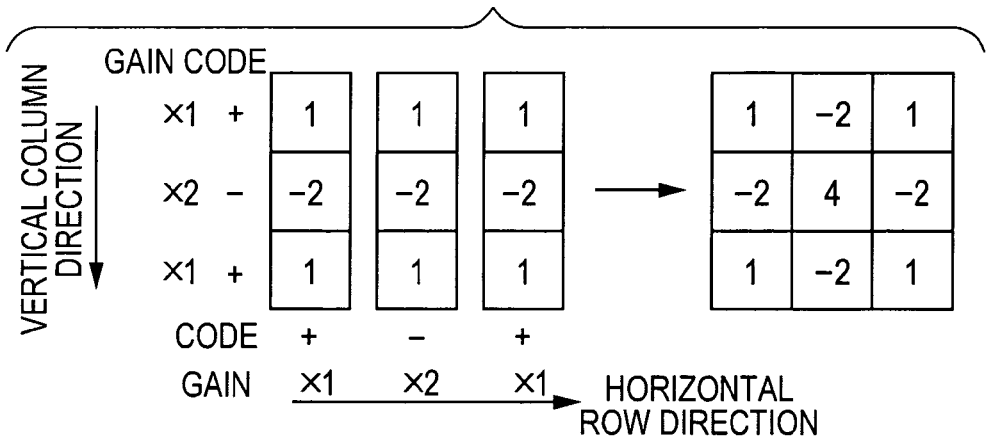
FIG. 19D
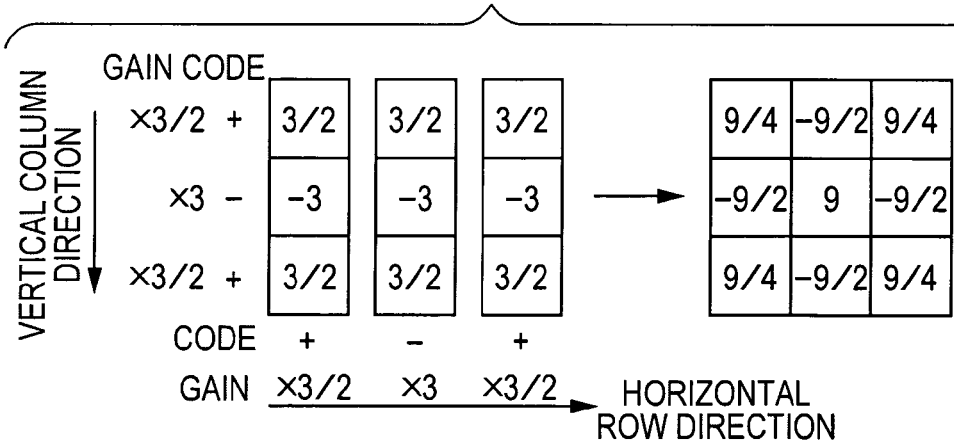
FIG. 19E
| 1/9 | 1/9 | 1/9 |
|---|---|---|
| 1/9 | 1/9 | 1/9 |
| 1/9 | 1/9 | 1/9 |
FIG. 19F
| 1 | 1 | 1 |
|---|---|---|
| 1 | 2 | 1 |
| 1 | 1 | 1 |

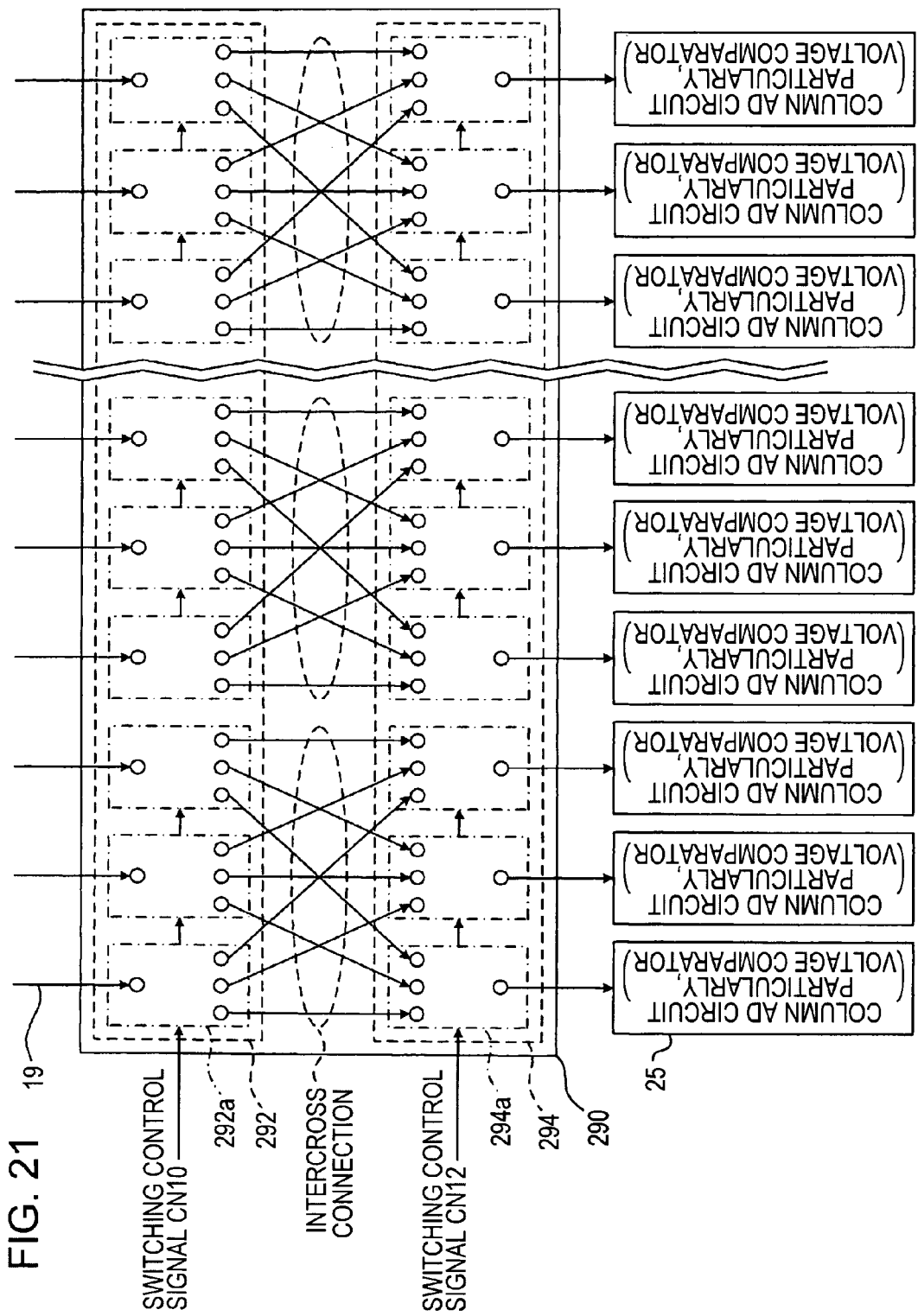

FIG. 22A
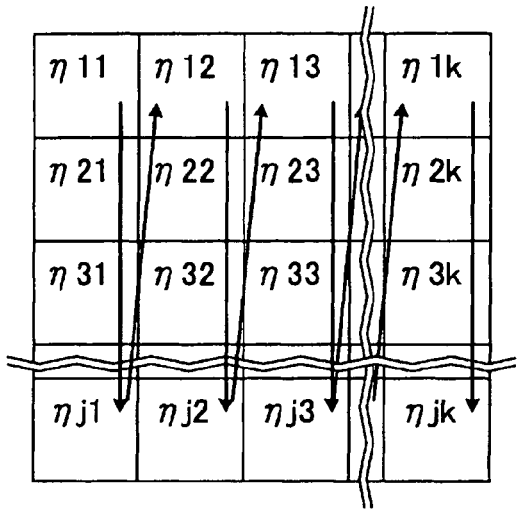
FIG. 22B
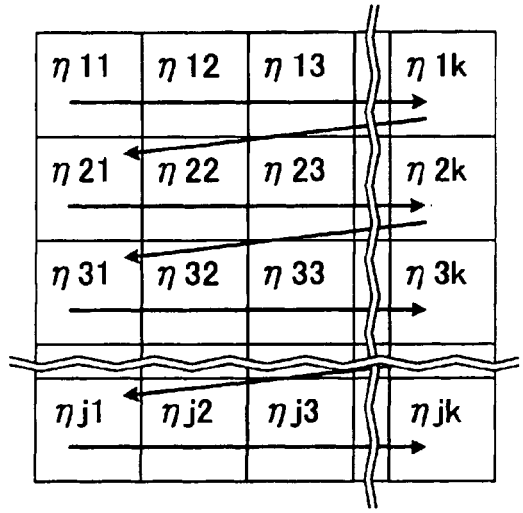
FIG. 22C
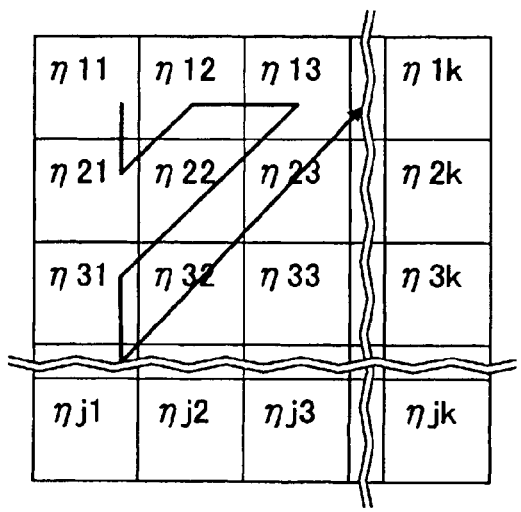
FIG. 22D
| η 11 | η 12 | η 13 |
|---|---|---|
| 5 | 5 | 5 |
| η 21 | η 22 | η 23 |
| 3 | −3 | 0 |
| η 31 | η 32 | η 33 |
| −3 | −3 | −3 |
FIG. 22E
| η 11 | η 12 | η 13 |
|---|---|---|
| −3 | 5 | 5 |
| η 21 | η 22 | η 23 |
| −3 | 0 | 5 |
| η 31 | η 32 | η 33 |
| −3 | −3 | −3 |

DATA PROCESSING METHOD, DATA PROCESSING APPARATUS, SEMICONDUCTOR DEVICE, AND ELECTRONIC APPARATUS

CROSS PREFERENCE TO RELATED APPLICATIONS

The present invention claims the benefit of Japanese Patent Application JP 2004-209886 filed in the Japanese Patent Office on Jul. 16, 2004, the entire contents of which are incorporated herein by reference.

FIELD OF THE INVENTION

The present invention relates to a data processing method, a data processing apparatus, a semiconductor device for detecting the physical quantity distribution in which a plurality of unit elements are disposed, and an electronic apparatus, for instance, a camera. More specifically, the invention relates to a digital signal processing technology suitably used for semiconductor devices for detecting the physical quantity distribution, for example, solid-state imaging devices, and other electronic apparatuses, in which a plurality of unit elements responsive to electromagnetic waves, such as light or radiation, input from an external source, are disposed, and the physical quantity distribution obtained by converting electromagnetic waves into an electric signal by the unit elements can be selectively read by address control as the electric signal. More particularly, the invention pertains to a technology for obtaining computed digital data when handling a plurality of types of signals to be processed.

BACKGROUND OF THE INVENTION

Semiconductor devices for detecting the physical quantity distribution in which a plurality of unit elements (for example, pixels) responsive to electromagnetic waves, such as light or radiation, input from an external source, are disposed in a line or a matrix are used in various fields.

In the video equipment field, CCD (Charge Coupled Device), MOS (Metal Oxide Semiconductor), or CMOS (Complementary Metal-oxide Semiconductor) solid-state imaging devices for detecting light (an example of electromagnetic waves) as the physical quantity are used. Such imaging apparatuses read the physical quantity distribution obtained by converting light into an electric signal by using the unit elements (pixels in the solid-state imaging devices) as the electric signal.

Solid-state imaging devices include amplifying solid-state imaging devices. Amplifying solid-state imaging devices have pixels formed of amplifying solid-state imaging devices (APS; Active Pixel Sensors/also referred to as "gain cells") having amplifying driving transistors in pixel signal generators for generating pixel signals according to signal charge generated in charge generators. For example, many CMOS solid-state imaging devices have such a configuration.

In this type of amplifying solid-state imaging device, to read out pixel signals to an external source, address control is performed on a pixel portion in which a plurality of unit pixels are disposed so that the signals are selectively read from the individual unit pixels. That is, the amplifying solid-state imaging device is an example of an address-control solid-state imaging device.

For example, in an amplifying solid-state imaging device, which is one type of X-Y address solid-state imaging device having unit pixels disposed in a matrix, MOS-structured active devices (MOS transistors) are used for forming the pixels so that the pixels themselves have an amplifying function. That is, signal charge (photoelectrons) stored in photodiodes, which are photoelectric conversion devices, is amplified by the active devices and the amplified signal charge is read as image information.

In this type of X-Y address solid-state imaging device, for example, many pixel transistors are disposed in a two-dimensional matrix to form a pixel portion, the accumulation of signal charge in accordance with incident light in each line (row) or each pixel is started, and current or voltage signals based on the accumulated signal charge are sequentially read from the individual pixels by addressing. In MOS (including CMOS) solid-state imaging devices, an address control method for accessing the pixels in one row at one time and reading the pixel signals from the pixel portion in units of rows is mostly used.

The analog pixel signal read from the pixel portion is converted into digital data in an analog-to-digital converter (AD converter) if necessary. Accordingly, various AD conversion mechanisms have been proposed. In some of the known mechanism, in accordance with the method for accessing the pixels in one row at one time and reading the pixel signals from the pixel portion, a so-called column parallel system in which an AD converter and a signal processor for performing signal processing other than AD conversion are disposed for each vertical column is employed.

Various types of processing are executed on pixel signals output from the pixels to generate high-quality images or to use the pixel signals for special applications. Those types of processing largely include a first processing method for processing pixel signals in an analog area and then converting the pixel signals into digital data, and a second processing method for converting the analog pixel signals into digital data and then performing computation (digital computation) on the digital data.

For example, as the first processing method, the following mechanism for detecting edges is disclosed. Currents from a plurality of pixels for detecting light are simultaneously output to an output bus and are added or subtracted on the output bus. Then, the resulting currents are converted into pulse width signals having a magnitude in the time axis, and the pulse width signals are AD-converted by counting the numbers of clocks of the pulse widths of the pulse width signals in counter circuits disposed vertically in parallel with each other, thereby converting the addition/subtraction result into digital data. Also, a mechanism for detecting a moving part by generating the difference between pixel signals obtained at different time points in an analog area and by converting the difference into digital data (for example, binary values) is disclosed.

The following mechanism is known in the related art. By using the capacity within a pixel as an inter-pixel memory, signal charge detected by a photodiode is temporarily stored in the inter-pixel memory and is then read, thereby implementing an electronic shutter.

The following mechanism is known in the related art. By using the capacity within a pixel as the inter-pixel memory, the previous frame signal is stored and is added to the current frame signal in the pixel, thereby increasing the dynamic range, performing edge processing, or detecting a moving part.

As the second processing method, a mechanism for detecting a moving part by converting a plurality of analog video signals captured at different time points into digital data is known in the related art.

In terms of the circuit arrangement for performing computation processing, a method for performing computation processing outside the device (outside the chip) (off-chip method) is known in the related art.

A method for providing various processing functions, such as an addition/subtraction function, on the image sensor (such a technique is referred to as the "on-chip method") is know in the related art. In particular, it is considered that a so-called "column parallel system" structure in which a signal processor is disposed in each vertical column for reading pixel signals from the pixel portion is suitable for the on-chip method.

However, in the above-described known mechanisms, a combination of the AD conversion and computation processing is not sufficient since it has advantages and disadvantages in terms of both the processing and the circuit arrangement. For example, the mechanism for performing addition/subtraction on signals in an analog area and then digitizing the resulting signals is not always efficient.

Additionally, some known AD conversion functions have a correlated double sampling function of removing noise components by performing subtraction processing. However, such a function merely performs difference processing between signal components and reset components in one pixel signal. That is, in this function, the difference between signal components and reset components having different physical properties in a signal output from the same unit element, such as a pixel, is obtained, and a plurality of signals, such as pixel signals, having the same physical property are not processed in this function. Accordingly, such processing is not computation performed between a plurality of pixels for generating high quality images or for using the pixel signals for special applications. To generate high quality images or to use the pixel signals for special applications, it is necessary to perform certain digital computation after AD conversion.

SUMMARY OF THE INVENTION

According to a data processing method of the present invention, there is provided a data processing method for obtaining digital data for a plurality of signals to be processed, comprising: comparing, by using digital data for a first signal of the plurality of signals, an electric signal corresponding to a second signal of the plurality of signals with a reference signal; obtaining digital data for the second signal based on the comparing step; performing a counting operation in one of a down-counting mode and an up-counting mode while the comparing step is being performed; and storing a first count value.

According to a data processing apparatus of the present invention, there is provided a data processing apparatus, comprising: a comparator which compares an electric signal corresponding to one of the plurality of signals with a reference signal; and a counter which performs a counting operation in one of a down-counting mode and an up-counting mode while the comparison processing by the comparator is being performed, and for stores a count value when the comparison processing by the comparator is finished, wherein a plurality of image signals are processed to get one digital signal.

According to a semiconductor device of the present invention, there is provided a semiconductor device comprising: unit elements, each of which includes a charge generator for generating charge corresponding to applied electromagnetic waves and a unit signal generator for generating an analog unit signal in accordance with the charge generated by the charge generator, a comparator which compares an electric signal corresponding to the unit signal with a reference signal for converting the electric signal of the unit signal into the digital data, and a counter which performs a counting operation in one of a down-counting mode and an up-counting mode while the comparison processing by the comparator is being performed, and stores a count value when the comparison processing by the comparator is finished, wherein a plurality of image signals are processed to get one digital signal.

According to an electric apparatus of the present invention, there is provided an electronic apparatus comprising: a reference signal generator which generates a reference signal for converting an analog signal to be processed into digital data; a comparator which compares the analog signal with the reference signal generated by the reference signal generator; a counter which performs a counting operation in one of a down-counting mode and an up-counting mode while the comparison processing by the comparator is being performed, and which stores a count value when the comparison processing by the comparator is finished; and a controller which controls the mode of the counting operation by the counter, wherein a plurality of image signals are processed to get one digital signal For performing the comparison processing, an electric signal corresponding to a signal to be processed may be compared with a reference signal that is changed at a predetermined gradient, and the point at which the electric signal coincides with the reference signal may be searched. The counting operation may be performed by counting with a count clock from the time at which the reference signal used for the comparison processing is generated to the time at which the electric signal coincides with the reference signal, thereby obtaining the count value corresponding to the level of the signal to be processed. By adjusting the amount by which the reference signal is changed over time, the coefficient for the signals to be processed in the product-sum operation may be set.

The digital data for one of the signals used as the initial value may have been digitized by a mechanism (system) different from the mechanism of the present invention. Alternatively, an electric signal corresponding to the signal used for the initial value may be compared with a reference signal for obtaining this signal (may be different from the reference signal used for the other signal). Then, simultaneously with the comparison processing, the counting operation may be performed in one of the down-counting mode and the up-counting mode, and the count value when the comparison processing is finished is stored, thereby obtaining the digital data for the signal used for the initial value.

The product-sum operation includes, not only addition processing for the sum or subtraction processing for the difference by using the same absolute values of the coefficients of the signals to be processed, but also processing for the sum or the difference by using different absolute values of the coefficients of the signals to be processed. "A plurality of" means at least two, and the product-sum operation may be sequentially performed for 3, 4, or greater number of signals to be processed.

BRIEF DESCRIPTION OF THE DRAWINGS

FIGS. 8A, 8B, and 8C illustrate first examples (edge detection) of usage modes of the spatial difference processing in the configuration of the first or second embodiment.

FIG. 11 is a schematic diagram illustrating a CMOS solid-state imaging device according to a third embodiment of the present invention.

FIG. 12 is a timing chart illustrating the spatial difference processing in the column AD circuit of the solid-state imaging device of the third embodiment.

FIGS. 19A through 19F illustrate usage modes of the spatial difference processing in the configuration of the fifth embodiment.

FIG. 21 illustrates an example of the configuration of a column selection processor used in the solid-state imaging device of the sixth embodiment.

FIGS. 22A through 22E illustrate usage modes of the spatial difference processing in the configuration of the sixth embodiment.

DESCRIPTION OF THE PREFERRED EMBODIMENTS

Embodiments of the present invention are described in detail below with reference to the drawings. In the following description, CMOS imaging devices, which are one type of X-Y address solid-state imaging devices, are used. It should be assumed that all the CMOS imaging devices are NMOS or PMOS.

However, the use of CMOS imaging devices is an example only, and devices used in the present invention are not restricted to MOS imaging devices. The following embodiments can be similarly applied to all semiconductor devices for detecting the physical quantity distribution, in which a plurality of unit elements responsive to electromagnetic waves, such as light or radiation, input from an externally source, are disposed in a line or matrix.

FIRST EMBODIMENT

Configuration of Solid-State Imaging Device

Figure 1:
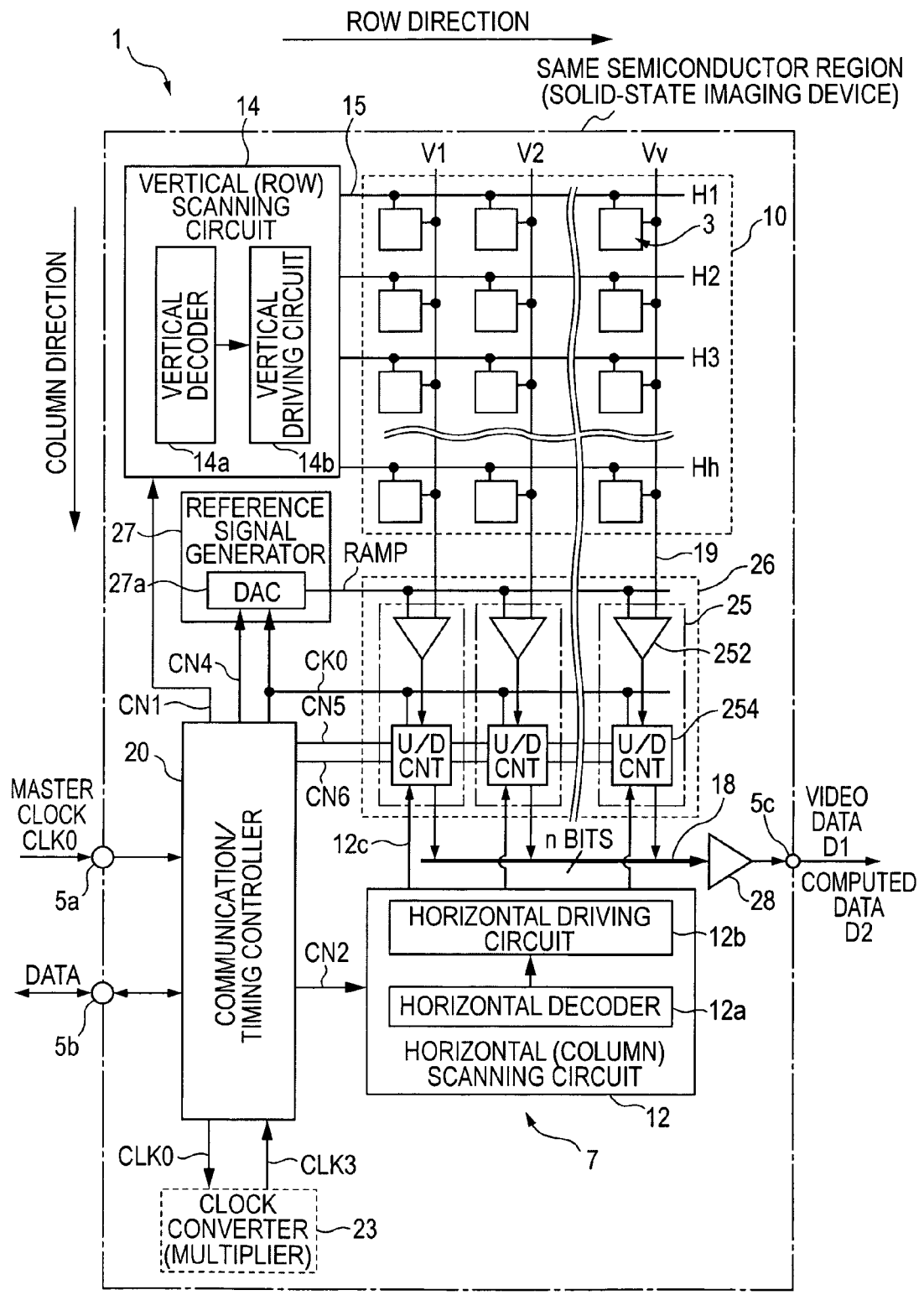
FIG. 1 is a schematic diagram illustrating a CMOS solid-state imaging device, which is a first embodiment of a semiconductor device of the present invention.

FIG. 1 is a schematic diagram illustrating a CMOS solid-state imaging device (CMOS image sensor), which is a first embodiment of the semiconductor device of the present invention. The CMOS solid-state imaging device is also one aspect of an electronic apparatus according to the present invention.

A solid-state imaging device 1 includes a pixel portion in which a plurality of pixels including photoelectric conversion devices (one example of a charge generator), such as photodiodes, for outputting an electric signal in accordance with the quantity of incident light are disposed in rows and columns (i.e., in a two-dimensional matrix), a signal output from each pixel being a voltage signal. Data processors, such as CDS (Correlated Double Sampling) processing functions and digital converters (ADC; Analog Digital Converters), are disposed in the individual columns in parallel with each other.

This means that a plurality of CDS processing functions and digital converters are provided for vertical signal lines 19 in vertical columns substantially in parallel with each other. When viewing the device from the top, a plurality of functions may be disposed only at one edge (the output side at the bottom in FIG. 1) with respect to the pixel portion 10, or may be disposed at one edge and the other edge (at the top in FIG.

1) across the pixel portion 10. If the second type of configuration is used, it is preferable that horizontal scanners for performing readout-scanning (horizontal scanning) in the row direction be disposed at both edges and independently operated.

A typical example in which CDS processing functions and digital converters are provided vertically in parallel with each other is a column-type imaging sensor. In this type of imaging sensor, CDS processing functions and digital converters are disposed vertically in parallel with each other in a column area disposed at the output side of the imaging portion, and signals are sequentially read out to the output side. Alternatively, the imaging portion having another form may be used. For example, one CDS processing function and one digital converter may be assigned to a plurality of (for example, two) adjacent vertical signal lines 19, or one CDS processing function and one digital converter may be assigned to N vertical signal lines 19 (vertical columns) in N other lines (N is a positive integer).

In any of the forms other than the column type, since one CDS processing function and one digital converter are used for a plurality of vertical signal lines 19 (vertical columns), a switch circuit (switch) is provided for supplying pixel signals for a plurality of columns of signal lines 19 from a pixel portion 10 to one CDS processing function or one digital converter. A memory for storing output signals may be required depending on the processing of the subsequent stage.

By assigning one CDS processing function and one digital converter to a plurality of vertical signal lines 19 (vertical columns), signal processing can be performed on pixel signals after being read from the pixel columns. Accordingly, compared to when similar image processing is performed on a pixel signal in each unit pixel, the configuration of each unit pixel can be simplified, and a multi-pixel, smaller, and less expensive image sensor can be implemented.

Additionally, a plurality of signal processors disposed vertically in parallel with each other can simultaneously process one row of pixel signals. Accordingly, compared to when processing is performed by one CDS processing function and one digital converter in an output circuit or outside the device, the signal processors can be operated at a lower speed, which is more advantageous in terms of the power consumption, the band performance, and noise. In other words, when the power consumption and the band performance are the same, a higher operation in the overall sensor can be implemented.

The column-type imaging sensor, which can operate at a lower speed, is advantageous in terms of the power consumption, the band performance, or noise, and is also advantageous in that a switch circuit (switch) is not required. In the following embodiments, it should be assumed that the column-type imaging sensor is used unless otherwise stated.

The solid-state imaging device 1 of the first embodiment includes, as shown in FIG. 1, the pixel portion (imaging portion) 10 in which a plurality of square unit pixels 3 are disposed in rows and columns (i.e., in a square lattice), a driving controller 7, a column processor 26, a reference signal generator 27 for supplying an AD-conversion reference signal to the column processor 26, and an output circuit 28 which are disposed outside the pixel portion 10.

If necessary, before or after the column processor 26, an AGC (Auto Gain Control) circuit having a signal amplifying function may be disposed in the same semiconductor region in which the column processor 26 is disposed. If AGC is performed before the column processor 26, analog amplification is conducted, and if AGC is performed after the column processor 26, digital amplification is conducted. If n-bit digital data is directly amplified, the grayscale may be impaired. It is thus preferable that analog amplification is conducted on a signal before performing digital conversion.

The driving controller 7 is provided with control circuit functions of sequentially reading signals from the pixel portion 10. For example, the driving controller 7 includes the horizontal scanning circuit (column scanning circuit) 12 for controlling column addressing or column scanning, a vertical scanning circuit 14 (row scanning circuit) for controlling row addressing and row scanning, and a communication/timing controller 20 having a function of, for example, generating an internal clock.

As indicated by the broken lines in the vicinity of the communication/timing controller 20, as an example of a high-speed clock generator, a clock converter 23 for generating pulses having a clock frequency higher than an input clock frequency may be disposed. The communication/timing controller 20 generates the internal clock based on an input clock (master clock) CLK0 input via a terminal 5a and a high-speed clock generated in the clock converter 23.

By using a signal based on the high-speed clock generated in the clock converter 23, AD conversion processing can be operated at a high speed. By using the high-speed clock, motion extraction or compression processing requiring fast calculations can be performed. Additionally, parallel data output from the column processor 26 can be converted into serial data so that video data D1 is output to the outside the apparatus 1. With this configuration, the fast operation can be implemented with the number of terminals smaller than the number of bits of AD-converted digital data.

The clock converter 23 has a built-in multiplier circuit for generating pulses having a clock frequency higher than the input clock frequency. This clock converter 23 receives a low-speed clock CLK2 from the communication/timing controller 20, and generates a clock having a frequency at least twice as high as the low-speed clock CLK2 based on the low-speed clock CLK2. As the multiplier circuit of the clock converter 23, a k1 multiplier circuit can be provided when k1 is the factor of the frequency of the low-speed clock CLK2, and various known circuits can be used.

Although some of the rows and columns are not shown in FIG. 1 for simple representation, in actuality, several tens of to several thousands pixel units 3 are disposed in each row or each column. Typically, the pixel unit 3 is formed of a photodiode as a light-receiving device (charge generator) and an inter-pixel amplifier having an amplifying semiconductor device (for example, a transistor).

As the inter-pixel amplifier, for example, a floating diffusion amplifier can be used. For example, for the charge generator, an inter-pixel amplifier having four transistors, which are generally used in a CMOS sensor, such as a readout selection transistor, which is an example of a charge reader (transfer gate/readout gate), a reset transistor, which is an example of a reset gate, a vertical selecting transistor, and a source-follower amplifying transistor, which is an example of a detector device for detecting a change in the potential of the floating diffusion, can be used.

Alternatively, as disclosed in U.S. Pat. No. 2,708,455, an inter-pixel amplifier having three transistors, such as an amplifying transistor connected to a drain line (DRN) so as to amplify a signal voltage in accordance with signal charge generated by the charge generator, a reset transistor for resetting the charge generator, and a readout selection transistor (transfer gate) which is scanned by a vertical shift register via a transfer line (TRF), may be used.

As the other elements forming the driving controller 7, the horizontal scanning circuit 12, the vertical scanning circuit 14, and the communication/timing controller 20 are disposed.

The horizontal scanning circuit 12 has a readout scanning function of reading count values from the column processor 26. Those elements forming the driving controller 7 are integrally formed, with the pixel portion 10, on a semiconductor region, such as a monocrystal silicon, by using a technique similar to a semiconductor integrated circuit manufacturing technique, thereby forming a solid-state imaging device (imaging apparatus), which is an example of a semiconductor system.

The pixel units 3 are connected to the vertical scanning circuit 14 via row control lines 15 for selecting rows and are also connected via the vertical signal lines 19 to the column processor 26 in which a column AD circuit 25 is provided for each vertical column. The row control lines 15 represent the overall wiring from the vertical scanning circuit 14 to the pixels.

In this embodiment, the column AD circuit 25 has a data processing function of obtaining digital data by itself, which is a product-sum operation result of a plurality of signals.

Each of the horizontal scanning circuit 12 and the vertical scanning circuit 14 has a decoder, which is described below, and starts reading pixel signals to be processed in response to control signals CN1 and CN2 supplied from the communication/timing controller 20. Accordingly, various pulse signals (for example, a reset pulse RST, a transfer pulse TRF, and a DRN control pulse DRN) for driving the unit pixels 3 are contained in the row control lines 15.

The vertical scanning circuit 14 and the communication/timing controller 20 form a unit signal selection controller that specifies the positions of a plurality of unit pixels 3 subjected to product-sum operation processing to input a plurality of pixel signals into the column processor 26 from the specified unit pixels 3.

Although it is not shown, the communication/timing controller 20 has a functional block of a timing generator TG (an example of a readout address control device) for supplying clocks required for the operations of the individual elements and predetermined-timing pulse signals and a functional block of a communication interface for receiving the master clock CKL0 via the terminal 5a and receiving data DATA indicating the operation mode via a terminal 5b and also for outputting data containing information concerning the solid-state imaging device 1.

For example, the communication/timing controller 20 outputs a horizontal address signal to a horizontal decoder 12a and a vertical address signal to a vertical decoder 14a, and each decoder 12a or 14a receives the corresponding address signal to select the corresponding column or row.

In this case, since the pixel units 3 are disposed in a two-dimensional matrix, fast reading of the pixel signals and pixel data is preferably performed in the following manner. Vertical scanning is performed such that analog pixel signals generated by pixel signal generators 5 and output in the column direction via the vertical signal lines 19 are accessed and read in units of rows, and then, horizontal scanning is performed such that pixel signals (in this embodiment, digital pixel data) are accessed in the row direction and are read out to the output side. The reading of the pixel signals and pixel data is not restricted to scanning, and random access may be performed by directly addressing the unit pixels 3 to be read out and by reading information only concerning the required unit pixels 3.

The communication/timing controller 20 in the first embodiment supplies a clock CLK1 having the same frequency as the master clock CLK0 input via the terminal 5a and a low-speed clock which is scaled down to a half of the clock CLK1 or lower to the elements, such as the horizontal scanning circuit 12, the vertical scanning circuit 14, and the column processor 26. The clocks scaled down to a half of the master clock or lower are hereinafter referred to as the "low-speed clock CLK2".

The vertical scanning circuit 14 selects rows of the pixel portion 10 and supplies required pulses to the selected rows. For example, the vertical scanning circuit 14 includes the vertical decoder 14a for defining rows of the pixel portion 10 to be read and a vertical driving circuit 14b for driving the read rows by supplying pulses to the row control lines 15 corresponding to the unit pixels 3 at the readout addresses (rows) defined by the vertical decoder 14a. The vertical decoder 14a selects, not only rows from which signals are read out, but also a row used for an electronic shutter.

The horizontal scanning circuit 12 sequentially selects the column AD circuits 25 of the column processor 26 in synchronization with the low-speed clock CLK2, and outputs the corresponding signals to a horizontal signal line (horizontal output line) 18. The horizontal scanning circuit 12 includes the horizontal decoder 12a for defining columns to be read (column AD circuits 25 within the column processor 26) and a horizontal driving circuit 12b for outputting the signals of the column processor 26 to the horizontal signal line 18 according to the readout addresses defined by the horizontal decoder 12a. If the number of bits handled by the column AD circuits 25 is n (n is a positive integer), for example, 10 (=n) bits, the horizontal signal line 18 includes 10 lines.

In the solid-state imaging device 1 configured as described above, the pixel signals output from the unit pixels 3 of each vertical column are supplied via the vertical signal line 19 to the corresponding column AD circuits 25 of the column processor 26.

On the signal path between the column processor 26 and the horizontal scanning circuit 12, a load transistor portion containing load MOS transistors (not shown) whose drain terminals are connected to the corresponding vertical signal lines 19 is disposed, and a load controller (load MOS controller) for controlling the driving of the load MOS transistors is provided.

The amplifying transistor forming the pixel unit 3 is connected to the corresponding vertical signal line 19, and the vertical signal line 19 is connected to the drain of the load MOS transistor in each vertical column, and a load control signal CTld from the load controller is input into the gate terminals of all the load MOS transistors. When the signals are read out, a predetermined constant current continues to flow by the load MOS transistors connected to the corresponding amplifying transistors.

Each column AD circuit 25 of the column processor 26 receives pixel signals for one column and converts them into digital data. The column AD circuit 25 also sequentially receives a plurality of pixel signals to be subjected to a product-sum operation (which are not necessarily in the same vertical column) at the pixel positions designated by the unit signal selection controller, which functions by the operations of the communication/timing generator 20 and the vertical scanning circuit 14, and performs a product-sum operation based on the plurality of pixel signals. The column AD circuit 25 also converts the resulting value into digital data. Each column AD circuit 25 has, for example, an ADC (Analog Digital Converter) circuit having an operation function for performing a product-sum operation and for converting an analog signal into, for example, 10-bit digital data, based on the low-speed clock CLK2.

Details of the configuration of the ADC circuit are given below. AD conversion is performed as follows. A ramp reference signal (reference voltage) RAMP is supplied to a comparator (voltage comparator), and at the same time, counting with a clock signal is started. Counting is continued until a pulse signal is obtained by comparing an analog pixel signal input via the vertical signal line 19 with the reference signal RAMP.

In this case, by modifying the circuit configuration, in addition to AD conversion, for a voltage-mode pixel signal input via the vertical signal line 19, the difference between the signal level (noise level) immediately after resetting the pixels and the true signal level Vsig based on the quantity of the received light can be taken. With this arrangement, noise signal components, such as fixed pattern noise (FPN) or reset noise, can be eliminated.

The pixel data digitized in the column AD circuit 25 is transferred to the horizontal signal line 18 via a horizontal select switch (not shown) driven by a horizontal selection signal supplied from the horizontal scanning circuit 12, and is output to the output circuit 28. The 10-bit digital data is an example only, and the number of bits may be smaller than 10 (for example, 8 bits) or larger than 10 (for example, 14 bits).

With the above-described configuration, from the pixel portion 10 in which light-receiving devices as the charge generators are disposed in rows and columns, pixel signals are sequentially output from the individual columns. Then, one image corresponding to the pixel portion 10 in which light-receiving devices (photoelectric conversion devices, such as photodiodes) are disposed in rows and columns, i.e., a frame image, is represented by a set of pixel signals of the overall pixel portion 10.

Details of Column AD Circuit and Reference Signal Generator

The reference signal generator 27 includes a DA conversion circuit (DAC; Digital Analog Converter) 27a. The DA conversion circuit 27a generates a stepped-ramp saw tooth wave (ramp waveform) from the initial value represented by control data CN4 supplied from the communication/timing controller 20 in synchronization with a count clock CK0, and supplies the generated saw tooth wave to the individual column AD circuits 25 of the column processor 26 as the AD conversion reference signal (ADC reference signal) RAMP. A noise-suppressing filter may be disposed, though it is not shown in FIG. 1.

A stepped-ramp saw tooth wave generated based on a high-speed clock supplied from the clock converter 23, for example, a multiplied clock generated in a multiplier circuit, can be changed at a higher speed than when the saw tooth wave is generated based on the master clock CLK0 input via the terminal 5a.

The control data CN4 supplied from the communication/timing controller 20 to the DA conversion circuit 27a of the reference signal generator 27 contains information indicating the gradient (the degree by which the voltage is changed; the amount by which the voltage is changed with respect to the time) of the ramp voltage for each comparison processing. More specifically, the amount by which the voltage is changed for each counting operation is set, and the count value is changed per unit time (count clock CK0).

For the signal difference processing to determine the difference between the reference signal level and the true signal component level of the same pixel signal to be processed, it is preferable that the levels of the absolute values of the gradients (rate of change) of the ramp voltages used for comparison processing be set to be the same.

If the spatial difference processing or the temporal difference processing for the signal difference processing is performed on a plurality of signals (in this embodiment, pixel signals) to be processed, the levels of the absolute values of the gradients (rates of change) of the ramp voltages for the processing subject signals may be set to be the same or may be set to be different.

By setting the levels of the absolute values of the gradient (rate of change) to be different, the function of finding the sum (with a sign) of the pixel signals (more specifically, true signal components) supplied from the unit pixels 3 after being multiplied with the coefficient, i.e., the product-sum operation, can be implemented. In this case, if the spatial difference processing or the temporal difference processing is performed on three or more pixel signals, the number of pixels to be compared with the ramp voltage having the same absolute value of the gradient (rate of change) and the number of pixels to be compared with the ramp voltage having different absolute values of the gradients may be selected in a desired manner.

The column AD circuit 25 includes the voltage comparator 252 for comparing the reference signal RAMP generated in the DA conversion circuit 27a of the reference signal generator 27 with an analog pixel signal supplied from the unit pixels 3 of the row control lines 15 (H0, H1, . . . ) via the vertical signal line 19 (V0, V1, . . . ). The column AD circuit 25 also includes the counter 254 for counting the time until the voltage comparator 252 finishes the comparison processing and for storing the counting result. That is, the column AD circuit 25 has an n-bit AD conversion function.

The communication/timing controller 20 has a function of controlling the count mode to be used in the counter 254 according to whether the reset component $\Delta V$ or the signal component Vsig of the pixel signal is used for comparison processing in the voltage comparator 252. A mode control signal CN5 for designating whether the counter 254 is operated in a down-counting mode or an up-counting mode and a reset control signal CN6 for resetting the count value stored in the counter 254 to the initial value are input from the communication/timing generator 20 into the counter 254 of each column AD circuit 25.

The stepped-ramp reference signal RAMP generated in the reference signal generator 27 is input into one input terminal RAMP of each of the voltage comparators 252, and the other input terminals of the voltage comparators 252 are connected to the corresponding vertical signal lines 19 and receive the pixel signal voltages from the pixel portion 10. The output signals from the voltage comparators 252 are supplied to the corresponding counters 254.

The count clock CK0 is input from the communication/timing controller 20 to the clock terminals CK of the counters 254.

Although the configuration of the counter 254 is not shown, the counter 254 can be implemented by changing the wiring arrangement of a data storage unit 255 formed of latches into a synchronous counter, and the internal counting is performed by receiving one count clock CK0. As in the stepped voltage waveform, the count clock CK0 can also be generated based on a high-speed clock (for example, a multiplied clock) from the clock converter 23 so that it is operated faster than the master clock CLK0 input via the terminal 5a.

The n-bit counter 254 can be implemented by a combination of n latches, and the circuit scale can be reduced to one half of the circuit scale of the data storage unit 255 formed of two blocks, each having n latches. Additionally, the provision of a counter 24 is not necessary, and the overall configuration relatively becomes small.

Although details of the configuration of the counters 254 of the first embodiment are given below, the main feature of the counters 254 is as follows. By the use of the common up/down counter (U/D CNT) regardless of the count mode, counting can be performed on the same pixel signal or a plurality of pixel signals having the same physical properties by switching between the down-counting operation and the up-counting operation.

The counters 254 are configured so that they can detect the overflow of counting or process the positive and negative signs (+/−). For example, by using known art, for example, by adding an overflow surplus bit or using a carry bit or a borrow bit, the overflow or sign processing can be easily handled.

A pixel signal output from the unit pixel 3 contains, not only true, effective signal components, but also reset components. Time-sequentially, the reset components (reference components) first appear, followed by the true, effective signal components superposed on the reset components. The difference between the reset components and the true, effective signal components superposed on the reset components is the true, effective signal components.

Accordingly, to obtain digital data of the true, effective signal components Vsig for a pixel signal, when conducting AD conversion on the same pixel signal Vx by performing counting on the reference components (reset components ΔV) and the true signal components, digital data obtained for one of the reference components and the true signal components (generally, the reset components) is used as the initial value for the counting operation on the other components (generally, the signal components). With this arrangement, after conducting AD conversion by the counting operation on the other components, digital data, which is the difference between the two components, can be automatically obtained. That is, the difference between the reference components and the signal components of an analog signal can be converted into digital data.

Additionally, the counting operation is repeatedly performed on a plurality of different pixel signals (for example, pixel signals having different pixel positions or pixel signals which are the same in the pixel position and are different in the imaging time) having the same physical properties by the same combination of the count modes, thereby implementing the addition operation for a plurality of pixel signals. The counting operation is repeatedly performed on the plurality of different pixel signals by changing the combination of the count modes (more specifically, by reversing the combination), thereby implementing the difference (subtraction) operation for a plurality of pixel signals. The switching of the operation processing modes can be implemented by adjusting the scanning patterns of the horizontal scanning circuit 12 and the vertical scanning circuit 14 under the control of the communication/timing controller 20.

For example, in the counter 254, when conducting AD conversion by performing the counting operation for each of the pixel signals of the plurality of unit pixels 3, digital data obtained for one of the pixel signals is used as the initial value for the counting operation for the other pixel signal (the signal to be subjected to the second counting operation). As a result, after conducting AD conversion by performing the counting operation for the other pixel signal, digital data as a result of performing the product-sum operation for the two pixel signals can be automatically obtained.

In this case, by the use of the same count modes, the resulting count value obtained by the second counting operation is digital data as a result of adding the pixel signals (more specifically, the true signal components) of the plurality of unit pixels 3. In contrast, by the use of different count modes (opposite modes), the count value obtained by the second counting operation is digital data as a result of performing subtraction on the pixel signals of the plurality of pixel signals 3. If three or more pixels are processed, the above-described operations may be combined, in which case, the function of finding the sum with a sign for the pixel signals (more specifically, the true signal components) from the unit pixels 3, i.e., the product-sum operation, can be implemented.

As the counter 254 of the first embodiment, a synchronous counter for outputting count output values in synchronization with the count clock CK0 is used. In the case of the synchronous counter, the operations of all the flip-flops (counter basic elements) are restricted by the count clock CK0. Thus, if a higher frequency operation is required, the use of an asynchronous counter suitable for the fast operation is preferable since the operation limit frequency is determined only by the limit frequency of the first flip-flop (counter basic element).

A control pulse is input from the horizontal scanning circuit 12 into the counter 254 via a control signal 12c. The counter 254 has a latch function of latching a counting result, and latches the counter output value until the control pulse is received via the control line 12c.

The column AD circuit 25 configured as described above is disposed for each vertical signal line 19 (V0, V1, . . . ) to form the column processor 26, which is a column-parallel structured ADC block.

The output sides of the column AD circuits 25 are connected to the horizontal signal line 18. As described above, the horizontal signal line 18 includes the same n number of signal lines as the n-bit column AD circuit 25, and the signal lines are connected to the output circuit 28 via n sensing circuits (not shown) corresponding to output lines.

With this configuration, during the pixel signal readout period, the column AD circuit 25 performs a counting operation and outputs the counting result at a predetermined timing. More specifically, the voltage comparator 252 first compares the ramp waveform voltage from the reference signal generator 27 with the pixel signal voltage input via the vertical signal line 19, and when the two voltages become equal to each other, the comparator output of the voltage comparator 252 is inverted (in this embodiment, from the H level to the L level).

The counter 254 has already started the counting operation in the down-counting mode or the up-counting mode in synchronization with the ramp waveform voltage input from the reference signal generator 27, and when receiving information indicating that the comparator output is inverted, the counter 254 stops the counting operation and latches (stores) the count value as pixel data, thereby completing AD conversion.

Thereafter, the counter 254 sequentially outputs the stored pixel data to the outside the column processor 26 or the outside the chip having the pixel portion 10 via an output terminal 5c based on the shift operation of horizontal selecting signals CH(i) input from the horizontal scanning circuit 12 via the control line 12c at a predetermined timing.

Other various signal processing circuits may be contained in the elements forming the solid-state imaging device 1, though they are not shown since they are not directly related to this embodiment.

FIRST EMBODIMENT

Signal Difference Processing Operation

Figure 2:
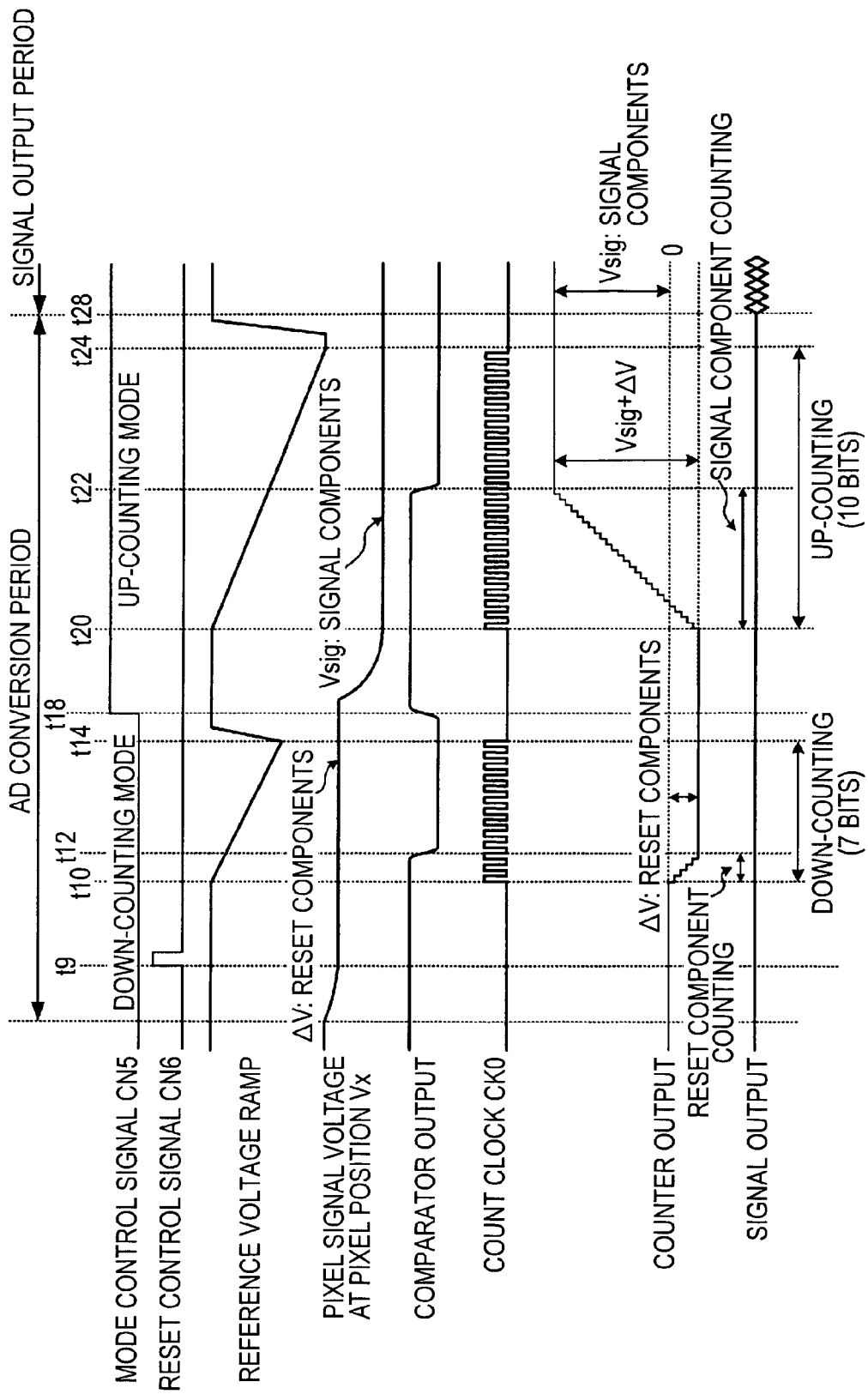
FIG. 2 is a timing chart illustrating the basic operation in column AD circuits of the solid-state imaging device of the first embodiment shown in FIG. 1.

FIG. 2 is a timing chart illustrating the signal difference processing, which is the basic operation, in the column AD circuit 25 of the solid-state imaging device 1 of the first embodiment shown in FIG. 1.

The mechanism for converting an analog pixel signal sensed in each pixel unit 3 of the pixel portion 10 into a digital signal is, for example, as follows. The time when the ramp waveform reference signal RAMP which is progressively reduced with a predetermined gradient becomes equal to the voltage of the reference components or the signal components of the pixel signal of the unit pixel 3 is searched, and the time from when the reference signal RAMP used for comparison processing is generated until when the electric signal corresponding to the reference components or the signal components of the pixel signal coincides with the reference signal is counted by the count clock, thereby obtaining the count value associated with the level of the reference components or the signal components.

For the pixel signal output from the vertical signal line 19, time-sequentially, the signal components Vsig appear after the reset components ΔV, i.e., the reference components, containing noise of the pixel signal. If the first operation is performed on the reference components (reset components ΔV), the second operation is performed on the signal obtained by adding the signal components Vsig to the reference components (reset components ΔV). This operation is specifically discussed below.

For the first readout operation, the communication/timing controller 20 sets the mode control signal CN5 to the low level so that the counter 254 is set to be in the down-counting mode, and also sets the reset control signal CN6 to be active (in this embodiment, the high level) for a predetermined period so that the count value of the counter 254 is reset to the initial value 0 (t9). After the first readout operation for reading the pixel signals from selected rows Hx to the vertical signal line 19 (V0, V1, . . . ) is stabilized, the communication/timing controller 20 supplies the control data CN4 for generating the reference signal RAMP to the reference signal generator 27.

Upon receiving the control data CN4, the reference signal generator 27 outputs the stepped waveform (RAMP waveform) which is changed in the shape of a saw tooth wave (RAMP) over time to one input terminal RAMP of the voltage comparator 252 as the comparison voltage. The voltage comparator 252 compares the RAMP waveform comparison voltage with the pixel signal voltage of the selected vertical signal line 19 (Vx) supplied from the pixel portion 10.

Simultaneously with the input of the reference signal RAMP into the input terminal RAMP of the voltage comparator 252, to measure the comparison time in the voltage comparator 252 by the counter 254, the count clock CK0 is input from the communication/timing controller 20 into the clock terminal of the counter 254 in synchronization with the ramp waveform voltage output from the reference signal generator 27 (t10), and down-counting is started from the initial value 0 as the first counting operation. That is, the counting operation is started in the negative direction.

The voltage comparator 252 compares the ramp reference signal RAMP supplied from the reference signal generator 27 with the pixel signal voltage Vx input via the vertical signal line 19, and when the two voltages become equal to each other, the voltage comparator 252 inverts the comparator output from the H level to the L level (t12). That is, upon comparing the voltage signal corresponding to the reset components Vrst with the reference signal RAMP, the voltage comparator 252 generates an active-low (L) pulse signal after the lapse of the time corresponding to the level of the reset components Vrst, and supplies the generated pulse signal to the counter 254.

Upon receiving this result, the counter 254 stops the counting operation almost at the same time as the inversion of the comparator output, and latches (retains/stores) the corresponding count value as the pixel data, thereby completing AD conversion (t12). That is, the counter 254 starts down-counting simultaneously with the generation of the ramp reference signal RAMP to be supplied to the voltage comparator 252, and continues counting with the clock CK0 until the active-low (L) pulse signal is received as a result of comparison processing, thereby obtaining the count value corresponding to the level of the reset components Vrst.

After the lapse of a predetermined down-counting period (t14), the communication/timing controller 20 stops supplying the control data CN4 to the voltage comparator 252 and supplying the count clock CK0 to the counter 254. Then, the voltage comparator 252 stops generating the ramp reference signal RAMP.

In this first readout operation, since the counting operation is performed by detecting the reset level Vrst of the pixel signal voltage Vx by the voltage comparator 252, the reset components ΔV of the unit pixels 3 are read.

The reset components ΔV contain offset noise which varies depending on the unit pixel 3. Generally, however, a variation in the reset components ΔV is small, and the reset level Vrst is generally common for all the pixels. Accordingly, the output value of the reset components ΔV of the pixel signal voltage Vx of the selected vertical signal line 19 is generally known.

Accordingly, in the first readout operation for the reset components ΔV, by adjusting the RAMP voltage, the down-counting period (t10 to t14; comparison period) can be reduced. In this embodiment, comparison processing is performed for the reset components ΔV by setting the maximum period for the comparison processing to be a 7-bit count period (128 clocks).

Subsequently, in the second readout operation, in addition to the reset components ΔV, the electric signal components Vsig for each unit pixel 3 in accordance with the quantity of incident light are read, and an operation similar to the first readout operation is performed. More specifically, the communication/timing controller 20 first changes the mode control signal CN5 to the high level so that the counter 254 is set to be the up-counting mode (t18). Then, after the second readout operation for reading the signal components Vsig from the unit pixels 3 of the selected rows Hx to the vertical signal line 19 (V0, V1, . . . ) is stabilized, the communication/timing controller 20 supplies the control data CN4 for generating the reference signal RAMP to the reference signal generator 27.

Upon receiving the control data CN4, the reference signal generator 27 outputs the stepped waveform (RAMP waveform) which changes in the shape of a saw tooth (RAMP shape) over time to one input terminal RAMP of the voltage comparator 252 as the comparison voltage (t20). The voltage comparator 252 compares the RAMP waveform comparison voltage with the pixel signal voltage of the selected vertical signal line 19 (Vx) supplied from the pixel portion 10.

Simultaneously with the input of the reference signal RAMP into the input terminal RAMP of the voltage comparator 252, to measure the comparison time in the voltage comparator 252 by the counter 254, the count clock CK0 is input from the communication/timing controller 20 to the clock terminal of the counter 254 in synchronization with the ramp waveform supplied from the reference signal generator 27 (t20), and, in contrast to the first counting operation, in the second counting operation, the counter 254 starts up-counting from the count value corresponding to the reset components ΔV of the unit pixels 3 obtained in the first readout operation. That is, the counting operation is started in the positive direction.

The voltage comparator 252 compares the pixel signal voltage Vx input via the vertical signal line 19 with the ramp reference signal RAMP supplied from the reference signal generator 27, and when the two voltages become equal to each other, the voltage comparator 252 inverts the comparator output from the H level to the L level (t22). That is, upon comparing the voltage signal corresponding to the signal components Vsig with the reference signal RAMP, the voltage comparator 252 generates the active-low (L) pulse signal after the lapse of the time corresponding to the level of the signal components Vsig, and supplies the generated pulse signal to the counter 254.

Upon receiving this result, the counter 254 stops the counting operation almost at the same time as the inversion of the comparator output, and latches (retains/stores) the corresponding count value as the pixel data, thereby completing AD conversion (t22). That is, simultaneously with the generation of the ramp reference signal RAMP to be supplied to the voltage comparator 252, the counter 254 starts up-counting, and continues counting with the clock CK0 until the active-low (L) pulse signal is received as a result of comparison processing, thereby obtaining the count value corresponding to the level of the signal components Vsig.

After the lapse of a predetermined up-counting period (t24), the communication/timing controller 20 stops supplying the control data CN4 to the voltage comparator 252 and supplying the count clock CK0 to the counter 254. Then, the voltage comparator 252 stops generating the ramp reference signal RAMP.

In the second readout operation, since the counting operation is performed by detecting the signal components Vsig of the pixel signal voltage Vx by the voltage comparator 252, the signal components Vsig of the unit pixels 3 are read.

In this embodiment, as the counting operation by the counter 254, down-counting is performed during the first readout operation, and then, up-counting is performed during the second readout operation. Accordingly, the subtraction expressed by Equation 1 is executed automatically in the counter 254, and the count value as a result of the subtraction is retained in the counter 254 as the n-bit digital value.

Equation 1:

(Count value in the second comparison period)−(count value in the first comparison period) (1)

In this case, Equation 1 can be modified into Equation 2, and as a result, the count value retained in the counter 254 is the n-bit digital value corresponding to the signal components Vsig.

Equation 2:

(Count value in the second comparison period) − (2)
(count value in the first comparison period) =
(signal components $Vsig1$ + reset components $\Delta V1$ +
offset components in the column $AD$ circuit 25) −
(reset components $\Delta V1$ + offset components in the
column $AD$ circuit 25) = (signal components $Vsig1$)

That is, as stated above, according to the difference processing in the counter 254 by the two readout operations and two counting operations, such as down-counting during the first readout operation and up-counting during the second readout operation, the reset components ΔV containing noise which varies depending on the unit pixel 3 and the offset components depending on the column AD circuit 25 can be eliminated, and only the electric signal components Vsig in accordance with the quantity of incident light in each pixel unit 3 can be extracted with a simple configuration. In this case, reset noise can also be advantageously eliminated.

Accordingly, the column AD circuit 25 in this embodiment serves as, not only a digital converter for converting an analog pixel signal into digital pixel data, but also as a CDS (Correlated Double Sampling) processing function.

The pixel data represented by the count value obtained in Equation 2 is a positive signal voltage, thereby eliminating the need for the complementary operation. Thus, the compatibility with known systems is high.

The electric signal components Vsig are read during the second readout operation. Accordingly, since the level of the quantity of light is determined in a wide range, it is necessary that the ramp voltage to be supplied to the voltage comparator 252 be sharply changed by setting the up-counting period (t20 to t24; comparison period) to be long.

Accordingly, in this embodiment, the comparison processing is performed for the signal components Vsig by setting the maximum period for the comparison processing to be a 10-bit count period (1024 clocks). That is, the maximum period for the comparison processing for the reset components ΔV (reference components) is set to be shorter than the maximum period for the comparison processing for the signal components Vsig. Instead of setting the maximum period (i.e., the maximum value of the AD conversion period) for the comparison processing for the reset components ΔV (reference components) to be the same as that for the signal components Vsig, the maximum period for the comparison processing for the reset components ΔV (reference components) is set to be shorter than that for the signal components Vsig, thereby decreasing the total AD conversion period of the two operations.

In this case, the total processing time for the two operations is adjusted to be within one horizontal period (one horizontal processing period). This adjustment can be made by setting the number of bits assigned to the maximum range (dynamic range) of the signal and by setting the cycle of the count clock CK0 assigned to one bit. The reference signal RAMP from the reference signal generator 27 is set to cover the maximum range (dynamic range) of the signal.

If the gradient of the reference signal RAMP or the cycle of the count clock CK0 is fixed, the AD conversion period can be adjusted according to the number of bits. For example, if the number of bits is reduced by m, the AD conversion period can be set to be 1/(2^m; ^ is an exponent). If the cycle of the count clock CK0 is fixed and if the gradient of the reference signal RAMP is multiplied with 1/k, the coefficient (gain) of the signal can be increased by the factor of k.

If the AD conversion period is differentiated between the reference components and the signal components, the number of comparison bits is different for the first operation and the second operation. In this case, the control data CN4 is supplied from the communication/timing controller 20 to the reference signal generator 27, and based on this control data CN4, the ramp voltage is generated in the reference signal generator 27 so that the gradient of the ramp voltage, i.e., the rate of change, in the reference signal RAMP, becomes the same between the first operation and the second operation. It is easy to set the gradient of the ramp voltage to be the same for the first operation and the second operation since the ramp voltage is generated by digital control. Accordingly, the precision of the AD conversion for the first operation can be equal to that for the second operation, thereby making it possible to obtain a correct subtraction result expressed by Equation 1 by the up/down counter.

At a predetermined timing (t28) after the completion of the second counting operation, the communication/timing controller 20 instructs the horizontal scanning circuit 12 to read out the pixel data. In response to this instruction, the horizontal scanning circuit 12 sequentially shifts the horizontal selection signals CH(i) to be supplied to the counters 254 via the control lines 12c.

With this operation, the count values expressed by Equation 2 stored/retained in the counters 254, i.e., the pixel data represented by the n-bit digital data, are sequentially output to the outside the column processor 26 or the outside the chip having the pixel portion 10 from the output terminal 5c via the n horizontal signal lines 18. Subsequently, the operation is similarly repeated row by row, thereby obtaining the video data D1 representing a two-dimensional image.

As described above, for conducting AD conversion by performing the counting operation on the reference components (reset components) and the true signal components, the counting operation is performed on the same pixel signal by switching between the down-counting operation and the up-counting operation (and more specifically, in the opposite modes), and also, the digital data (count value) obtained for one of the reference components (reset components) and the true signal components (in the above-described example, the reference components) is used as the initial value for the counting operation for the other components (in the above-described example, the signal components). As a result, upon completing the AD conversion by the counting operation for the other components (in the above-described example, the signal components), the digital data, which is the difference between the two types of components, can be automatically obtained. That is, the difference signal components between the reference components and the signal components of the analog pixel signal can be converted into digital data.

FIRST EMBODIMENT

Spatial Difference Processing Operation

Figure 3:
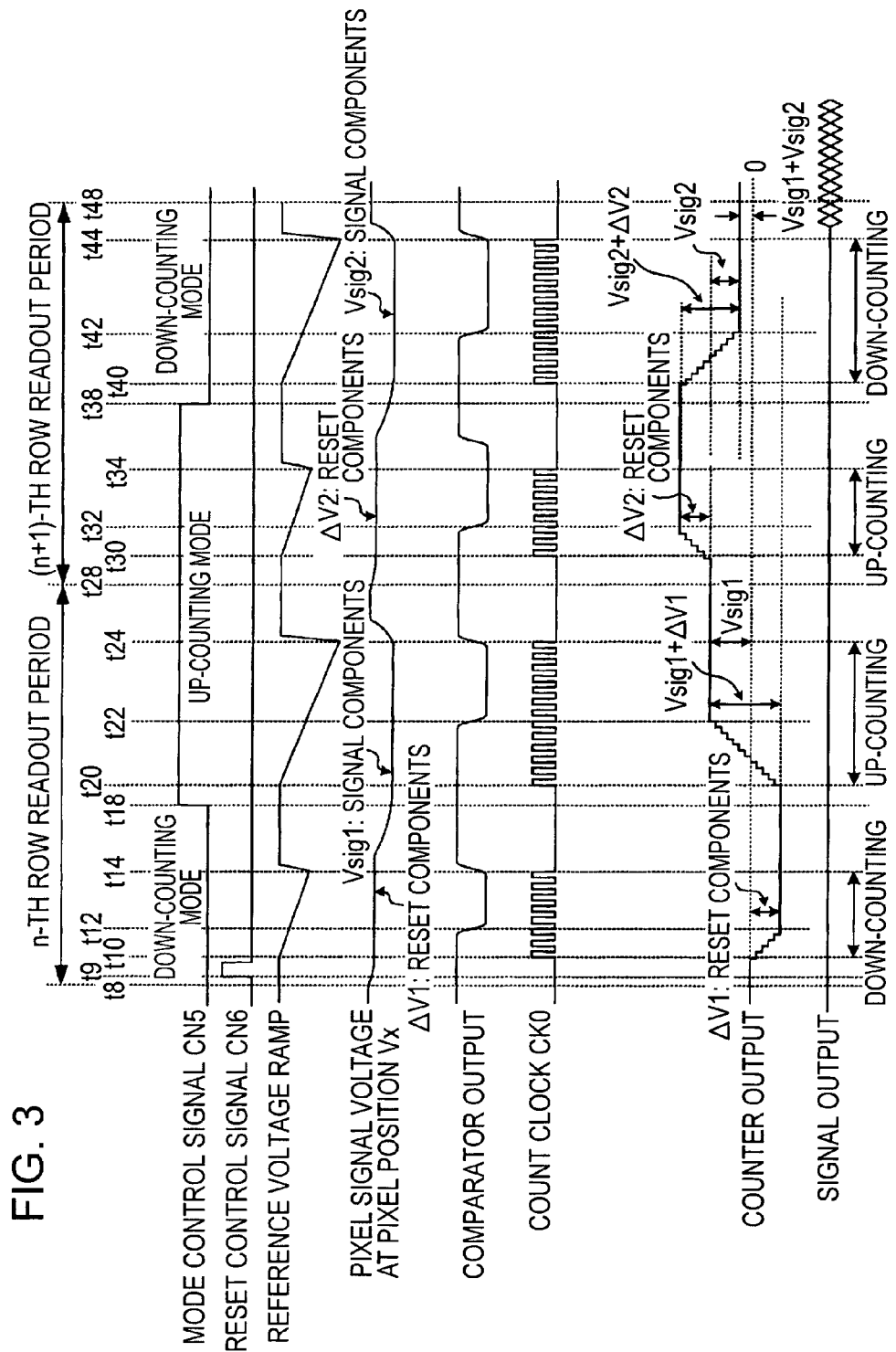
FIG. 3 is a timing chart illustrating a spatial difference processing operation in the column AD circuits of the solid-state imaging device of the first embodiment shown in FIG. 1.

FIG. 3 is a timing chart illustrating the operation of the spatial difference processing operation in the column AD circuit 25 of the solid-state imaging device 1 of the second embodiment shown in FIG. 1. The spatial difference processing is difference processing between a plurality of pixel signals located at different pixel positions in one field of an image which is captured substantially at the same time.

The reason for describing the "captured substantially at the same time" is due to the circumstance unique to the CMOS sensors where the charge accumulation period is different by horizontal lines because scanning is performed in each horizontal line (scanning line). By the use of, for example, a mechanical shutter, or by adding a global exposure function to the CMOS sensor, all the horizontal lines have the same charge accumulation period so that one field of an image can be captured exactly at the same time.

Typical examples of the spatial difference processing include the vertical-column difference processing performed on pixel signals of a plurality of adjacent rows (may be 3 or more) and horizontal-row difference processing performed on pixel signals at a plurality of adjacent pixels (may be 3 or more) in the same row. As the spatial difference processing operation of the first embodiment discussed below, the vertical-column difference processing is performed.

The "one field period" is a period in which an image is read by two-dimensionally scanning the imaging plane (more specifically, one vertical scanning period), and the "one frame period" is a period required for forming an image by all pixels on the imaging plane. When sequential scanning (progressive scanning) for scanning all rows is performed in the vertical direction, the "one field period" is equal to the "one frame period". In contrast, when interfaced scanning is performed in which some rows are sequentially scanned in the vertical direction in the first vertical scanning operation and the remaining rows are scanned in the vertical direction in the second vertical scanning operation, "k fields" are equal to "one frame". "k" indicates the number of scanning operations, and normally, k is 2. Regardless of the progressive scanning or the interlaced scanning, one vertical scanning period for reading an image by two-dimensionally scanning the imaging plane may be referred to as "one frame" in abroad sense. In this specification, the frame in the following description means the frame in a broad sense.

Even after reading out the n-bit digital value, the counter 254 can retain the digital value therein. In the spatial difference processing, digital difference processing is executed on a plurality of pixel signals by utilizing the retaining characteristic of the counter 254, which is specifically discussed below.

As shown in FIG. 3, for the first pixel signal V1, by performing down-counting during the first readout operation and by performing up-counting during the second readout operation, only the electric signal components Vsig in accordance with the quantity of incident light on the unit pixel 3 can be extracted by the difference processing within the counter 254B (t10 to t24). The count value expressed by Equation 2 retained in the counter 254B is an n-bit digital value representing the positive signal voltage Vsig.

For the second pixel signal V2, up-counting is performed during the first readout operation, and down-counting is performed during the second readout operation. That is, AD conversion is performed by the combination of count modes opposite to the combination of the count modes for the first pixel signal V1 (t30 to t44). Accordingly, the subtraction processing expressed by Equation 1 is automatically performed in the counter 254, and the resulting count value is retained in the counter 254.

AD conversion for the second pixel signal V2 is performed by the combination of the count modes opposite to the combination of the count modes for the first pixel signal V1. Accordingly, the count value retained in the counter 254 becomes the n-bit digital value representing a negative signal voltage (−Vsig2), as expressed by Equation 3.

Equation 3:

$$\begin{aligned}&(\text{Count value in the second comparison period}) - \\ &\quad (\text{count value in the first comparison period}) = \\ &\quad -(\text{signal components } Vsig2 + \text{reset components } \Delta V2 + \\ &\quad \text{offset components in the column } AD \text{ circuit } 25) + \\ &\quad (\text{reset components } \Delta V2 + \text{offset components in the} \\ &\quad \text{column } AD \text{ circuit } 25) = -(\text{signal components } Vsig2)\end{aligned} \quad (3)$$

Upon completing the second counting operation on the first pixel signal V1, the first up-counting operation on the second pixel signal V2 is started without resetting the count value retained in the counter 254. Then, the count value expressed by Equation 2 is added to the count value expressed by Equation 3. Accordingly, the count value retained in the counter 254 after completing the second counting operation on the second pixel signal V2 is the n-bit digital value representing the difference (subtraction) computation result (Vsig1−Vsig2) between the two pixel signals V1 and V2, as expressed by Equation 4.

Equation 4:

$$\begin{aligned}&\text{The count value for the first pixel signal} + \\ &\quad (\text{second comparison period}) - (\text{first comparison period}) = \\ &\quad -(\text{signal components } Vsig + \text{reset components } \Delta V + \\ &\quad \text{offset components in the column AD circuit 25}) + \\ &\quad (\text{reset components } \Delta V + \text{offset components in} \\ &\quad \text{the column AD circuit 25}) = \\ &\quad (\text{signal components } Vsig1) - (\text{signal components } Vsig2)\end{aligned} \quad (4)$$

Although it is not shown, in contrast to the example shown in FIG. 3, the following operation may be performed. For the first pixel signal V1, the up-counting operation is performed during the first readout operation and the down-counting operation is performed during the second readout operation. Then, for the second pixel signal V2, without resetting the count value retained in the counter 254, the down-counting operation is performed during the first readout operation and the up-counting operation is performed during the second readout operation. Then, the count value retained in the counter 254 after completing the second counting operation on the pixel signal V2 is equal to the difference (subtraction) processing result (Vsig2−Vsig1) between the two pixel signals V1 and V2.

As discussed above, upon completing AD conversion for the Hy row, without resetting the counter 254, AD conversion is performed for the (Hy+1) row for the reset components ΔV and the signal components Vsig by the combination of the count modes opposite to the combination of the count modes for the AD conversion for the Hy row. Accordingly, the subtraction result between the Hy row and the (Hy+1) row in the same vertical column is retained in the counter 254 of the column AD circuit 25, thereby implementing the difference processing for the two rows.

At a predetermined timing (t48) after completing the second counting operation on the second pixel signal V2, the communication/timing controller 20 instructs the horizontal scanning circuit 12 to read out the pixel data. In response to this instruction, the horizontal scanning circuit 12 sequentially shifts the horizontal selection signals CH(i) to be supplied to the counter 254 via the control line 12c.

Then, the count value expressed by Equation 4 stored/retained in the counter 254, i.e., the n-bit digital data representing the difference (subtraction) result (Vsig2−Vsig1) between the two pixel signals V1 and V2, can be sequentially output to the outside the column processor 26 or the outside the chip having the pixel portion 10 from the output terminal 5c via the n horizontal signal lines 18. Thereafter, the operation is similarly repeated in units of two rows. As a result, computed data D2 representing the two-dimensional difference image indicating the difference (subtraction) computation result between the two pixel signals in the adjacent two rows can be obtained. The image representing the difference computation result is the image with a resolution of ½ and with an amount compressed to ½ in the vertical direction (on the sensor surface).

Although in this embodiment difference processing performed for two adjacent rows has been discussed, a product-sum operation including subtraction processing for three or more rows can be performed. In this case, when the number of pixels to be processed (in this embodiment, the number of rows) is m, the amount of image data can be compressed to 1/m.

As discussed above, according to the solid-state imaging device 1 of the first embodiment, by repeatedly performing the counting operation for the reference components (reset components) and the signal components of the pixel signal of the same unit pixel 3 in the opposite count modes, the difference signal components between the reference components and the signal components of the pixel signal can be converted into digital data. Additionally, by repeatedly performing the counting operation for the pixel signals of a plurality of (in the above-described example, two) different unit pixels 3 by using different combinations of the count modes, the difference (subtraction) computation between the plurality of pixel signals can be implemented.

For example, in the counter 254, when conducting AD conversion by performing the counting operation for each of the pixel signals of the plurality of unit pixels 3, digital data obtained for one of the pixel signals is used as the initial value for the counting operation for the other pixel signal (the signal to be subjected to the second counting operation). As a result, after conducting AD conversion by performing the counting operation for the other pixel signal, digital data as a result of performing the product-sum operation for the two pixel signals can be automatically obtained.

As shown in FIG. 3, by the use of the different count modes (opposite modes), the resulting count value obtained by the second counting operation is digital data as a result of subtracting the pixel signals of the plurality of unit pixels 3. In contrast, though it is not shown, by the use of the same count modes, the count value obtained by the second counting operation is digital data as a result of adding the pixel signals (more specifically, the true signal components) of the plurality of pixel signals 3. The above-described operations may be combined, in which case, the function of finding the sum with a sign for the pixel signals (more specifically, the true signal components) from the unit pixels 3, i.e., the product-sum operation, can be implemented.

SECOND EMBODIMENT

Configuration of Solid-State Imaging Device

Pipeline Processing

Figure 4:
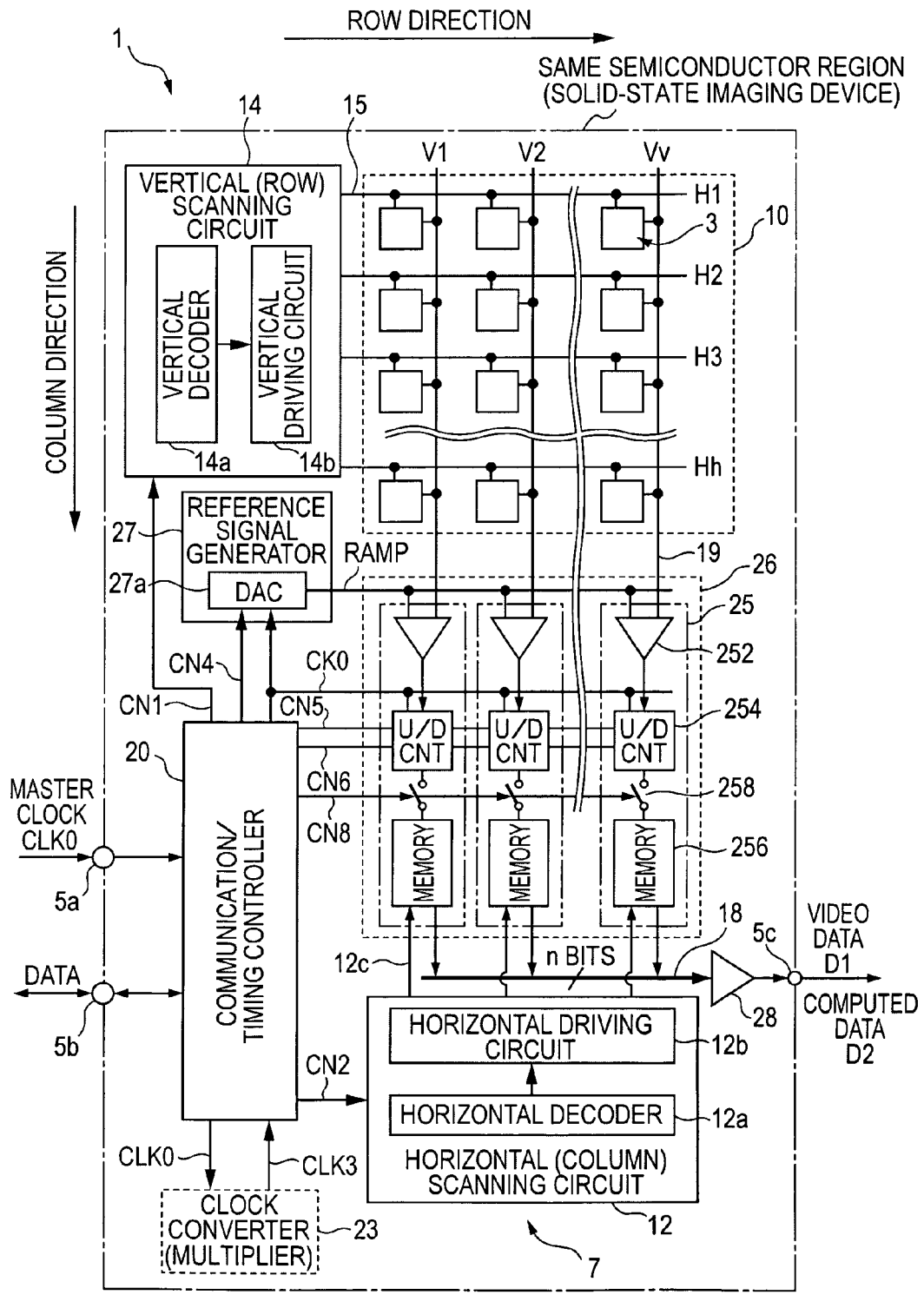
FIG. 4 is a schematic diagram illustrating a CMOS solid-state imaging device according to a second embodiment of the present invention.

FIG. 4 is a schematic diagram illustrating a CMOS solid-state imaging device according to a second embodiment of the present invention. In the solid-state imaging device 1 of the second embodiment, the configuration of the column AD circuits 25 of the solid-state imaging device 1 of the first embodiment is modified.

More specifically, in the column AD circuit 25 of the second embodiment, a data storage unit 256, which serves as an n-bit memory device for storing the counting result retained in the counter 254, and a switch 258 disposed between the counter 254 and the data storage unit 256 are provided subsequent to the counter 254.

A memory transfer instruction pulse CN8, which serves as a control pulse, is supplied from the communication/timing controller 20 to each of the switches 258 at a predetermined timing. Upon receiving the memory transfer instruction pulse CN8, the switch 258 transfers the count value retained in the corresponding counter 254 to the data storage unit 256. The data storage unit 256 retains/stores the transferred count value.

The mechanism for retaining the count value of the counter 254 in the data storage unit 256 at a predetermined timing is not restricted to the configuration in which the switch 258 is disposed between the counter 254 and the data storage unit 256. For example, the counter 254 and the data storage unit 256 may be directly connected, and the output enable of the counter 254 is controlled by the memory transfer instruction pulse CN8. Alternatively, the memory transfer instruction pulse CN8 may be used as a latch clock that determines the data reading timing of the data storage unit 256.

A control pulse may be input into the data storage unit 256 from the horizontal scanning circuit 12 via the control line 12c. The data storage unit 256 retains the count value from the counter 254 until it receives an instruction by the control pulse via the control line 12c.

While the voltage comparator 252 and the counter 254 of the column processor 26 perform the corresponding processing, the horizontal scanning circuit 12 serves as a read scanner for reading the count value retained in the data storage unit 256.

According to this configuration of the second embodiment, since the counting result retained in the counter 254 can be transferred to the data storage unit 256, AD conversion, i.e., the counting operation of the counter 254, and the reading operation for reading the counting result to the horizontal signal line 18 can be independently controlled. Thus, the pipeline operation for independently or simultaneously performing the AD conversion and the reading operation for reading out the signals to the outside the imaging apparatus 1 via the horizontal signal line 18 can be implemented.

SECOND EMBODIMENT

Pipeline Processing Basic Operation

Figure 5:
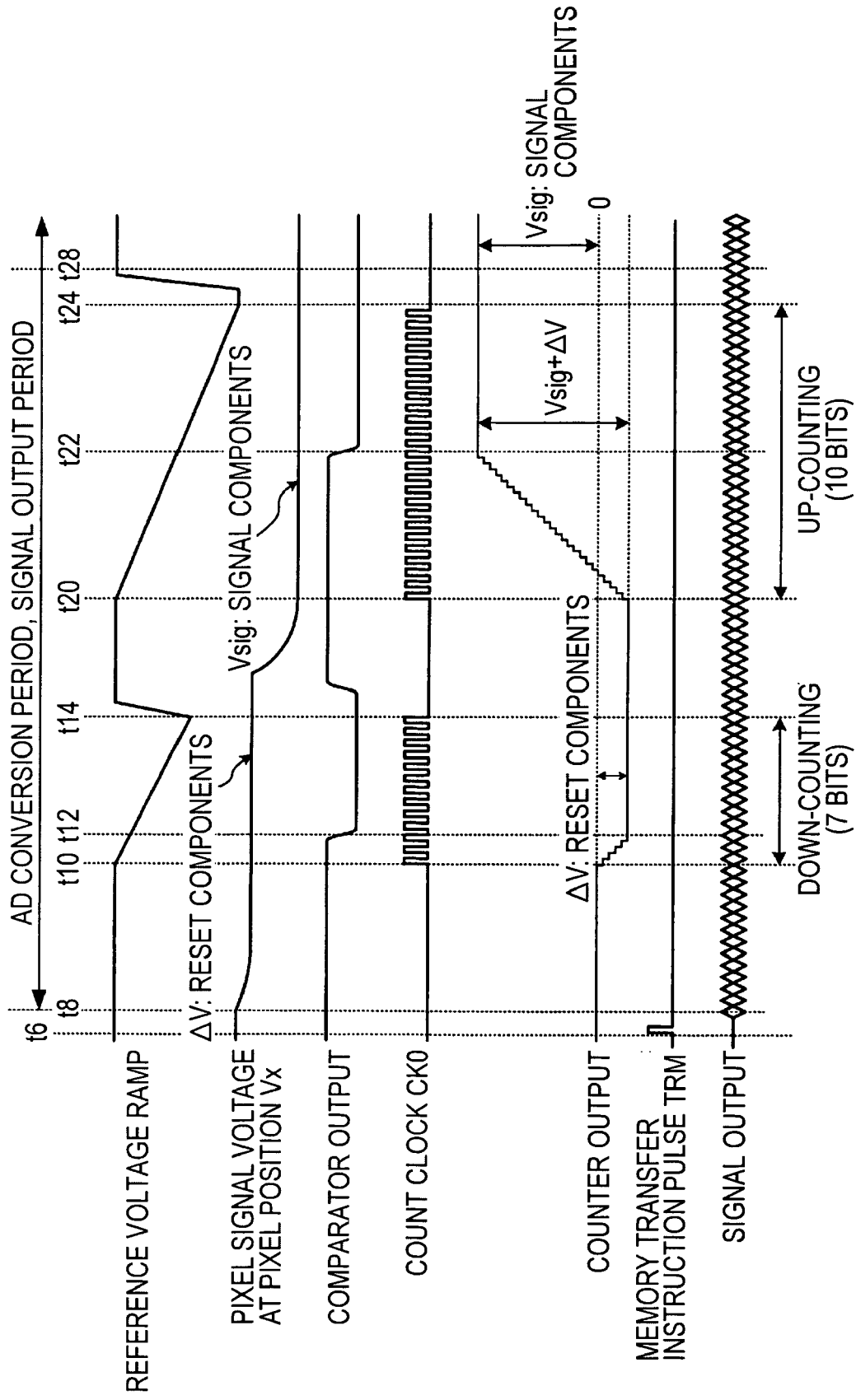
FIG. 5 is a timing chart illustrating the basic operation in the column AD circuit of the solid-state imaging device of the second embodiment.

FIG. 5 is a timing chart illustrating the basic operation in the column AD circuit 25 of the solid-state imaging device 1 of the second embodiment shown in FIG. 4. The AD conversion conducted in the column AD circuit 25 is similar to that in the first embodiment, and a detailed explanation thereof is thus omitted.

In the second embodiment, the data storage unit 256 is added to the configuration of the first embodiment, and the basic operation including the AD conversion is similar to that of the first embodiment. Before the operation of the counter 254 (t6), the counting result obtained by the processing on the previous row Hx−1 is transferred to the data storage unit 256 based on the memory transfer instruction pulse CN8 from the communication/timing controller 20.

In the first embodiment, the pixel data cannot be output to the outside the column processor 26 before completing the second readout operation, i.e., AD conversion, on the pixel signal to be processed. Accordingly, the readout operation is restricted. In contrast, in the configuration of the second embodiment, before the first readout operation (AD conversion) on the pixel signal to be processed, the count value indicating the previous subtraction processing has been transferred to the data storage unit 256. Accordingly, the readout operation is not restricted.

SECOND EMBODIMENT

Spatial Difference Processing Operation by Solid-State Imaging Device

Figure 6:
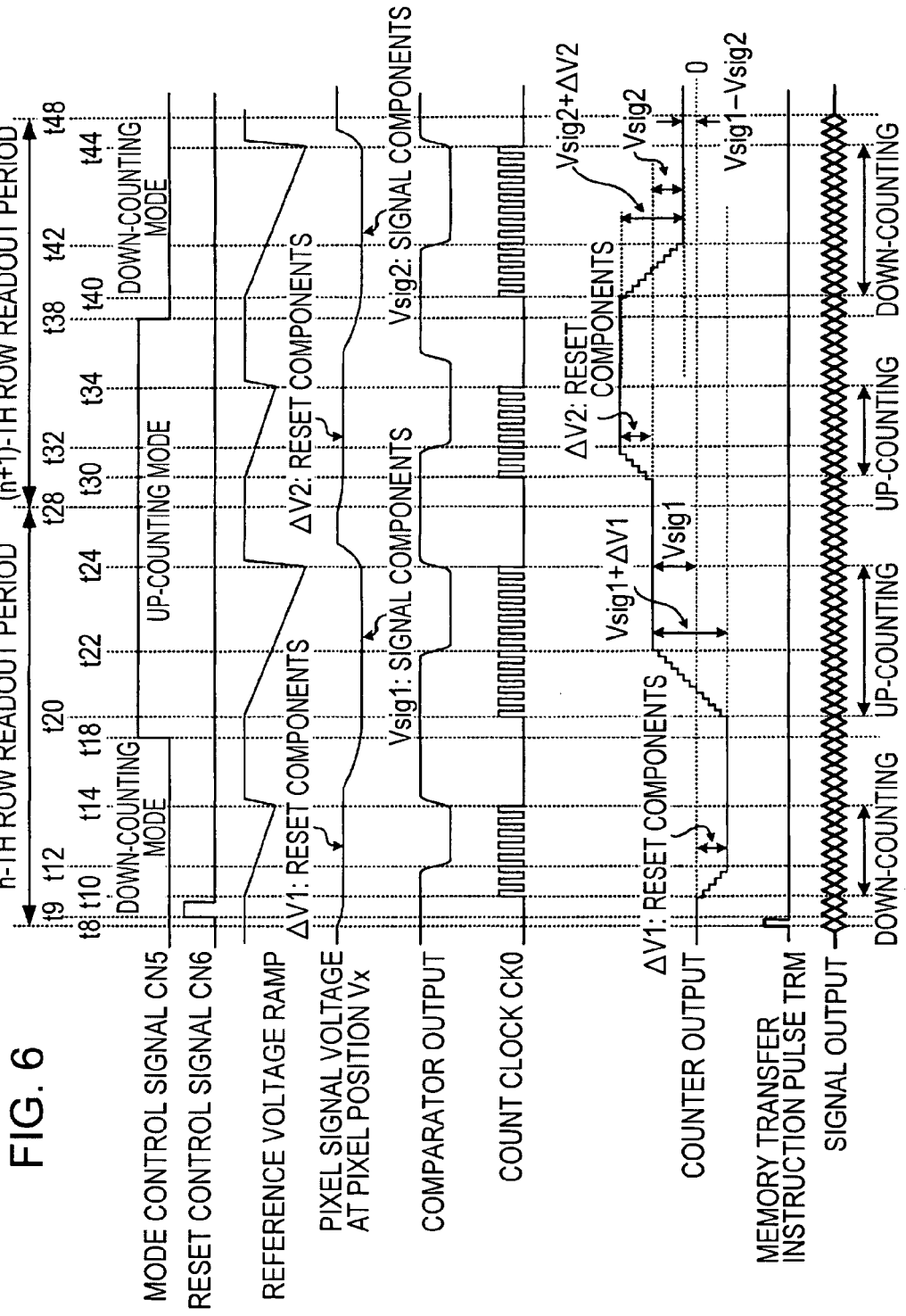
FIG. 6 is a timing chart illustrating the spatial difference processing operation in the column AD circuit of the solid-state imaging device of the second embodiment shown in FIG. 4.

FIG. 6 is a timing chart illustrating the operation of the spatial difference processing operation in the column AD circuit 25 of the solid-state imaging device 1 of the second embodiment shown in FIG. 4.

In the second embodiment, as shown in FIG. 5, since the count value indicating the previous subtraction processing result is transferred to the data storage unit 256 before the first readout operation (AD conversion) for the pixel signal to be processed, the readout operation is not restricted.

With this arrangement, as shown in FIG. 6, the signal output operation for outputting the difference data to the outside the imaging apparatus 1 from the data storage unit 256 via the horizontal signal line 18 and the output circuit 28 can be simultaneously performed with the difference operation utilizing the readout operation for reading the signals in the current row Hx and the subsequent row (Hx+1) and the count operation of the counter 254, thereby achieving more efficient signal output.

Figure 7:
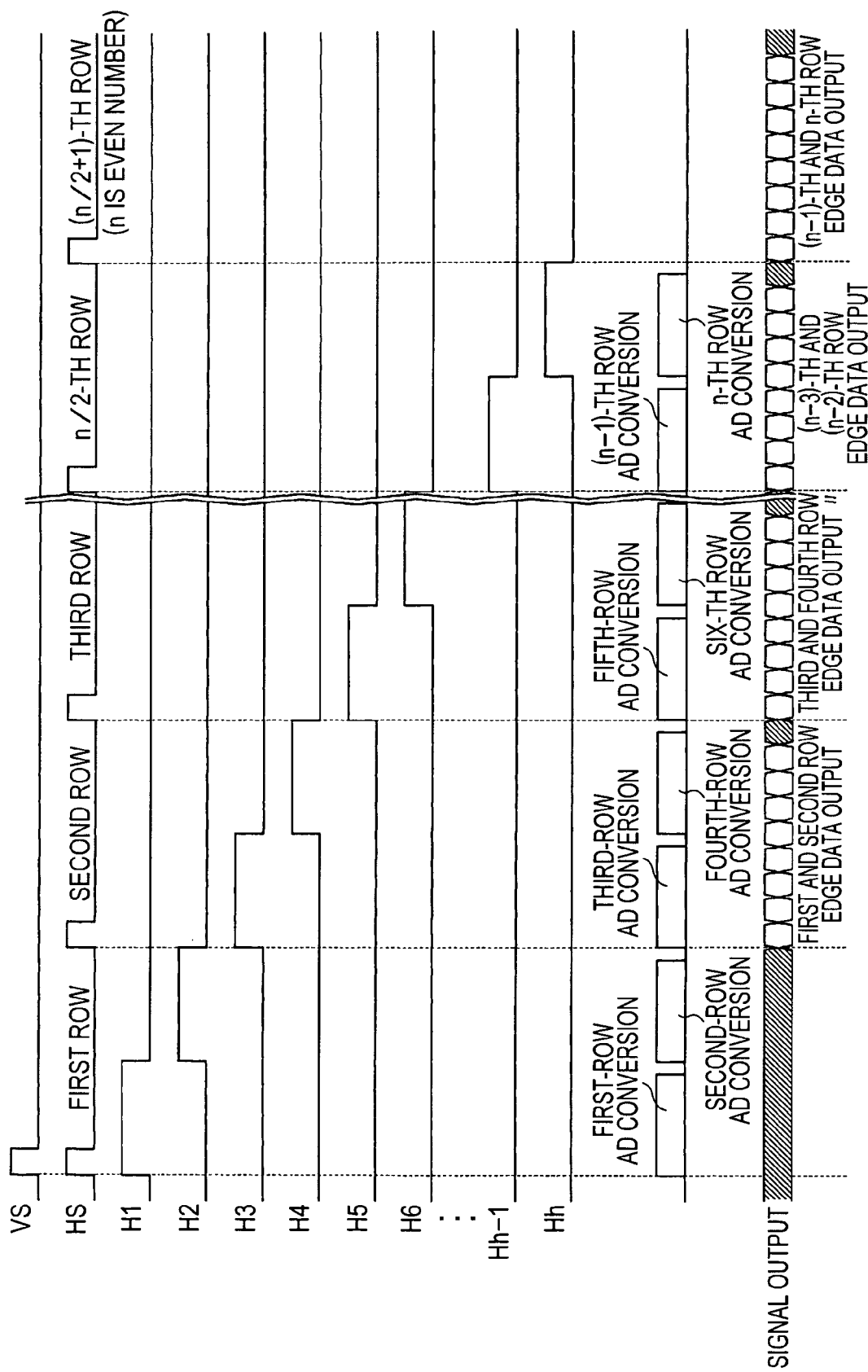
FIG. 7 is a timing chart illustrating the spatial difference processing in relation to the frame rate.

FIG. 7 is a timing chart illustrating the spatial subtraction processing in relation to the frame rate. As discussed with reference to FIG. 3, by performing the difference operation in units of two rows by using the up/down counting function of the counter 254, a subtraction image can be obtained, and at the same time, the amount of data can be compressed. According to the configuration of the second embodiment, by the provision of the data storage unit 256, AD conversion and the data readout operation can be performed in parallel.

In the second embodiment, the total AD conversion period for all the pixels (in this embodiment, the rows) subjected to difference processing is set to be within one row period. With this arrangement, the total AD conversion time can be reduced to $½^m$, and also, the frame rate can be increased by the factor of $2^m$ or more.

To reduce the total AD conversion time to $½^m$ or to increase the frame rate by the factor of $2^m$ when the number of pixels to be processed is $2^m$, the gradient of the reference signal RAMP is increased to $2^m$, and also, the count clock CK0 is increased by the factor of $2^m$. Alternatively, the number of bits may be reduced without changing the gradient of the reference signal RAMP or the count clock CK0.

In the latter method, if the maximum range (dynamic range) of the signal is realized while maintaining the normal bit resolution applied to the maximum range of the signal, the AD conversion period, i.e., the full-scale AD conversion period (for example, n bits for n-bit counting) for each unit pixel 3, cannot be applied to one row. Accordingly, it is necessary that the maximum AD conversion period for each unit pixel 3 be reduced to $½^m$. This means that, generally, the number of bits should be reduced by m if the gradient of the reference signal RAMP is not changed.

That is, in order to set the computation for a plurality of pixels to be within one row period while maintaining the bit resolution without changing the gradient of the reference signal RAMP or the count clock CK0, it is necessary that the number of bits used for the counting operation be adjusted as described above according to the number of pixels (in this example, the number of rows) to be processed.

That is, if it is not possible that the AD conversion period is decreased while maintaining the AD conversion precision, the digital counting in the second counting operation (i.e., the comparison period for the signal components Vsig) of the counter 254 in the timing chart in FIG. 7 should be reduced to n-m bits if $2^m$ pixels are to be subjected to the subtraction processing.

For example, if the counting operation is performed with 10 bits when the subtraction processing is performed in units of two rows, comparison is normally conducted during the 1024-clock period. In this case, however, the counting operation is performed with 9 bits, i.e., the comparison period is reduced to the 512 clock period. In this case, the rate of the temporal change of the reference signal RAMP generated in the DA conversion circuit 27a of the reference signal generator 27 should be constant, which means that the AD conversion period, i.e., the bit resolution, is not changed.

In this embodiment, as indicated by the timing chart shown in FIG. 7, by reducing the AD conversion period to be ½, the frame rate can be doubled without changing the count clock CK0 or the data output rate.

If the frame rate is doubled, the charge accumulation time per unit pixel becomes ½, and the signal amplitude is also reduced to be ½, thereby causing a reduction in the S/N ratio. Similarly, if subtraction is conducted in units of 2^m rows so that the AD conversion period can be reduced to be 1/m, the frame rate is increased by the factor of m. In this case, by reducing the n-bit AD conversion precision to n-m bits, the frame rate can be increased, though the S/N ratio may be decreased.

Usage Modes of Spatial Difference Processing; Linear Edge Detection

Figure 9:
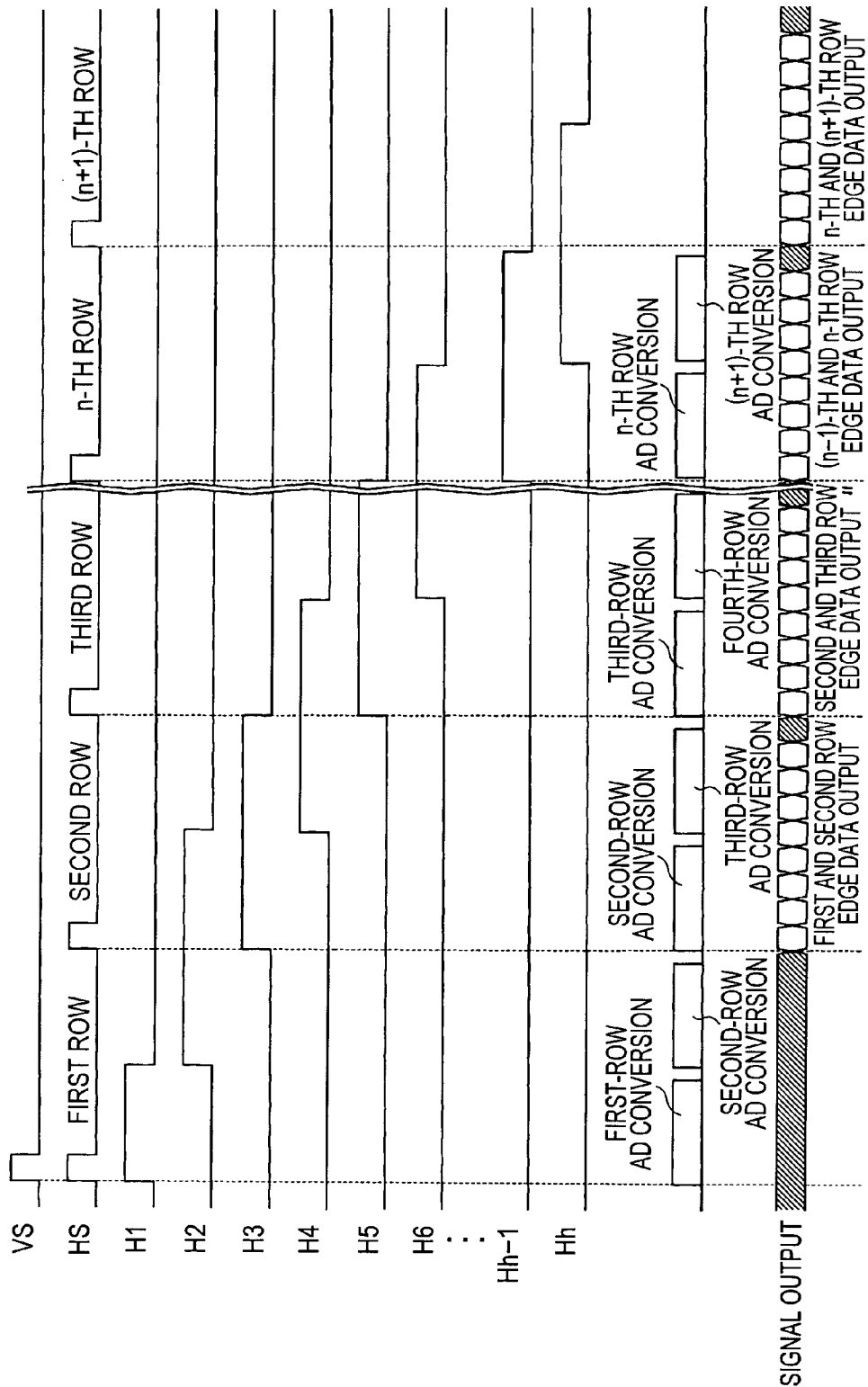
FIG. 9 illustrates the first examples (edge detection) of usage modes of the spatial difference processing in the configuration of the first or second embodiment.

FIGS. 8A through 9 illustrate a first example of the usage modes of the spatial difference processing performed in the configuration of the first or second embodiment. As discussed with reference to FIGS. 6 and 7, by performing the subtraction processing in units of two rows by using the up/down counting function of the counter 254, a difference image can be obtained. One example of the usage mode of this processing is to implement an edge extracting function without the need to use a special circuit outside the column processor 26.

FIGS. 8A through 8C illustrate the edge detecting function. By performing the difference processing in the counter 254 in the column direction, subtraction between adjacent pixels in units of two rows, i.e., in the vertical scanning direction, can be performed, thereby performing the edge detection. By performing the subtraction processing for adjacent pixels in the vertical scanning direction, the signal level becomes most intensified, as shown in FIG. 8A, in a boundary portion between black and white of a subject in the scanning direction. More specifically, a difference output cannot be obtained from a portion in which the signal level of the charge generator, such as a photodiode, is constant. However, from a boundary portion in which the signal level is changed, a difference output can be obtained, thereby making it possible to perform edge detection. By performing the vertical-direction edge detection processing on a plurality of vertical columns, straight lines in the rows and columns can be detected.

In the difference processing discussed with reference to FIG. 7, however, since the subtraction processing is performed in units of two rows, if a boundary portion between black and white is positioned between two units of subtraction processing, the signal level is not intensified at that boundary portion.

To solve this problem, subtraction processing in units of two rows should be sequentially performed row by row. To implement this sequential processing, instead of sequentially scanning horizontal rows in units of two rows in the vertical direction, the vertical scanning circuit 14 selects a desired row Hy by address decoding processing by using the vertical decoder 14a, thereby selecting corresponding two rows.

In this case, as indicated by the timing chart of FIG. 9, the AD conversion period is reduced to ½ while maintaining the frame rate. Also in this case, the frame rate can be maintained without changing the count clock CK0 or the data output rate.

Threshold processing is preferably performed for determining edges in order to prevent the erroneous determination due to the components, such as random noise. That is, it can be determined that an edge has been detected when the digital value indicating the difference result between two pixels obtained in Equation 4 in the output circuit 28 subsequent to the column processor 26 or in a digital signal processor (not shown) subsequent to the output circuit 28 is greater than or equal to a predetermined value.

The shot noise caused by charge fluctuations is proportional to the square root of the magnitude of a signal. That is, if the luminance level is higher since the depth of field is bright, the level of the shot noise becomes higher. Accordingly, if the threshold for the determination processing is constant, edges cannot be detected with high precision if the depth of field is too bright or too dark. In order to solve this problem, the threshold for the edge determination processing is adjusted according to the situation. For example, when the contrast of a subject is high or when the depth of field is dark, the threshold for the determination processing is increased. In contrast, when the contrast of a subject is low or when the depth of field is bright, the threshold for the determination processing is decreased. With this arrangement, edges can be detected with high precision.

Usage Mode of Spatial Difference Processing; Pattern Matching

Figure 10A:
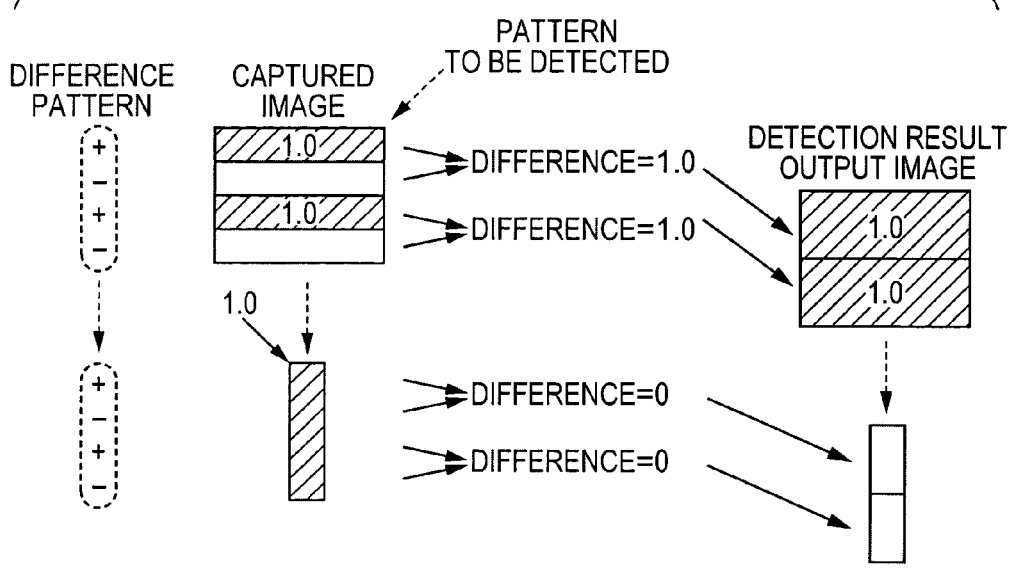
FIG. 10 illustrates second examples (pattern matching) of usage modes of the spatial difference processing in the configuration of the first or second embodiment.
Figure 10B:
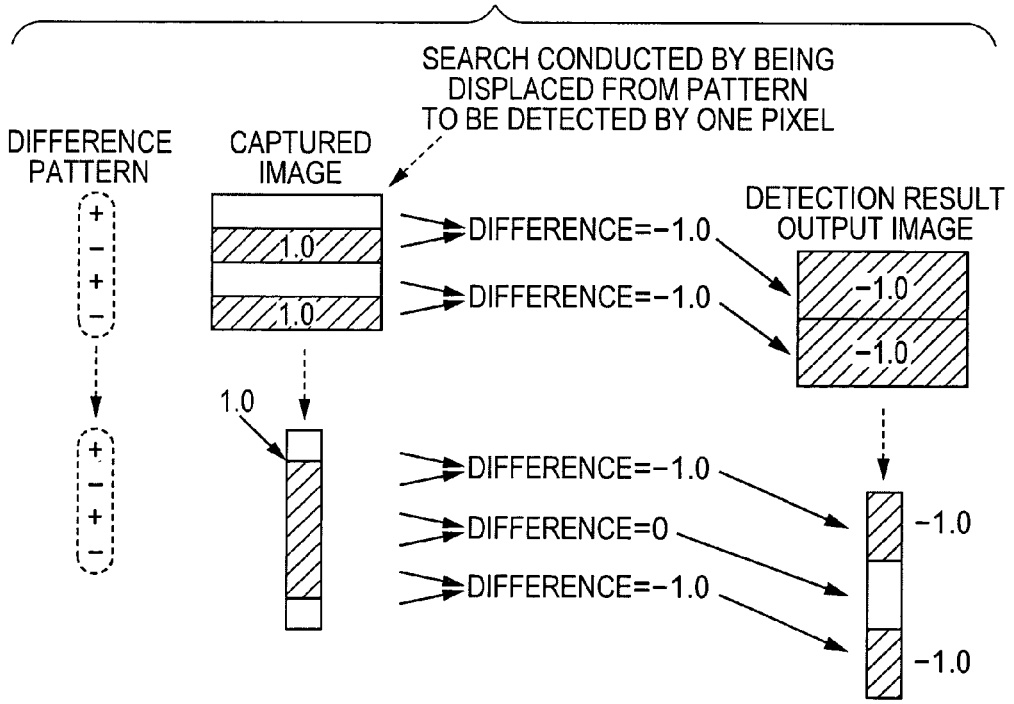

FIGS. 10A and 10B illustrate a second example of the usage modes of the spatial difference processing in the configuration of the first or second embodiment. In the second example, the pattern matching is discussed. The pattern matching can be performed according to a concept similar to the concept of the edge detection. For example, by conducting scanning with a combination of the same subtraction patterns as a pattern to be extracted, the most intensified signal can be obtained, as shown in FIG. 10A, from the portions having the same patterns as the subtraction patterns. This operation is equivalent to the operation for allowing the image to pass through a linear spatial filter, and according to the configuration of the first or second embodiment, the pattern matching function can be implemented without using a special external circuit.

In the difference processing shown in FIG. 7, however, since the subtraction processing is conducted in units of two rows, if search is conducted by being displaced from a pattern to be detected by one pixel, edges may be detected, as shown in FIG. 10B, from patterns which do not match the patterns to be detected. To overcome this drawback, scanning is also conducted with a combination of subtraction patterns displaced by one row, and also, a logical AND of the two detection results is performed by being displaced by one row, or image data obtained as a result of detection is added. If a logical AND is performed, portions which do not match the patterns to be detected are completely removed. If data addition is performed, the density of a portion which matches a pattern to be detected is enhanced, and also, the density of a portion which does not match the pattern to be detected is decreased, thereby enhancing the portion to be extracted.

As described above, according to the solid-state imaging device 1 of the first and second embodiments, the counting operation is performed twice by switching the processing modes by using the up/down counter. In the configuration in which the unit pixels 3 are disposed in a matrix, the column AD circuits 25 are formed of column-parallel column AD circuits disposed in the individual vertical columns.

Thus, the subtraction processing result between the reference components (reset components) and the signal components can be directly obtained for each vertical column as the result of the second counting operation. Accordingly, a memory device for retaining the counting result for each of the reference components and the signal components can be implemented by a latch function provided for the counter, and it is not necessary to provide, separately from the counter, a dedicated memory device for retaining the AD converted data. Additionally, a subtractor for determining the difference between the reference components and the signal components is not necessary.

If the product-sum operation is performed by using a plurality of true signal components obtained by the subtraction processing, memory devices for retaining the counting operation can be implemented by the latch function provided for the counter. Accordingly, it is not necessary to provide, separately from the counter, a dedicated memory device for retaining the AD converted data.

Thus, the provision of peripheral circuits, such as a dedicated memory for retaining the AD conversion result, a dedicated subtractor for determining the difference between the reference components and the signal components, or a dedicated subtractor and a dedicated adder for performing the product-sum operation, become unnecessary. As a result, the circuit scale or the circuit area can be decreased, and the cost of the overall apparatus can be reduced. Additionally, an increase in the noise, the current, or the power consumption can be prevented.

Since the column AD circuit (AD converter) is formed of a comparator and a counter, regardless of the number of bits, the counting operation can be controlled by one count clock for operating the counter and the control line for controlling the count mode. This eliminates the need for providing a signal line for outputting the count value of the counter to the memory device, thereby preventing an increase in the noise or the power consumption.

That is, in the solid-state imaging device 1 in which the AD converters are mounted on the same chip, the column AD circuits 25, which serve as the AD converters, are each formed of a pair of the voltage comparator 252 and the counter 254. Also, the counting operation by the counter 254 is performed by a combination of up-counting and down-counting so that the difference between basic components (in this embodiment, reset components) of a signal to be processed and signal components can be used as digital data. Thus, the circuit scale or the circuit area can be decreased, and the power consumption can be reduced. Additionally, the number of wirings for interfacing with other functions can be decreased, or an increase in the noise or power consumption caused by the wiring can be prevented.

By using the difference computation processing mode as the processing mode, and also by using the mode-switching up/down counting functions of the column AD circuits 25 disposed in a column-parallel structure without using a memory outside the chip, high-precision difference processing can be implemented in units of rows without using additional circuits. This makes it possible to implement spatial difference processing, such as edge detection processing, straight line detection processing, or pattern matching processing.

THIRD EMBODIMENT

Configuration of Solid-State Imaging Device

Two-Dimensional Processing

First Example

FIG. 11 is a schematic diagram illustrating a CMOS solid-state imaging device according to a third embodiment of the present invention. The solid-state imaging device 1 of the third embodiment is characterized in that a function element for implementing spatial difference processing in the row direction is added to the solid-state imaging device 1 of the second embodiment. A description is given here in the context of "two row×two column" difference computation performed in units of two columns in the row direction in addition to the difference computation in the units of two rows in the column direction shown in FIG. 3.

More specifically, as the major function element for performing difference processing in the row direction, the solid-state imaging device 1 is provided with a digital computing unit (Δ) 282 for performing n-bit subtraction processing in the output circuit 28. Between the column processor 26 and the digital computing unit 282 of the output circuit 28, two n-bit horizontal signal lines 18 (18a and 18b) are prepared.

The digital computing unit 282 receives a plurality of digital data as a product-sum operation result obtained in the column AD circuit 25 in the column direction or in the row direction, and based on the plurality of digital data, the digital computing unit 282 performs a product-sum operation in the direction opposite to the column direction or in the row direction employed in the column AD circuit 25. This means that the digital computing unit 282 performs the product-sum operation in the row direction if the column AD circuit 25 performs the processing in the column direction and the digital computing unit 282 performs the product-sum operation in the column direction if the column AD circuit performs the processing in the row direction. In this embodiment, it is assumed that the column AD circuit 25 performs the product-sum operation in the column direction and the digital computing unit 282 performs the product-sum operation in the row direction. As the product-sum operation, difference processing is performed.

In this embodiment, the column processor 262 and the digital computing unit 282 form a data processing unit for obtaining digital data as a product-sum operation result of a plurality of signals. In the overall apparatus, digital data as a result of performing a two-dimensional product-sum operation can be obtained from the digital computing unit 282.

The column AD circuits 25 connected to the odd-numbered columns (2j-1) V1, V3, . . . (j is a positive integer of one or greater, and the same applies to the following description in this embodiment) are connected to a first input terminal of the digital computing unit 282 via the n-bit-width horizontal signal line 18a, while the column AD circuits 25 connected to even (2j)-numbered columns V2, V4, . . . , are connected to a second input terminal of the digital computing unit 282 via the n-bit-width horizontal signal line 18b.

The digital computing unit 282 performs difference computation in units of two columns in the row direction based on difference data D3a obtained in the difference processing for two rows in an odd-numbered column input via the horizontal signal line 18a and difference data D3b obtained in the difference processing for two rows in an even-numbered column input via the horizontal signal line 18b, thereby outputting finial difference data (digital difference processing signal) D3.

As in the difference computation in units of two rows in the column direction shown in FIG. 3, in the difference processing by the digital computing unit 282, the difference data D3b of an even-numbered column is subtracted from the difference data D3a of an odd-numbered column by using the same coefficients as those used in the difference computation shown in FIG. 3, thereby calculating the difference data D3=D3a-D3b.

THIRD EMBODIMENT

Spatial Difference Processing Operation of Solid-State Imaging Device

Two-Dimensional Processing

First Example

Figure 13A:
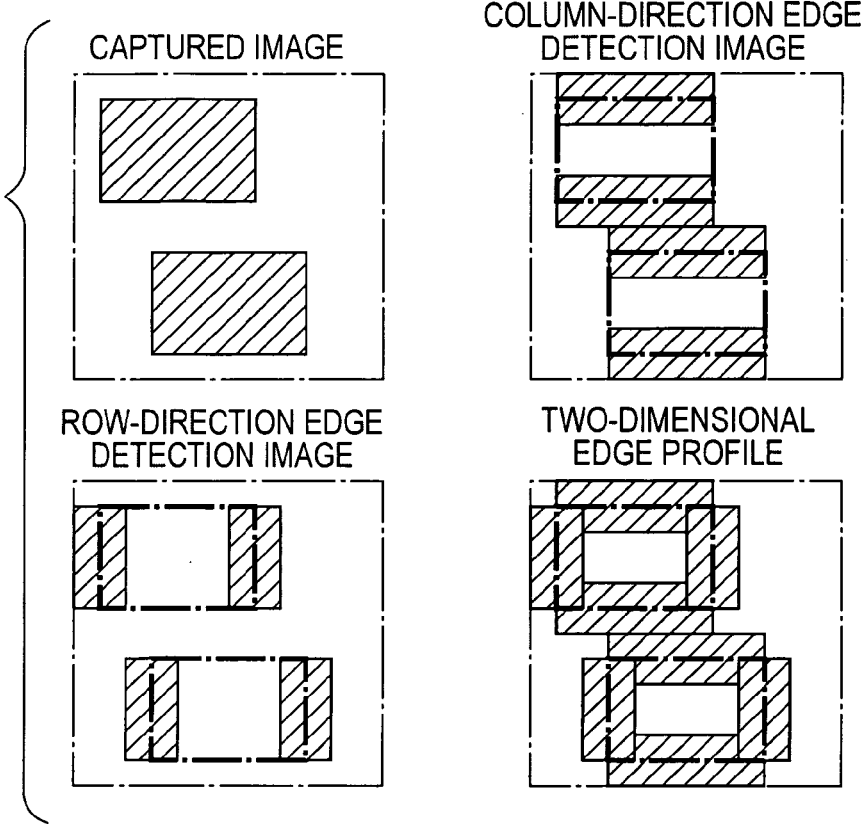
FIGS. 13A and 13B illustrate usage modes of the spatial difference processing in the configuration of the third embodiment.
Figure 13B:
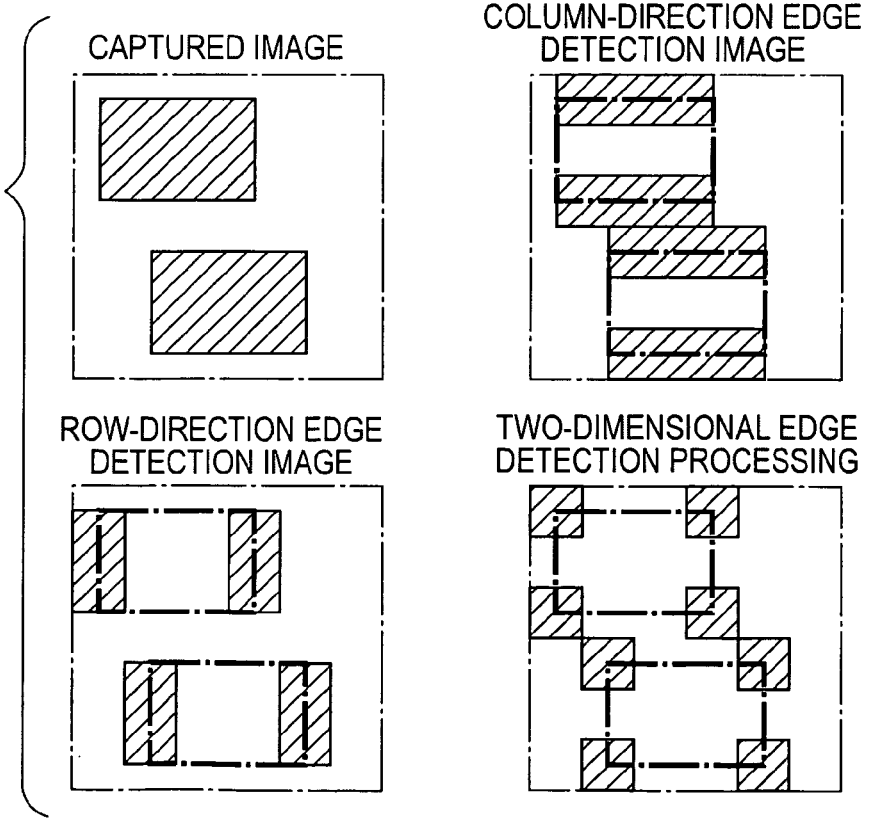

FIG. 12 is a timing chart illustrating the spatial difference processing operation in the column AD circuit 25 of the solid-state imaging device 1 of the third embodiment shown in FIG. 11. FIGS. 13A and 13B illustrate the usage modes of the spatial difference processing in the configuration of the third embodiment.

The difference processing operation for two rows in the column direction by reading out pixel signals to the column AD circuit 25 disposed in each column from each unit pixel 3 of the pixel portion 10 disposed in a matrix, i.e., the difference processing operation for the digital count values of the Hx row and the Hx+1 row by using the column AD circuit 25, is similar to that of the second embodiment.

The counters 254 of the column AD circuits 25 transfer the obtained digital count values indicating the difference results to the data storage units 256, and the data storage units 256 output the difference signals of the Hx row and the Hx+1 row of an odd-numbered column and an even-numbered column to the digital computing unit 282 via the horizontal signal lines 18a and 18b.

In this case, the horizontal scanning signals CH(i) from the horizontal scanning circuit 12 simultaneously output digital values stored in the data storage units 256 for two columns, such as CH (1) and CH (2), CH (3) and CH (4), . . . , to the horizontal signal lines 18a and 18b.

As the output signal A in the timing chart of FIG. 12, the odd-numbered column difference data D3a is output, and as the output signal B, the even-numbered column difference data D3b is output. For example, the difference result between the pixel 11 and the pixel 21 of the first column is output from the start of the output signal A, and the difference result between the pixel 12 and the pixel 22 of the second column is output from the start of the output signal B.

Accordingly, the first output of the difference data D3 output from the digital computing unit 282 is the difference data D3=D3a-D3b obtained by subtracting the difference Vsig12-Vsig22 between the first row and the second column (pixel 12) and the second row and the second column (pixel 22) from the difference Vsig11-Vsig21 between the first row and the first column (pixel 11) and the second row and the first column (pixel 21) of the unit pixel 3 shown in FIG. 11.

In the third embodiment, as in the second embodiment, the data storage unit 256 is provided, and since the counting result retained in the counter 254 of the column AD circuit 25 can be transferred to the data storage unit 256, the counting operation by the counter 254 and the reading operation for reading out the counting result to the horizontal signal lines 18a and 18b can be independently controlled.

By adjusting the number of bits of the counting operation based on the number of pixels to be subjected to the difference processing, the AD conversion period can be reduced while maintaining the dynamic range or the bit resolution. When the bit precision during the normal processing for obtaining the reset level (reference components) of a pixel signal is n bits, and when the number of pixels to be processed is m (in this embodiment, 4=2×2), the number of bits for AD conversion in the difference processing is reduced to m−1=3. Then, the AD conversion period can be reduced to 1/m without changing the gradient of the reference signal RAMP or the count clock CK0. By decreasing the AD conversion period to ¼ by reducing the bit precision of AD conversion, as shown in FIG. 12, the frame rate can be increased by four times.

As described above, according to the configuration of the third embodiment, the difference processing in the row direction can be implemented in the digital computing unit 282. For example, the counter 254 may transfer the count values to the digital computing unit 282 via the data storage unit 256 without performing the difference processing in the column direction. This enables the digital computing unit 282 to perform subtraction processing for the count values for two columns, and as a result, the row-direction difference processing for pixels of two rows can be implemented.

By the single function of the row-direction difference processing, edges can be detected in the horizontal direction, and by performing the edge detection processing in the horizontal direction for a plurality of horizontal rows, straight-line detection processing in the vertical column direction can be implemented. Although in the third embodiment the difference processing for two columns in the row direction is performed in the digital computing unit 282 disposed outside the column processor 26, advantages similar to those of the first or second embodiment concerning the difference processing in the column direction can be achieved.

A pixel signal is output from each unit pixel 3 to the vertical signal line 19 in a voltage mode. Accordingly, by providing the unit pixel 3 with a memory function element, such as a floating diffusion, for retaining electric charge obtained by the charge generator, an electric signal (voltage signal) corresponding to the charge obtained by the charge generator can be output even after the pixel signal is read out to the vertical signal line 19 until the signal charge in the unit pixel 3 is reset. By utilizing this property, the same pixel signal from the unit pixel 3 can be read for a plurality of times. With this configuration, not only in the column direction discussed in the first or second embodiment, but also in the row direction, as in the third embodiment, difference computation processing can be performed, thereby implementing a high-precision graphic recognition function.

Usage Mode of Spatial Difference Processing; Two-Dimensional Processing for Two Columns For example, as shown in FIG. 13A, first, difference processing is performed in units of two rows in the column direction to obtain a linearly projected edge profile of each column (column-direction edge detection image). Then, difference processing is performed in units of two columns in the row direction to obtain a linearly projected edge profile of each row (row-direction edge detection image). Based on the resulting two-dimensional edge profile, the shape and the number of edges are analyzed to determine the features of a graphic to be processed. The resulting graphic is compared with reference templates, and the template which is the closest to the graphic is selected.

Additionally, by combining the column-direction difference processing in units of two rows in the column direction shown in FIG. 3 and the row-direction difference processing for performing difference computation in units of tow columns by the digital computing unit 282, two-row two-column difference processing can be implemented. As the usage mode of the two-row two-column difference processing, for example, as two-dimensional edge detection processing, vertex-coordinate extraction processing or 45-degree oblique edge detection processing can be performed, as shown in FIG. 13B, thereby implementing the oblique-direction straight-line detection processing.

As discussed above, the function element for performing difference processing in the horizontal row direction by the digital computing unit 282 disposed subsequent to the column processor 26 is added to the configuration in which difference processing in the vertical column direction is performed by using the mode-switching up/down counting function of the column AD circuit 25 disposed in each vertical column. With this configuration, edge detection processing, straight line detection processing, or pattern matching processing can be expanded two dimensionally.

In this case, by stopping the difference processing function in the vertical column direction for a plurality of rows of pixel signals by using the mode-switching up/down counting function of the column AD circuit 25 disposed in each vertical column, only the difference processing function for extracting true signal components of a pixel signal containing reset components and the true signal components is operated, thereby performing difference processing for a plurality of pixel signals only in the horizontal row direction. As a result, edge detection processing, straight line detection processing, or pattern matching processing can be expanded only in the horizontal direction.

FOURTH EMBODIMENT

Configuration of Solid-State Imaging Device

Pixel Signals of Three or More Rows

Figure 14:
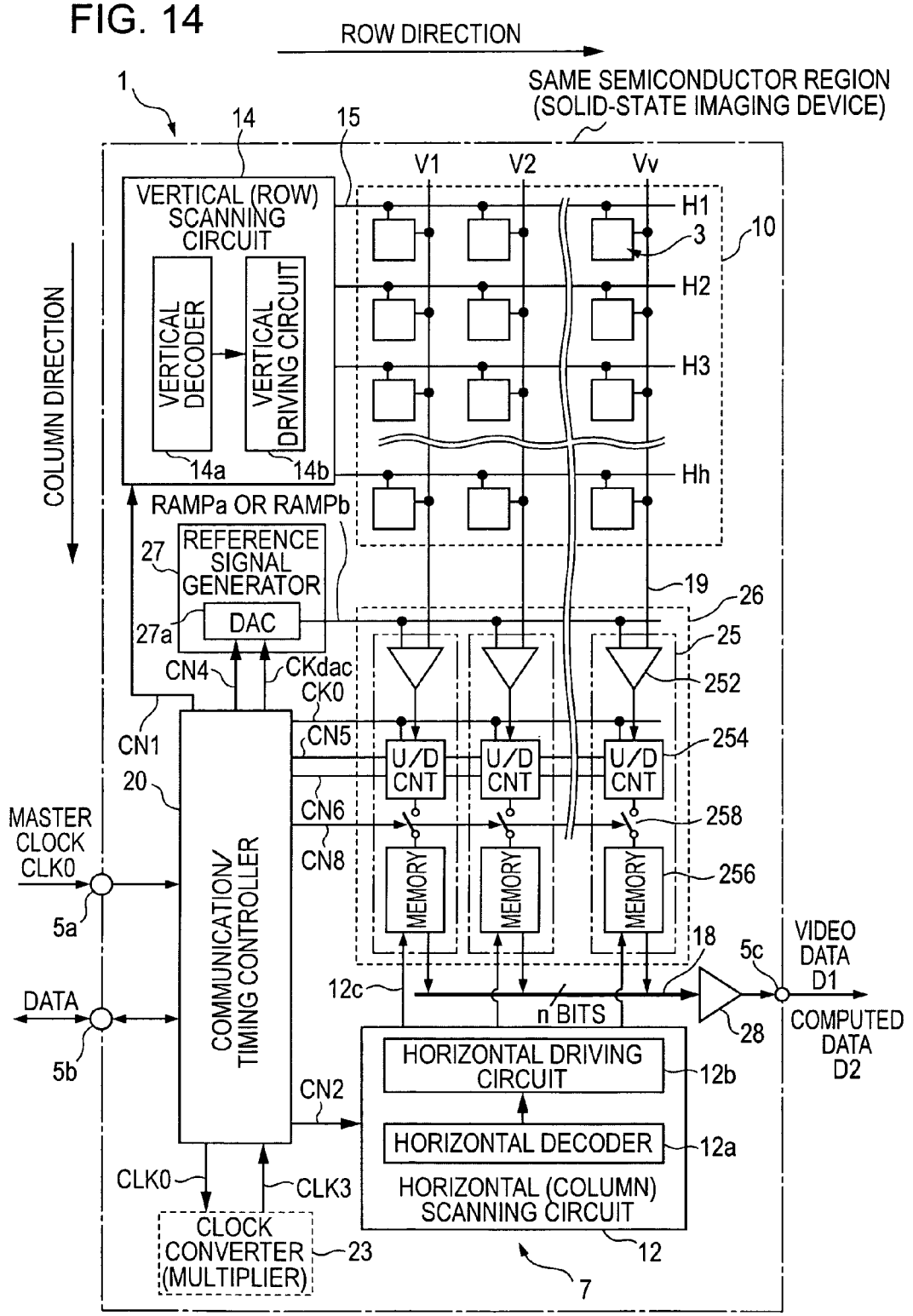
FIG. 14 is a schematic diagram illustrating a CMOS solid-state imaging device according to a fourth embodiment of the present invention.

FIG. 14 is a schematic diagram illustrating a CMOS solid-state imaging device according to a fourth embodiment of the present invention. The solid-state imaging device 1 of the fourth embodiment is characterized in that difference processing is performed for pixel signals of three or more rows and a product-sum operation with a sign can be implemented in the solid-state imaging device 1 of the second embodiment. A description is given here in the context of difference computation in units of three rows in the column direction.

The basic configuration of the solid-state imaging device 1 is similar to that of the solid-state imaging device 1 of the second embodiment. However, a DAC count clock CKdac is supplied, independently of the count clock CK0 used by the counter 254, as the count clock for generating a reference signal RAMP (ADC reference signal) to be supplied from the communication/timing controller 20 to the reference signal generator 27. The other features of the configurations are similar to those of the second embodiment.

By adjusting the cycle (frequency) of the count clock CKdac for each row, the reference signal RAMP which is different for each row can be supplied to the voltage comparator 252. Accordingly, by setting the same gradient (rate of change) of the reference signal RAMP for a pixel signal to be processed, difference processing can be performed assuming that the gradient (rate of change) of the reference signal RAMP is different. That is, after multiplying the pixel signal (more particularly, true signal components) from each unit pixel 3 with a coefficient, subtraction processing is performed. That is, a product-sum operation function to find the sum with a sign can be implemented.

FOURTH EMBODIMENT

Description of Function of Reference Signal Generator

Figure 15:
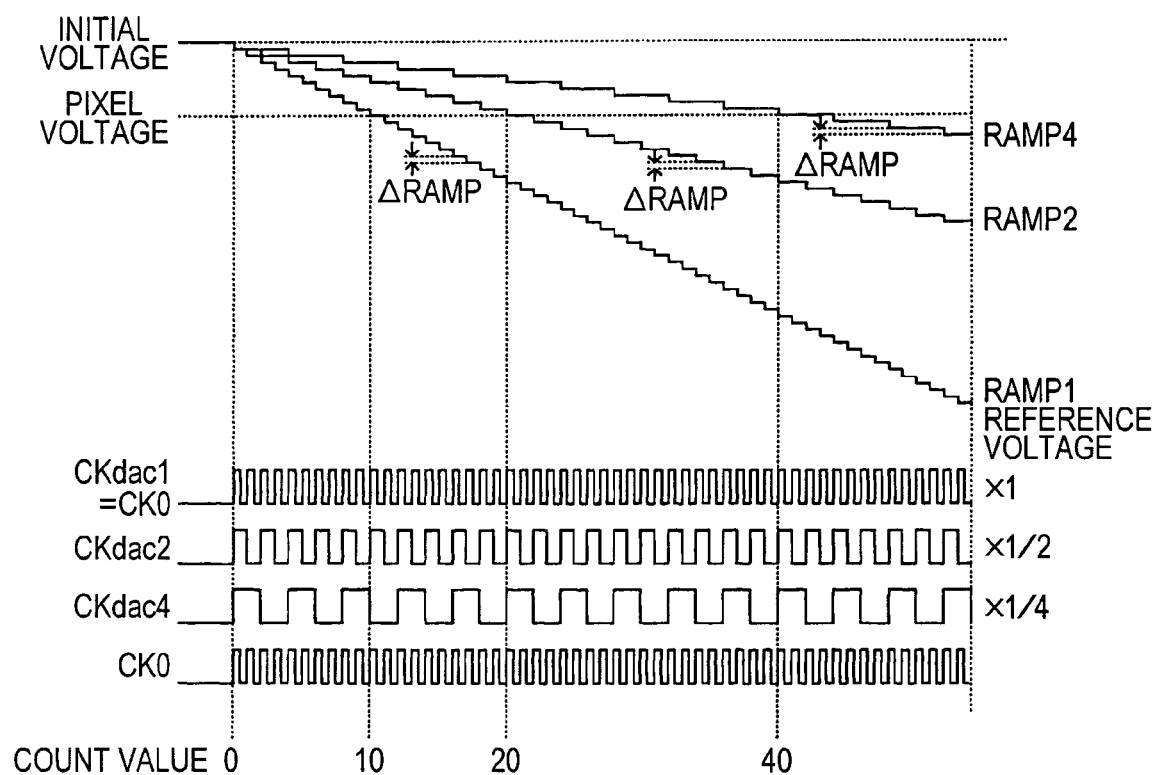
FIG. 15 illustrates the function of a DA conversion circuit of a reference signal generator used in the solid-state imaging device of the fourth embodiment.

FIG. 15 illustrates the function of the DA conversion circuit (DAC) 27a of the reference signal generator 27 used in the solid-state imaging device 1 of the fourth embodiment.

Upon receiving the DAC count clock CKdac from the communication/timing controller 20, the DA conversion circuit 27a generates a stepped saw tooth wave (ramp waveform) in synchronization with the count clock CKdac, and supplies the generated saw tooth wave to the voltage comparator 252 of the column AD circuit 25 as the AD conversion reference voltage (ADC reference signal).

The DA conversion circuit 27a sets the amount ΔRAMP by which the voltage is changed per clock based on information contained in the control data CN4 indicating the gradient (rate of change) of the ramp voltage for each comparison processing, and changes the count value per unit time (count clock CKdac). In reality, it is sufficient that the maximum voltage width with respect to the maximum number of counts (for example, 2.0 for 10 bits) of the count clock CKdac is set.

Accordingly, the DA conversion circuit 27a reduces the voltage (for example, 3.0 V) indicating the initial value contained in the control data CN4 by ΔRAMP for each count clock CKdac.

When setting the coefficient for a pixel signal (more particularly, true signal components) from the unit pixel 3, the communication/timing controller 20 supplies the count clock CKdacm scaled down to 1/m of the reference cycle of the count clock CKdac1 for setting the coefficient 1 to the DA conversion circuit 27a. The DA conversion circuit 27a reduces the voltage (for example, 3.0 V) indicating the initial value contained in the control data CN4 by ΔRAMP for each count clock CKdacm.

With this arrangement, the gradient of the reference signal RAMP to be supplied to the voltage comparator 252 is increased by the factor of 1/m compared to when the reference signal RAMP is generated with the count clock DKdac1 (=CK0), and the count value in the counter 254 is increased by the factor of m for the same pixel voltage. That is, the coefficient m can be set.

FIG. 15 shows that, as the gradient of the reference signal RAMP is larger, the coefficient multiplied with the amount of information accumulated in the unit pixel 3 is smaller, and as the gradient is smaller, the coefficient is larger. For example, by supplying the count clock CKdac2 scaled down to ½ of the reference cycle of the count clock CKdac1, the coefficient can be set to be 2, and by setting the count clock CKdac4 scaled down to ¼ of the reference cycle of the count clock CKdac1, the coefficient can be set to be 4. By supplying the count clock CKdacnm scaled down to n/m, the coefficient can be set to be m/n.

By adjusting the cycle of the count clock CKdacnm supplied to the reference signal generator 27 while changing (reducing in this embodiment) the voltage by ΔRAMP for each count clock CKdacm, the coefficient can be easily and precisely set. By adjusting the mode of the counting operation for the signal components Vsig of the pixel signal, the sign (+/−) of the coefficient can be specified.

The method for setting the coefficient is an example only, and another type of circuit may be used. For example, when the output value of the counter 254 is x and when the gradient (rate of change) of the ramp voltage contained in the control data CN4 is β while the cycle of the count clock CKdac supplied to the reference signal generator 27 is fixed, the potential calculated by y=α(initial value)−β*x is output. In this manner, according to the information indicating the gradient (rate of change) of the ramp voltage contained in the control data CN4, a change in the voltage ΔRAMP for each count clock CKdac can be adjusted.

FOURTH EMBODIMENT

Spatial Difference Processing Operation

Figure 16:
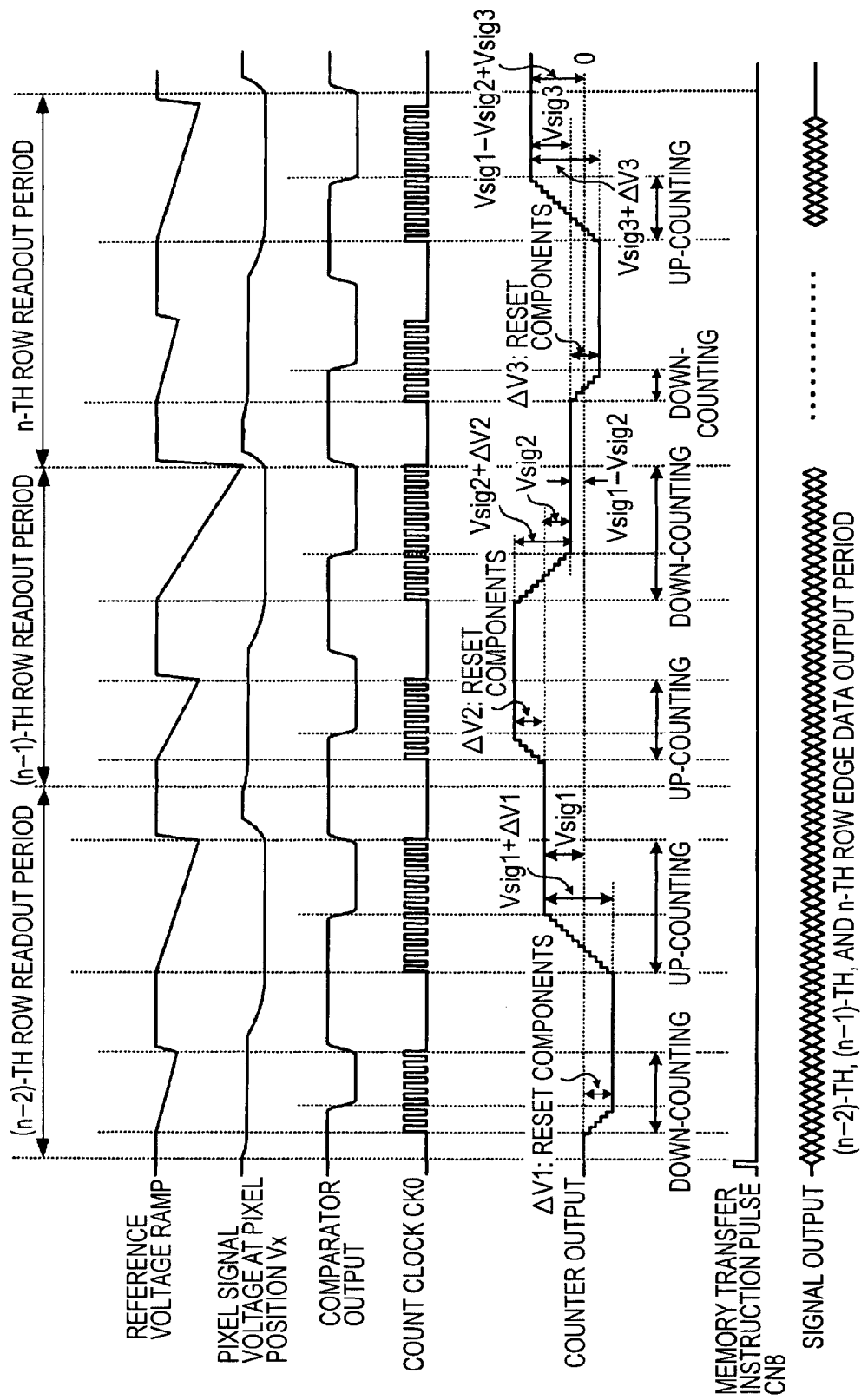
FIG. 16 is a timing chart illustrating the spatial difference processing operation in the column AD circuit of the solid-state imaging device of the fourth embodiment.

FIG. 16 is a timing chart illustrating the spatial difference processing operation in the column AD circuit 25 of the solid-state imaging device 1 of the fourth embodiment shown in FIG. 14. According to the configuration of the fourth embodiment, in performing a product-sum operation for a plurality of pixel signals, different coefficients can be supplied to perform subtraction processing or addition processing.

In this example, in performing the counting operation in the counter 254 of the column AD circuit 25, the coefficient α1 applied to the "3j-2" lines H1, H4, . . . (j is a positive integer of one or greater) is 1, the coefficient α2 applied to the "3j-1" lines H2, H5, . . . is −2, and the coefficient α3 applied to the "3j" lines H3, H6, . . . is 1. Accordingly, for the signal components Vsig of the pixel signal, the communication/timing controller 20 controls the counter 254 to perform up-counting for the "3j-2" lines, down-counting for the "3j-1" lines, and up-counting for the "3j" lines.

Thus, the count value retained in the counter 254 after completing the third counting operation for the 3j-th pixel signal V3j is n-bit digital data representing the difference processing result (addition/subtraction; product-sum operation using values with signs) between the three pixel signals Vj3-2, V3j-1, and V3j (Vsig1−2·Vsig2+Vsig3), as expressed by Equation 5.

Equation 5:

$$\alpha1(\text{signal components } Vsig1) - \alpha2(\text{signal components } Vsig2) + \\ \alpha3(\text{signal components } Vsig3) = (\text{signal components } Vsig1) - \\ 2(\text{signal components } Vsig2) + (\text{signal components } Vsig3)$$ (5)

Although in the fourth embodiment the product-sum operation including the difference computation in units of three rows has been discussed, it can be performed in units of four or more rows. In this case, the same gradient (rate of change) may be used for some pixels, and different gradients (rates of change) may be used for the other pixels.

Concerning the pixel signal of the last line of a plurality of lines to be processed, the count value retained in the counter 254 after completing the second counting operation is the n-bit digital value representing the product-sum operation (addition/subtraction; product-sum operation using values with signs) result between k pixel signals V1, V2, . . . , Vk, as expressed by Equation 6. It should be noted that the coefficient βk contains a sign.

Equation 6:

$$\beta1·Vsig1+\beta2·Vsig2+ \ldots +\beta k·Vsigk$$ (6)

Usage Mode of Spatial Difference Processing; Three or More Rows

FIGS. 17A through 17F illustrate a usage mode of the spatial difference processing in the configuration of the fourth embodiment. As discussed with reference to FIG. 16, by using the up/down counting function of the counter 254, addition/subtraction (product-sum operation with a sign) processing is implemented over three or more rows so as to obtain various processed images. As one of the usage modes, a linear spatial filtering function can be implemented without using a special circuit outside the column processor 26.

Figure 17A:
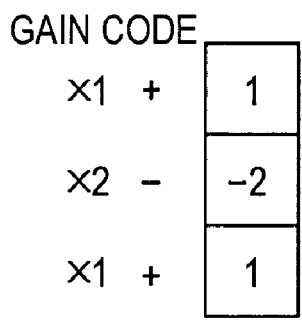
FIGS. 17A through 17F illustrate usage modes of the spatial difference processing in the configuration of the fourth embodiment.
Figure 17B:
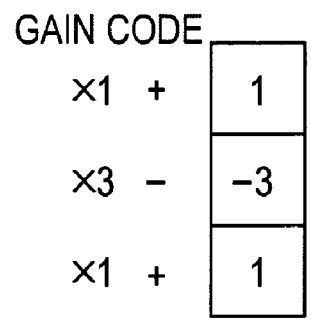

FIGS. 17A through 17F illustrate examples of spatial filters obtained when performing a product-sum operation over three or more rows. By adjusting the gradient of the reference signal RAMP supplied from the reference signal generator 27 for each row, the filter coefficients can be set as desired. For example, as shown in FIG. 17A, the filter coefficients can be set to be 1, −2, 1, or as shown in FIG. 17B, the filter coefficients can be set to be 1, −3, 1, thereby implementing a spatial filter for enhancing the center pixel.

Figure 17C:
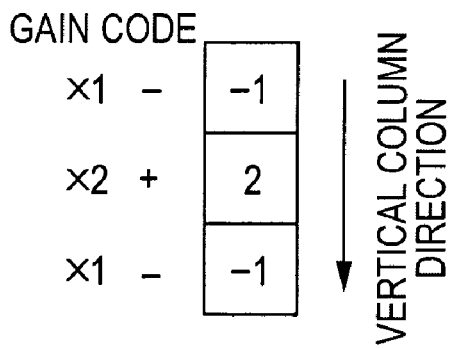
Figure 17D:
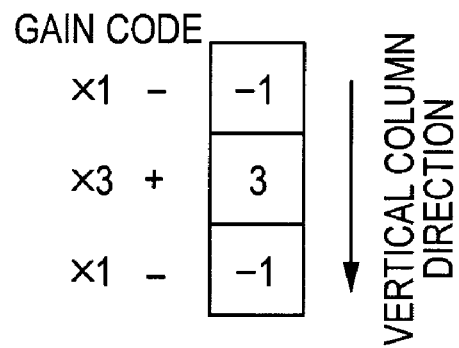

Additionally, by adjusting the mode of the counting operation for the signal components Vsig of a pixel signal, the signs (+/−) of the coefficients can be designated. For example, as shown in FIG. 17C, the coefficients can be set to be −1, 2, −1, or as shown in FIG. 17D, the coefficients can be set to be −1, 3, −1, thereby implementing a spatial filter for enhancing the center pixel having characteristics opposite to those shown in FIGS. 17A and 17B.

Figure 17E:
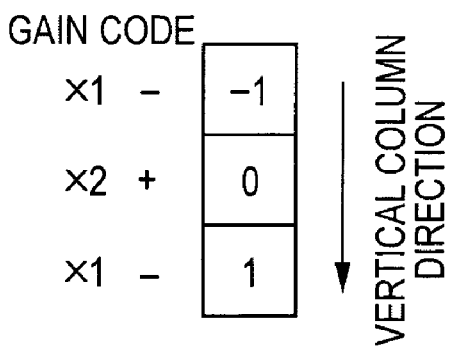
Figure 17F:
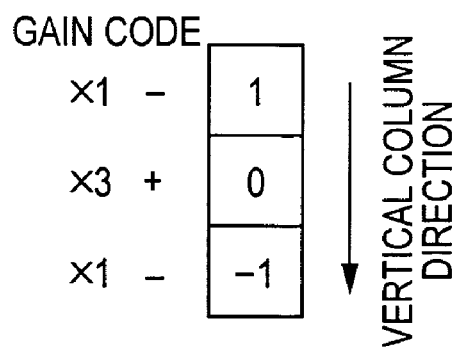

By stopping the counting operation for a specific pixel, the coefficients can be set to be 0. For example, as shown in FIG. 17E, the coefficients can be set to be −1, 0, 1, or as shown in FIG. 17F, the coefficients can be set to be 1, 0, −1, thereby implementing a differential filter in the vertical column direction.

As is seen from the above-described advantages, discrete cosine transform, which is frequently used in image compression processing, can be implemented. In discrete cosine transform, it is necessary that, for example, 8×8 pixels be multiplied by a cosine coefficient before adding the resulting values, and also, the cosine coefficient has a sign. Thus, when computation using positive and negative signs is required, as in discrete cosine transform, the required function can be easily implemented by applying the configuration of the fourth embodiment.

FIFTH EMBODIMENT

Configuration of Solid-State Imaging Device

Two-Dimensional Processing for Three or More Columns

Figure 18:
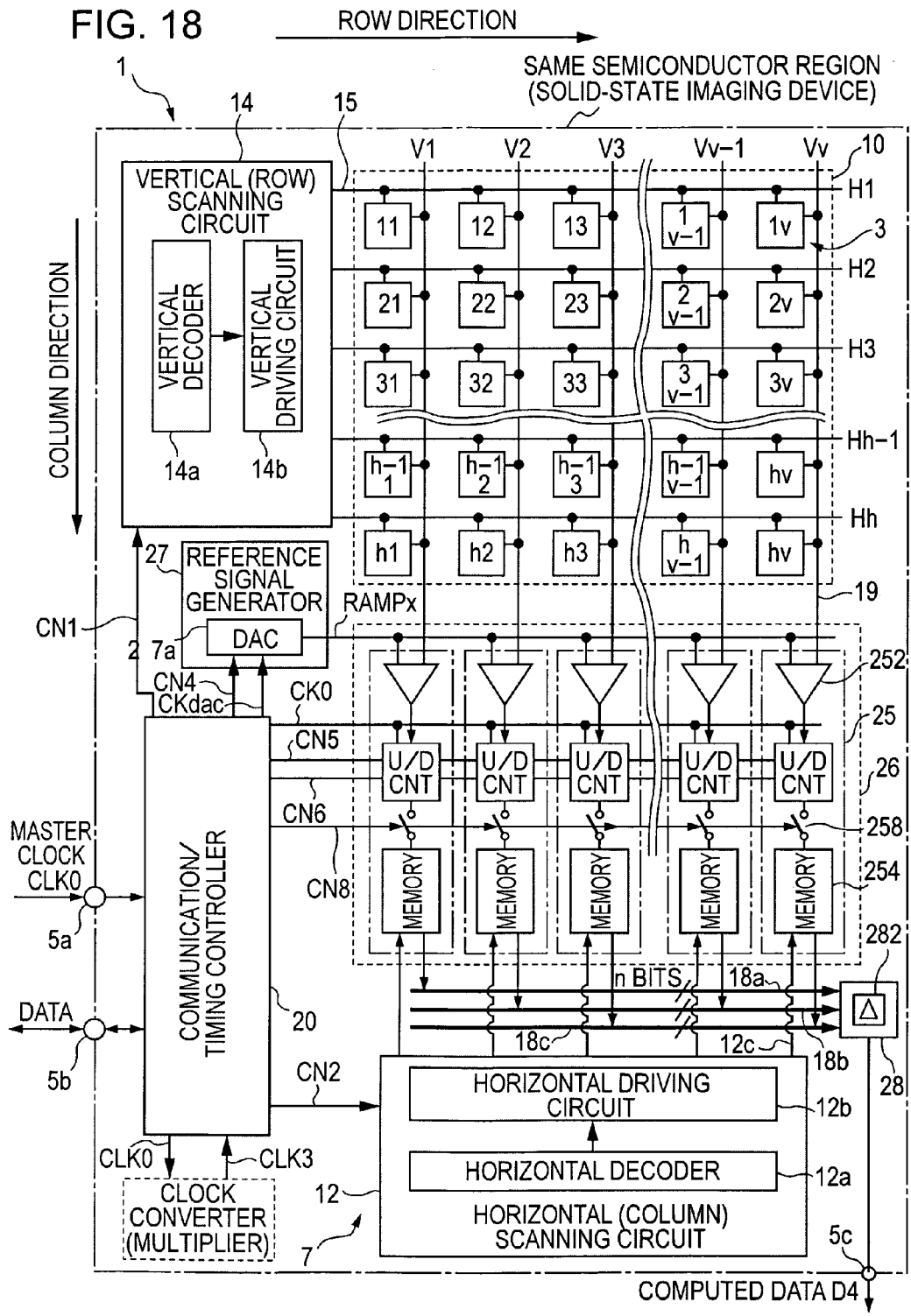
FIG. 18 is a schematic diagram illustrating a CMOS solid-state imaging device according to a fifth embodiment of the present invention.

FIG. 18 is a schematic diagram illustrating a CMOS solid-state imaging device according to a fifth embodiment of the present invention. The solid-stage imaging apparatus 1 of the fifth embodiment is characterized in that an element for performing difference processing in the row direction is added to the solid-stage imaging apparatus 1 of the fourth embodiment. The solid-stage imaging apparatus 1 of the fifth embodiment is characterized in that an element for implementing the spatial difference processing in the row direction is added to the solid-stage imaging apparatus 1 of the second embodiment, and in that the "two-row×two-column" solid-stage imaging apparatus 1 of the third embodiment shown in FIG. 11 is modified for three or more columns.

A description is given below in the context of the three row×three column imaging apparatus for performing a product-sum operation in units of three columns in the row direction in accordance with the product-sum operation in units of three rows in the column direction shown in FIG. 16. Although an explanation is not given here, if a product-sum operation is performed in units of three columns in the row direction in accordance with the difference processing in units of two rows in the column direction, a two-row×three-column imaging apparatus can be configured. If a product-sum operation is performed in units of four or more columns (k columns) in the row direction in accordance with the product-sum operation in the units of j rows in the column direction, a j-row×k-column imaging apparatus can be configured.

As the major function element for performing a product-sum operation in the row direction, the solid-state imaging device 1 is provided with the digital computing unit 282 for performing a product-sum operation including n-bit subtraction processing in the output circuit 28. Three n-bit horizontal signal lines 18 (18a, 18b, and 18c) are disposed between the column processor 26 and the digital computing unit 282 of the output circuit 28.

The column AD circuits 25 connected to the 3j-2 columns V1, V4, ... (j is a positive integer of one or greater, and the same applies to the following description in this embodiment) are connected to a first input terminal of the digital computing unit 282 via the n-bit-width horizontal signal line 18a. The column AD circuits 25 connected to the 3j-1 columns V2, V5, ... are connected to a second input terminal of the digital computing unit 282 via the n-bit-width horizontal signal line 18b. The column AD circuits 25 connected to the 3j columns V3, V6, ... are connected to a third input terminal of the digital computing unit 282 via the n-bit-width horizontal signal line 18c.

The digital computing unit 282 performs a product-sum operation accompanying the difference computation for three columns in the row direction based on difference data D4a for the 3j-2 column input via the horizontal signal line 18a, difference data D4b for the 3j-1 column input via the horizontal signal line 18b, and difference data D4c for the 3j column input via the horizontal signal line 18c, thereby outputting final digital computed data D4.

In this embodiment, since the counting result retained in the counter 254 can be transferred to the memory device 256, the counting operation by the counter 254 and the reading operation for reading out the counting result to the horizontal signal line 18 can be independently controlled, thereby implementing the row-direction difference processing for pixels of three columns.

By combining the row-direction difference processing with the column-direction difference processing in units of three rows in the column direction shown in FIG. 16, three-row three-column difference processing can be implemented. Although the solid-stage imaging apparatus 1 is configured such that the digital computing unit 282 disposed outside the column processor 26 performs the difference processing for three columns in the row direction, advantages similar to those obtained by the first or second embodiment concerning the difference processing in the column direction can be achieved.

The timing chart for the spatial difference processing operation in the column AD circuit 25 of the solid-state imaging device 1 of the fifth embodiment shown in FIG. 18 is not shown. Basically, however, the fourth embodiment in which the difference processing for three rows in the column direction shown in FIG. 16 can be applied to the third embodiment in which the difference processing in the row direction is performed, as shown in FIG. 12.

Accordingly, the horizontal scanning signals CH(i) from the horizontal scanning circuit 12 simultaneously output the digital values stored in the data storage units 256 of the column AD circuits 25 for three columns, such as CH(1), CH(2), and CH(3), CH(4), CH(5), and CH(6), ..., to the horizontal signal lines 18a, 18b, and 18c.

Thus, the first output of the difference data D4 output from the digital computing unit 282 is the result (D4=γ1·D4a-γ2·D4b-γ3·D4c) obtained by subtracting the difference γ2·(Vsig12−Vsig22+Vsig32) between the first row and the second column (pixel 12), the second row and the second column (pixel 22), and the third row and the second column (pixel 32) from the difference γ1·(Vsig11−Vsig21+Vsig31) between the first row and the first column (pixel 11), the second row and the first column (pixel 21), and the third row and the first column (pixel 31) and by adding the difference γ3·(Vsig13−Vsig23+Vsig33) between the first row and the third column (pixel 13), the second row and the third column (pixel 23), and the third row and the third column (pixel 33) to the above subtraction result. It is now assumed that the coefficient γk does not contain a sign.

In this embodiment, as in the second embodiment, the data storage unit 256 is provided, and since the counting result retained in the counter 254 of the column AD circuit 25 can be transferred to the data storage unit 256, the counting operation by the counter 254 and the readout operation for reading out the counting result to the horizontal signal lines 18a, 18b, and 18c can be independently controlled. By decreasing the AD conversion period to ⅑ (⅓·⅓) by reducing the bit precision of AD conversion, the frame rate can be increased by nine times.

In this embodiment, as in the fourth embodiment, if the coefficients γk is set to be 1, −2, 1, in the difference processing by the digital computing unit 282, the coefficient γ1 for the 3k-2 columns V1, V4, ..., (k is a positive integer of one or greater, and the same applies to the following description in this embodiment) is 1, the coefficient γ2 for the 3k-1 columns V2, V5, ..., is −2, and the coefficient 73 for the 3k columns V3, V6, ..., is 1. As a result, the difference data D4=D3a-2·D3b+D3c can be output from the digital computing unit 282.

As described above, according to the configuration of the fifth embodiment, as in the configuration of the third embodiment, the row-direction difference processing for three or more columns can be implemented in the digital computing unit 282. By the single use of the row-direction difference processing, horizontal-direction spatial filtering processing can be implemented.

By combining the column-direction difference processing in units of three rows in the column direction shown in FIG. 16 and the row-direction difference processing in units of three or more columns by the digital computing unit 282, two-dimensional spatial filtering processing having coefficients symmetrical with each other in the column direction and/or in the row direction can be implemented.

Usage Mode of Spatial Difference Processing; Two-Dimensional Processing for Three or More Columns FIGS. 19A through 19F illustrate the usage mode of the spatial difference processing in the configuration of the fifth embodiment and also illustrate examples of two-dimensional spatial filters formed in this embodiment.

For example, by the single use of the row-direction difference processing, spatial filtering processing in the horizontal direction can be implemented, and as a result, as shown in FIG. 19A, a two-dimensional spatial filter for detecting vertical segments can be formed. Additionally, since the coefficients for a specific row can be set to be 0, as shown in FIG. 19B, a horizontal-direction differential filter can be implemented.

Additionally, by a combination of column-direction difference processing in units of three rows in the column direction and the row-direction difference processing in units of three columns by the digital computing unit 282, three-row three-column difference processing can be implemented. As the usage mode for the three-row three-column difference processing, the coefficients for the difference processing both in the column direction and the row direction can be set to be 1, −2, 1, as shown in FIG. 19C, thereby implementing two-dimensional spatial filtering processing for enhancing the center pixel in relation to the 8 adjacent pixels, i.e., unsharp masking filtering processing, which is a so-called Roberts operator, as the three-row three-column spatial filter. By changing the second coefficient from 2 to, for example, 3, as shown in FIG. 19D, unsharp masking filtering processing with a higher level of enhancement can be implemented.

As discussed above, according to the fifth embodiment, the multiple-input product-sum operation on the unit pixels 3 in a matrix can be easily implemented. Since the pixel signals from the unit pixels 3 can be disposed, a spatial filter can be applied, and the spatial filter can be easily implemented on the CMOS image sensor. A two-dimensional unsharp masking filter for enhancing the edges of an image can also be easily implemented. Additionally, discrete cosine transform, which is frequently used in image compression processing, can be implemented two-dimensionally.

Application to Addition Computation

As is understood from the foregoing description, by using the same count modes for pixel signals, the coefficients for the counting operation can be set to be all positive or negative. This means that only the addition processing is performed. Also, since the coefficients can be set by changing the gradient of the reference signal RAMP supplied from the reference signal generator 27, filter processing that cannot be implemented by the product-sum operation including the subtraction operation can be implemented. For example, if all the coefficients for the pixel signals to be processed are set to be the same, smoothing filter processing, such as that shown in FIG. 19E, can be implemented. If the coefficient for the center pixel is set to be larger than that for the peripheral pixels, weight-addition processing, such as that shown in FIG. 19F, for enhancing the center pixel can be implemented.

SIXTH EMBODIMENT

Configuration of Solid-State Imaging Device

First Example of Two-Dimensional Processing for Certain Column

Figure 20:
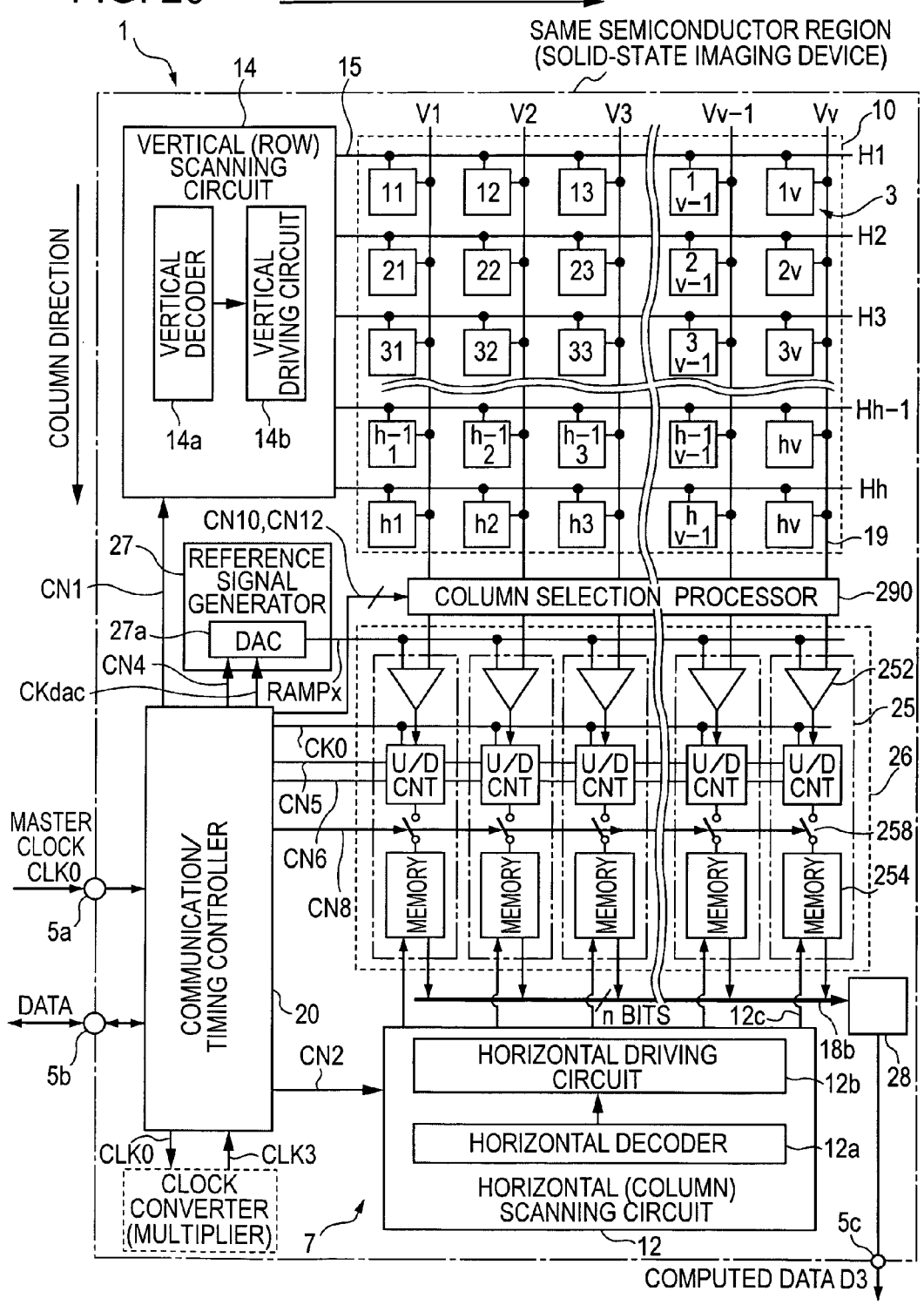
FIG. 20 is a schematic diagram illustrating a CMOS solid-state imaging device according to a sixth embodiment of the present invention.

FIG. 20 is a schematic diagram illustrating a CMOS solid-state imaging device according to a sixth embodiment of the present invention. As in the solid-stage imaging apparatus 1 of the fifth embodiment, the solid-state imaging device 1 of the sixth embodiment is characterized in that an element for performing difference processing in the row direction is added. That is, by switching analog pixel signals transferred from the unit pixels 3 to the column processors 26 via the vertical signal lines 19 to one of the plurality of column AD circuits 25 disposed in a column-parallel structure by a change-over switch, the row-direction difference processing can also be performed.

In the configuration of the fifth embodiment, the row-direction difference processing function is implemented by the digital computing unit 282. In the configuration of the sixth embodiment, a column selection processor 290 for inputting a pixel signal detected in the unit pixel 3 into one of the column AD circuits 25 disposed in a column-parallel structure by switching the vertical signal lines 19 is provided between the pixel portion 10 and the column processor 26.

Two switching control signals CN10 and CN12 for controlling the selection operation of the column selection processor 290 are input into the column selection processor 290. The column selection processor 290 forms, together with the vertical scanning circuit 14 and the communication/timing controller 20, a unit signal selection controller. In this embodiment, the column processor 26 and the column selection processor 290 form a data processing apparatus for obtaining digital data representing a product-sum operation result of a plurality of signals.

FIG. 21 illustrates an example of the configuration of the column selection processor 290 used in the solid-state imaging device 1 of the sixth embodiment. The column selection processor 290 is a set of change-over switches formed of a change-over switch set 292 having one-input many-output change-over switches 292a for selecting a vertical signal line 19 and for inputting the pixel signal of the vertical signal line 19 into one of the column AD circuits disposed in a column-parallel structure and a change-over switch set 292 having many-input one-output change-over switches 294a. In this embodiment, for implementing the processing for three columns, the change-over switches 292a are one-input three-output switches, and the change-over switches 294a are three-input one-output switches.

That is, one input side of each of the one-input three-output change-over switches 292a is connected to the corresponding vertical signal line 19. The output side of each of the three-input one-output change-over switches 294a is connected to the corresponding column AD circuit 25 (more particularly, the voltage comparator 252).

The change-over switch 292a selects, under the control of the switching control signal CN10, one of the vertical signal lines 19 and transfers the pixel signals to the corresponding input terminals of the change-over switches 294a via the output terminals of the change-over switch 292a. The change-over switch 294a selects, under the control of the switching control signal CN12, one of the pixel signals input into the three input terminals and transfers the selected pixel to the voltage comparator 252 of the corresponding column AD circuit 25 via the output terminal of the change-over switch 294a.

In FIG. 21, the column AD circuit 25 is configured to receive pixel signals from the three adjacent vertical signal lines 19 under the control of the switching control signals CN10 and CN12. However, various modifications may be made to the association of the column AD circuit 25 with the vertical signal lines 19, for example, one column AD circuit 25 may be assigned to the vertical signal lines 19 for three columns at every three lines.

In this example, the column selection processor 290 is adapted to switch the regular structure in which one column AD circuit 25 is assigned to one vertical signal line 19 and the structure in which one column AD circuit 25 is assigned to three vertical signal lines 19. However, if only the structure in which one column AD circuit 25 is assigned to three vertical signal lines 19 is provided, the change-over switch set 292 can be removed, and one column AD circuit 25 can be disposed for three vertical signal lines 19.

Usage Mode Of Spatial Difference Processing; First Example of Two-Dimensional Processing for Certain Column FIGS. 22A through 22E illustrate examples of the usage modes of the spatial difference processing in the configuration of the sixth embodiment. In the solid-state imaging device 1 of the sixth embodiment provided with the column selection processor 290 shown in FIG. 21, the counting operation for a plurality of rows in the column direction can be performed by switching the vertical signal lines 19 to be processed, i.e., by scanning in the row direction (over a plurality of columns).

As the processing order in the row direction and the column direction, the following first scanning method can be employed, as shown in FIG. 22A. First, the counting operation for j rows in the column direction is performed while selecting a certain vertical signal line 19, and the count data D10 obtained by this processing is set as the initial value for the subsequent counting operation (in this embodiment, without resetting the count value of the counter 254). Then, the vertical signal lines 19 are switched, and the counting operation for the same j rows in the column direction is performed. This processing is repeated for k columns to be processed.

As shown in FIG. 22B, the following second scanning method can be employed. The counting operation is performed for a certain vertical scanning line 19 while a certain horizontal row Hx is being selected, and the count value obtained by this operation is set as the initial value of the subsequent counting operation (in this embodiment, without resetting the count value in the counter 254). Then, by switching the vertical signal lines 19, the counting operation is sequentially performed for the same horizontal row Hx. After the counting operation is completed for all the columns (k columns), the horizontal row to be processed is switched, and the counting operation is performed for all the columns (k columns) by switching the vertical signal lines 19. This processing is repeated for j rows. Alternatively, the third scanning method for scanning in the oblique direction, so-called "zig-zag scanning", can be employed.

According to the row or the column to be subjected to the counting operation, the gradient of the reference signal RAMP can be adjusted, or the count mode for the signal components Vsig (reset components) of a pixel signal can be set to be the up (down)-counting mode or the down (up)-counting mode, thereby performing a product-sum operation while switching the coefficient ηjk (with a sign) for each of the j-row k-column unit pixels 3 to be processed.

In any one of the first through third scanning methods, the counting operation can be performed while independently supplying the reference signal RAMP to the j-row k-column pixel, and the coefficient ηjk (with a sign) for each counting operation can be set as desired. Accordingly, in the third or fifth embodiment, the two-dimensional coefficients can be disposed only symmetrical with each other in the column direction and/or the row direction. In contrast, in this embodiment, the coefficients can be set flexibly. Accordingly, a vertical-direction detection filter, such as that shown in FIG. 22D, or a right-oblique-direction detection filter, such as that shown in FIG. 22E, can be formed.

In the first or second scanning method, it is possible that many coefficients with the same sign may be disposed depending on the arrangement of filter coefficients, and a sufficient number of bits of the counter 254 should be allowed to prevent the computation result from exceeding the dynamic range while the computation is being performed. In contrast, in the third scanning method, scanning can be conducted so that the sum of coefficients with signs is converged into zero, and the computation result does not exceed the dynamic range while the computation is being performed even if a sufficient number of bits of the counter 254 is not allowed.

SEVENTH EMBODIMENT

Configuration of Solid-State Imaging Device

Second Example of Two-Dimensional Processing For Certain Column

Figure 23:
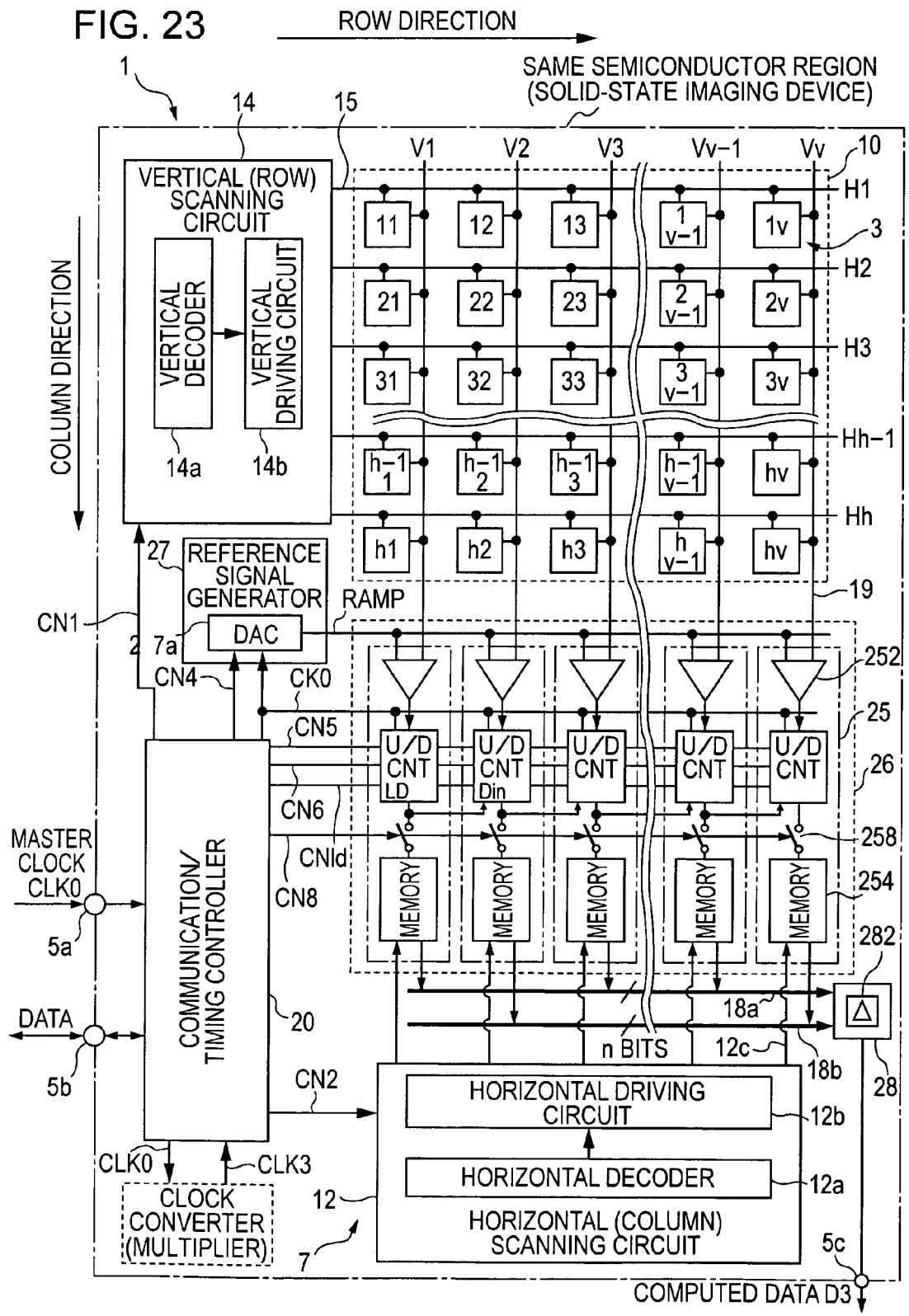
FIG. 23 is a schematic diagram illustrating a CMOS solid-state imaging device according to a seventh embodiment of the present invention.

FIG. 23 is a schematic diagram illustrating a CMOS solid-state imaging device according to a seventh embodiment of the present invention. As in the solid-state imaging device 1 of the fifth or sixth embodiment, the solid-state imaging device 1 of the seventh embodiment is characterized in that an element for performing difference processing in the row direction is added. In particular, in the configuration of the seventh embodiment, the counter 254 is configured to load a certain initial value by using known art.

The initial-value setting load control signal CNld is input into the load terminal LD of each counter 254, and the output data of the previous counter 254 is input into the corresponding data setting terminal Din of the subsequent counter 254. With this configuration, the column AD circuits 25 (more particularly, the counters 254) disposed in the column-parallel structure are cascade-connected in the row direction.

A description is given below in the context of the three-row three-column product-sum operation. However, this is an example only, and the number of combinations of rows and columns may be set as desired. In the configuration of this embodiment, the first scanning method shown in FIG. 22A is employed, and the counting operation is performed for each vertical column. Accordingly, it is preferable that control lines may be disposed for achieving a reduction in the power consumption by stopping the operation of the counters 254 of the vertical columns which are not subjected to the counting operation.

In the configuration of the seventh embodiment, upon completing the counting operation for the previous column, before starting the counting operation after setting the count mode for the subsequent column, the count value obtained for the counting operation in the counter 254 of the previous column is set as the initial value for the counter 254 of the subsequent column, thereby implementing the product-sum operation in the row direction.

For example, first, in the counters 254 of the first column, difference processing is performed for three rows of the first column in the column direction. In this case, the reference signal RAMP supplied from the reference signal generator 27 can be set for each row of the first column. Upon completing the counting operation for the first column, for the second column, before starting the counting operation after setting the count mode by the count-mode-switching control signal CN5, the load control signal CNld for setting the initial value is supplied to the load terminal LD, thereby setting the count value obtained by the counting operation in the counters 254 of the first column to be the initial value for the counters 254 of the second column. Thereafter, difference processing is performed for three rows in the column direction while setting the reference signal RAMP for each row of the second column.

Upon completing the counting operation for the second column, for the third column, before starting the counting operation after setting the count mode by the count-mode-switching control signal CN5, the load control signal CNld for setting the initial value is supplied to the load terminal LD, thereby setting the count value obtained by the counting operation in the counters 254 of the second column to be the initial value for the counters 254 of the third column. Thereafter, difference processing is performed for three rows in the column direction while setting the reference signal RAMP for each row of the third column. With this arrangement, a product-sum operation can be performed for three rows and three columns.

At a predetermined timing after completing the counting operation for the third column, before starting the counting operation for the subsequent three rows, the communication/timing controller 20 supplies the memory transfer instruction pulse CN8 to the switches 258 to supply the counting result to the data storage units 258. In this case, since the count values obtained by performing the product-sum operation for the three rows and three columns are stored in the counters 254 in every three columns, the correct computation results are stored in the data storage units 258 in every three columns.

Thereafter, at a predetermined timing, the communication/timing controller 20 instructs the horizontal scanning circuit 12 to read out the pixel data. In response to this instruction, the horizontal scanning circuit 12 sequentially shifts the horizontal selection signals CH(i) to be supplied to the counters 254 via the control lines 12c. In this case, since the correct computation results are stored in the data storage units 256 in every three columns, the data is read out to the horizontal signal lines 18 from the data storage units 256 in every three columns.

As in the sixth embodiment, in the configuration of the seventh embodiment, the counting operation can be performed while independently supplying the reference signal RAMP to each j-row k-column pixel. Accordingly, the coefficient ηjk (with a sign) for each counting operation can be set as desired, and the setting of the coefficients can become flexible. With this arrangement, as in the sixth embodiment, a vertical-direction detection filter, such as that shown in FIG. 22D, or a right-oblique-direction detection filter, such as that shown in FIG. 22E, can be formed.

In FIG. 23, the output data of the previous counter 254 is input into the corresponding data setting terminal Din of the subsequent counter 254. However, if, within the j-row k-column range, the output data of a certain counter 254 is input into the corresponding data setting terminals Din of all the other counters 254, the second scanning method shown in FIG. 22B or the zigzag scanning (third scanning method) shown in FIG. 22C can be employed.

Alternatively, only the product-sum operation in the row direction may be performed by using the initial-value setting function in the plurality of column AD circuits 25, and also, the digital computing unit 282, such as that in the third embodiment, may be provided. In this case, the digital computing unit 282 receives a plurality of digital data as the product-sum operation result in the column AD circuits 25 in the row direction, and performs the product-sum operation in the column direction based on the plurality of digital data, thereby implementing a two-dimensional product-sum operation on the whole.

EIGHTH EMBODIMENT

Configuration of Solid-State Imaging Device

Color Imaging

Figure 24:
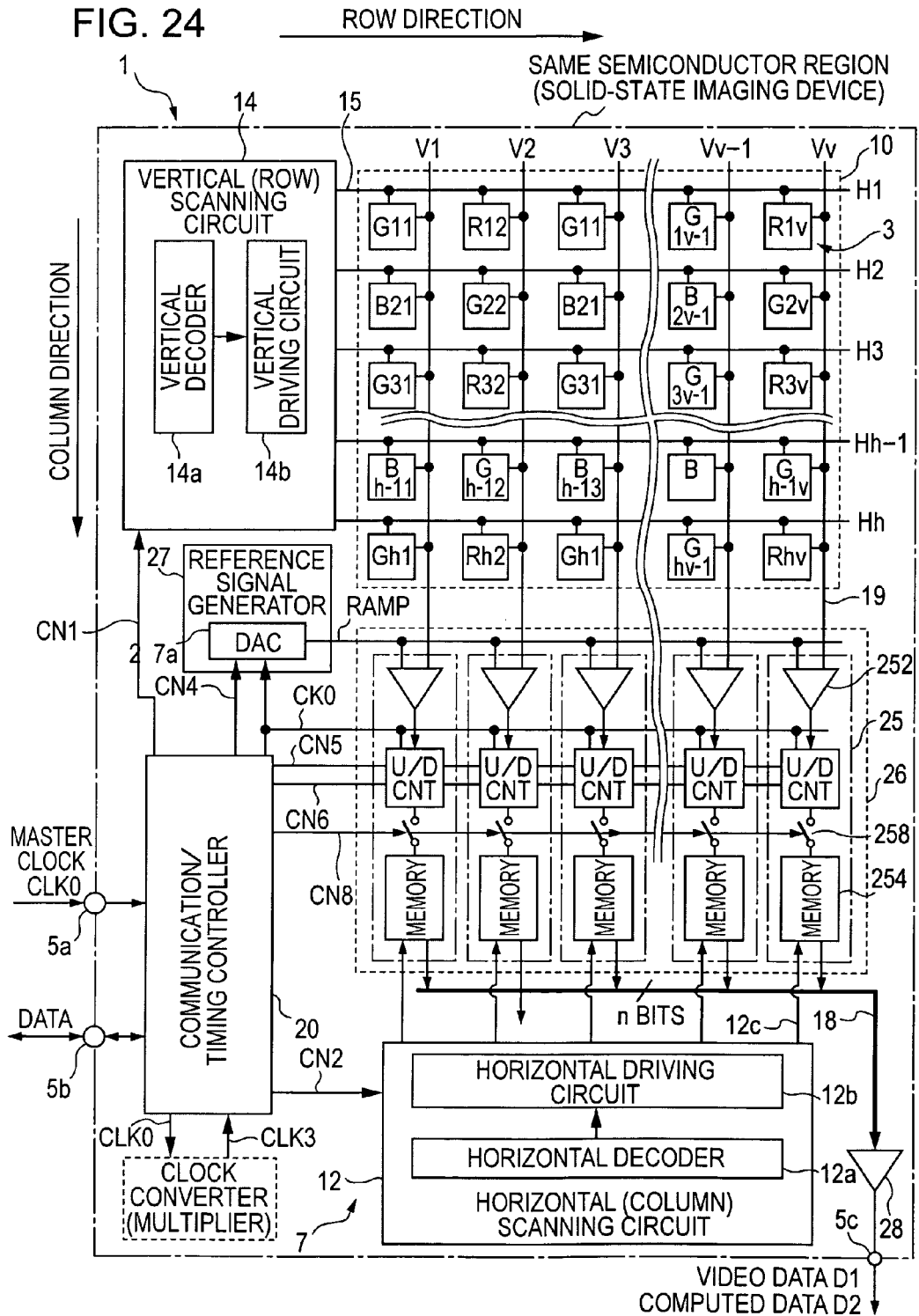
FIG. 24 is a schematic diagram illustrating a CMOS solid-state imaging device according to an eighth embodiment of the present invention.

FIG. 24 is a schematic diagram illustrating a CMOS solid-state imaging device according to an eighth embodiment of the present invention. The solid-state imaging device 1 of the eighth embodiment is characterized in that the pixel portion 10 is configured to perform color imaging in the solid-state imaging device 1 of the second embodiment. This configuration is effective for performing difference computation for the same color components.

On the light-receiving surface for receiving electromagnetic waves (in this embodiment, light) of each charge generator (such as a photodiode) of the pixel portion 10, one of a plurality of color filters forming a color separation filter for performing color imaging is disposed. In the example shown in FIG. 24, basic color filters having a so-called Bayer arrangement are used, and the unit pixels 3 disposed in a square lattice are disposed in association with three red (R), green (G), and blue (B) color filters (primary color filters) to form the pixel portion 10.

For example, the first color pixels for sensing the first color (red; R) are disposed at the intersections in the odd rows and in the even columns, the second color pixels for sensing the second color (green; G) are disposed at the intersections in the odd rows and in the odd columns and in the even rows and in the even columns, and the third color pixels for sensing the third color (blue; B) are disposed at the intersections in the even rows and in the odd columns. With this arrangement, the two-color pixels having R and G and the two-color pixels having G and B are disposed in every other line according to the checkerboard pattern.

In the solid-state imaging device 1, if the pixel portion 10 (device) to be used is decided, the color types and the arrangement of color filters in the color separation filter is determined, and the color type of the color filter at a desired position in the two-dimensional lattice can be uniquely specified.

Accordingly, in the eighth embodiment, upon receiving an instruction to read pixel signals in the pixel portion 10 from the communication/timing controller 20, instead of sequentially scanning the horizontal rows in the vertical direction, the vertical scanning circuit 14 selects rows Hy by address decoding processing based on the arrangement of the color filters of the color separation filter by using a vertical decoder 14a, thereby selecting a combination of rows having the same color arrangement in accordance with the arrangement of the color filters.

That is, the positions of the plurality of unit pixels 3 to be processed are specified so that the plurality of pixel signals to be subjected to a product-sum operation (in this embodiment, difference computation) have the same color filters. With this arrangement, if the color arrangement is different between the odd rows and the even rows, the difference processing is performed on the odd rows and the even rows independently.

EIGHTH EMBODIMENT

Spatial Difference Processing Operation

Figure 25:
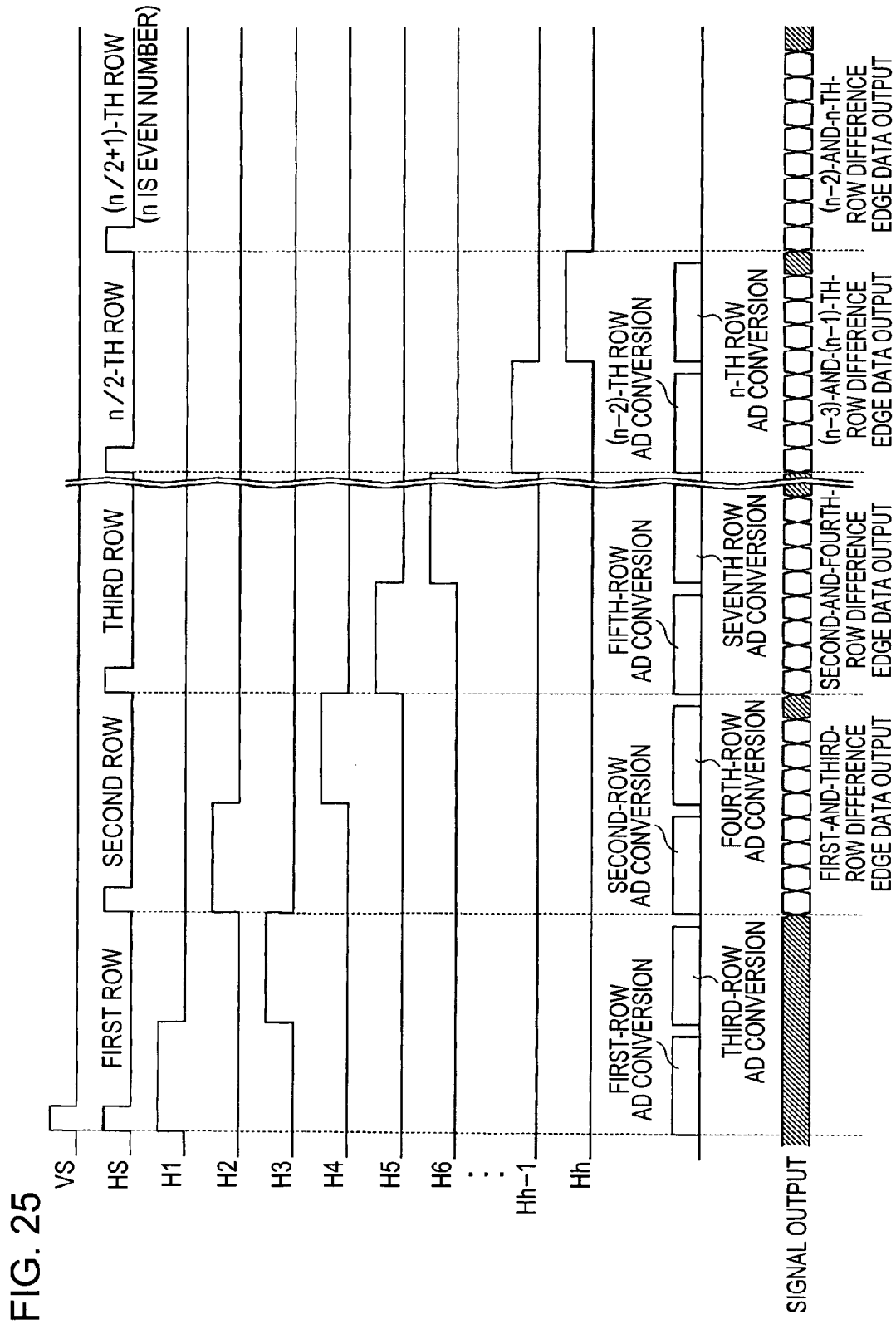
FIG. 25 is a timing chart illustrating the spatial difference processing operation in the column AD circuit of the solid-state imaging device of the eighth embodiment.

FIG. 25 is a timing chart illustrating the spatial difference processing operation in the column AD circuit 25 of the solid-state imaging device of the eighth embodiment shown in FIG. 24. The timing chart shown in FIG. 25 corresponds to that shown in FIG. 7.

In the pixel portion 10 having the Bayer-arrangement color filters, G and R color filters or B and G color filters shown in FIG. 24 are disposed in the same row. Accordingly, if the rows Hx are sequentially selected, as in the first or second embodiment, computation is performed on the pixels having different color filter components, thereby causing the color mixture.

In contrast, in the configuration of the eighth embodiment, the vertical scanning circuit 14 sequentially selects rows Hy having the same combination of color filter components, as shown in FIG. 24, such as the odd rows H1, H3, H5, ..., and the even rows H2, H4, H6, ..., thereby implementing the product-sum operation (in this embodiment, the difference processing) for the same colors without causing the color mixture.

For example, in the pixel arrangement shown in FIG. 24, if difference processing is performed in units of two rows, difference processing for the odd rows between the pixels in the odd row H1 and the pixels in the odd row H3, such as the pixel G11 in the row H1 and the pixel G31 in the row H3, the pixel R12 in the row H1 and the pixel R32 in the row H3, ..., can be implemented. Similarly, difference processing for the even rows between the pixels in the row H2 and the pixels in the H4, such as the pixel B21 in the row H2 and the pixel B41 in the row H4, the pixel G22 in the row H2 and the pixel G42 in the row H4, ..., can be implemented.

Although, in FIG. 24, the three R, G, and B color filters are disposed on the lattice-like unit pixels 3 according to the Bayer arrangement, the color types or the order of the arrangement of filters are not restricted to the example shown FIG. 24. For example, a modified example of the Bayer arrangement filter may be used, or a complementary color filter or another color filter may be used.

For example, instead of the second color pixels for sensing the second color (green; G) disposed at the intersections in the odd rows and the odd columns, the fourth color pixels for sensing the fourth color (emerald; E) may be disposed. Also in this case, the selection of rows in the difference processing can be performed at the timing shown in FIG. 25.

Although a detailed explanation of color signal processing is not given, an image processor for executing matrix computation for generating three RGB colors that can be perceived by the human eye from the four color video signals corresponding to the four color filters is disposed subsequent to the output circuit 28. If an emerald (E) filter is disposed in addition to the three R, G, and B filters, the difference of the color reproduction can be reduced compared to when the three color filters are used, and, for example, the reproduction of the blue green color or the red color can be improved.

In the example shown in FIG. 25, the difference processing for two rows having the same color arrangement is discussed. However, the product-sum operation (subtraction and/or addition) for three or more rows having the same color arrangement may be performed. In this case, by performing the product-sum operation between rows having the same color arrangement, the computation between the pixels having the same color filter components can be executed without causing the color mixture.

NINTH EMBODIMENT

Configuration of Solid-State Imaging Device

Temporal Difference Processing

Figure 26:
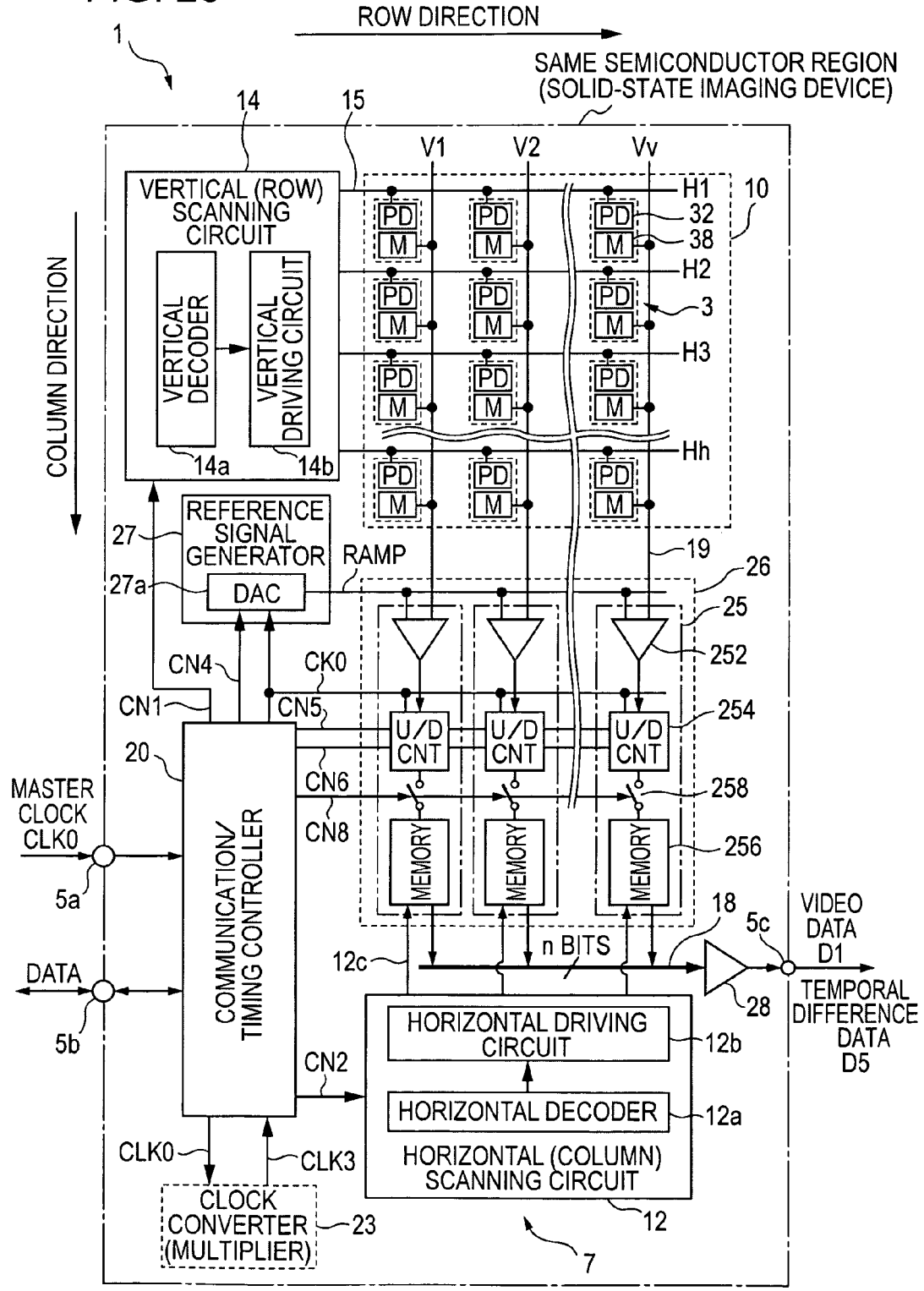
FIG. 26 is a schematic diagram illustrating a CMOS solid-state imaging device according to a ninth embodiment of the present invention.
Figure 27A:
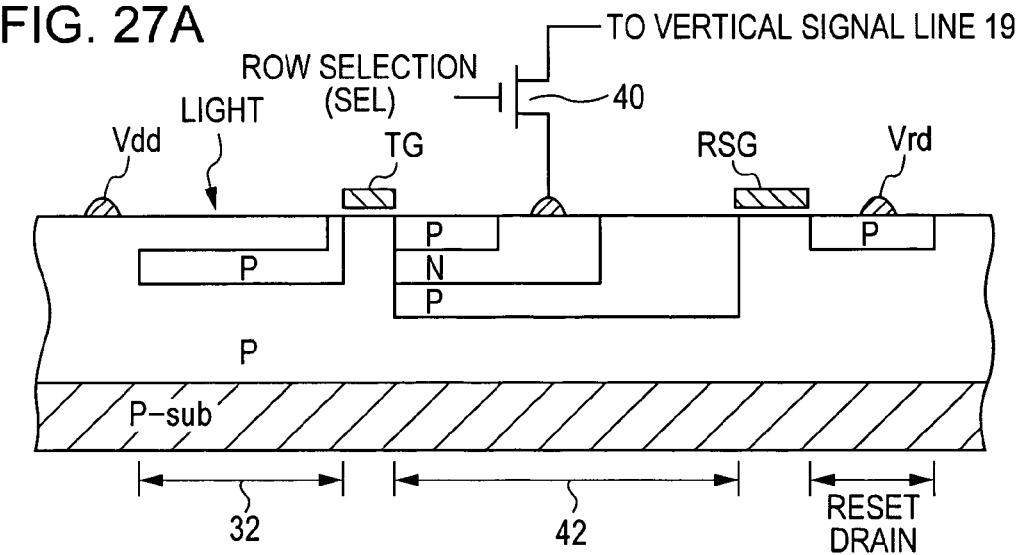
FIGS. 27A through 27C are schematic diagrams illustrating the structure of a unit pixel used in the ninth embodiment.
Figure 27B:
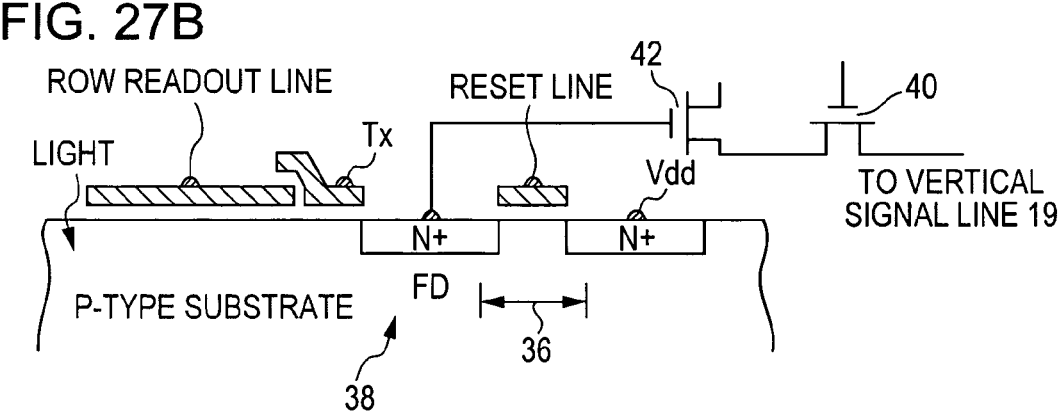
Figure 27C:
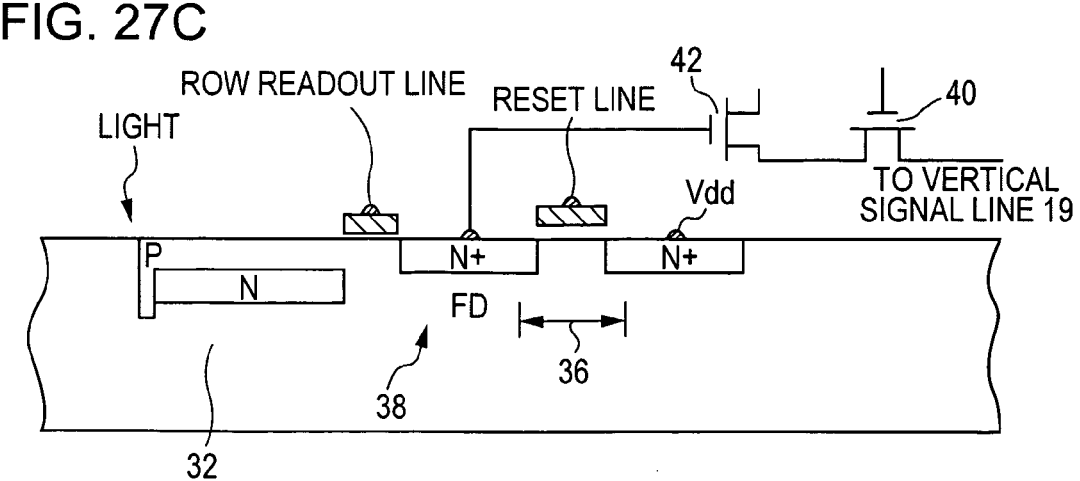

FIG. 26 is a schematic diagram illustrating a CMOS solid-state imaging device according to a ninth embodiment of the present invention. FIGS. 27A through 27C are schematic diagram illustrating the structure of the unit pixels 3 used in the ninth embodiment. The solid-state imaging device 1 of the ninth embodiment is characterized in that the temporal processing is performed instead of the spatial processing to detect a moving part as the product-sum operation processing function. When the temporal processing is performed, pixels located at the same position are subjected to the processing.

The unit pixel 3 in the pixel portion 10 of the ninth embodiment includes a charge generator (PD; photo-detector/photo-electric conversion device) 32, such as a photodiode, for generating and accumulating electric charge corresponding to incident light, an amplifying transistor (M) 42 for outputting an analog signal corresponding to the incident light to the node between the source and the drain of the amplifying transistor 42 in accordance with the electric charge supplied to the control region (gate), a p-channel readout selection transistor 34 for directly and selectively transferring the electric charge generated and accumulated in the charge generator 32 to the control region of the amplifying transistor 42, a p-channel reset transistor 36 for resetting the electric charge in the control region of the amplifying transistor 42, and an n-channel vertical selection transistor 40 disposed between the amplifying transistor 42 and the vertical signal line 19 so as to separate/connect the source of the amplifying transistor 42 and the vertical signal line 19.

As shown in FIG. 27A, the mechanism of the unit pixel 3 is as follows. The electric signal (signal charge) corresponding to the incident light detected by the charge generator 32 is supplied to the gate (control region) of the amplifying transistor 42, and is current-amplified by the source-follower operation. Then, the electric signal is read out to the corresponding vertical signal line 19 so that a signal voltage appears in the vertical signal line 19.

As the amplifying transistor 42, n-channel junction field effect transistor (JFET) is used. The P-type region of the JFET also serves as an inter-pixel memory (charge storage portion) for storing holes, which are the signal charge detected in the charge generator 32. Accordingly, by using the signals accumulated in both the charge generator 32 and the amplifying transistor 42, the signal of the previous frame and the signal of the current frame can be sequentially output from the unit pixel 3 at short intervals and can be compared.

The sources of the amplifying transistors 42 are connected in common to the corresponding vertical signal line 19 via the pixel-separating vertical selection transistor 40. A power supply voltage Vdd (positive voltage) is applied to the drain of each amplifying transistor 42 and the cathode of the charge generator 32.

The source-drain of the transfer readout selection transistor 34 is connected to the anode of the charge generator 32 and the gate (control region) of the amplifying transistor 42. Also, the transfer gates (TG) of the transfer readout selection transistors 34 are connected in common to the corresponding row control line 15 (more specifically, the transfer gate wiring) for the unit pixels 3 disposed in a matrix, and when the drive pulse φTG output from the vertical scanning circuit 14 connected to the row control line 15 is applied, the transfer readout selection transistors 34 are sequentially operated in accordance with the level of the drive pulse φTG.

The power supply voltage Vrd is connected to the drains (reset drains) of the reset transistors 36 of the unit pixels 3, and the voltage is applied to the drains of the reset transistors 36. The gates (RSG) of the reset transistors 36 are connected in common to the corresponding row control line 15 (more specifically, the reset wiring) connected to the vertical scanning circuit 14, and the sources of the reset transistors 36 and the sources of the transfer readout selection transistors 34 are used in common with each other.

When the drive pulse φRG is applied to the gates of the reset transistors 36 from the vertical scanning circuit 14, the reset transistors 36 are operated in accordance with the level of the drive pulse φRG. The gates of the pixel-separating vertical selection transistors 40 are connected in common to the corresponding row control line 15 (more specifically, row selection lines/vertical selection lines) for the unit pixels 3 disposed in a matrix, and the pixel-separating vertical selection transistors 40 are sequentially operated in accordance with the level of the drive pulse φSEL from the vertical scanning circuit 14.

Although it is not shown, a load transistor portion including load MOS transistors (not shown) having drain terminals connected to the corresponding vertical signal line 19 is disposed on the signal path of the vertical signal line 19 between the column processor 26 and the horizontal scanning circuit 12, and a load controller (load MOS controller) for controlling the driving of the load MOS transistors is provided.

The amplifying transistors 42 forming the unit pixels 3 are connected to the corresponding vertical signal line 19, and the vertical signal line 19 is connected to the drains of the load MOS transistors. Also, the load control signal CTld from the load controller is input into the gate terminals of the load MOS transistors, and when a signal is read out, a predetermined constant current continues to flow by the load MOS transistors connected to the amplifying transistors 42.

In this embodiment, a JFET, which serves as, not only an amplifier, but also an inter-pixel memory, is used as the unit pixel 3, and by using the memory function of the JFET, pixel signals of a plurality of frames at the same pixel position are obtained. However, the pixel structure for obtaining the pixel signals of a plurality of frames at the same pixel position is not restricted to the use of JFETs.

As the pixel structure using the inter-pixel memory, not only JFET, but also, a MOS diode, which is referred to as a "photo-gate", may be used, as shown in FIG. 27B, as the photodiode of the charge generator 32. In this pixel structure, signal charge photoelectrically converted by the photo-gate is transferred to a floating diffusion (FD) 38, which serves as an inter-pixel memory, formed across a readout gate Tx, and a change in the voltage of the floating diffusion 38 is amplified by the amplifying transistor 42 and is then output. In this case, the floating diffusion 38 has been reset to output a reset signal, and then, the signal charge is read out via the readout gate Tx from the photo-gate in which the signal charge has been accumulated, and the pixel signal is output. The KTc noise of the floating diffusion 38 can be advantageously removed by the CDS operation of the pixel signal and the reset signal.

As another pixel structure using the floating diffusion 38, which serves as an inter-pixel memory, an embedding photodiode may be used, as shown in FIG. 27C. It can be considered that the readout operation in this pixel structure can be operated by substituting the readout gate Tx using the photo-gate by the readout selection transistor 34. In the embedding photodiode, a low dark current can be implemented since the depletion layer generated at the p-n junction does not reach the surface of the pixel, and the absorption of light by an electrode material, such as a photo-gate, can be prevented. As in the structure using the photo-gate, KTc noise occurring during resetting is not generated.

The readout timing when a photo-gate or an embedding photodiode is used instead of a JFET and is combined with the floating diffusion 38, which serves as an inter-pixel memory, is not shown. Generally, however, as in the readout timing for the JFET shown in FIG. 28, which is described below, after reading out the signal components of the previous frame accumulated in the floating diffusion 38, the floating diffusion 38 is reset, and then, the signal charge generated in the charge generator 32 by the exposure in the current frame is transferred to the floating diffusion 38, thereby reading out the signal components of the current frame.

Figure 28:
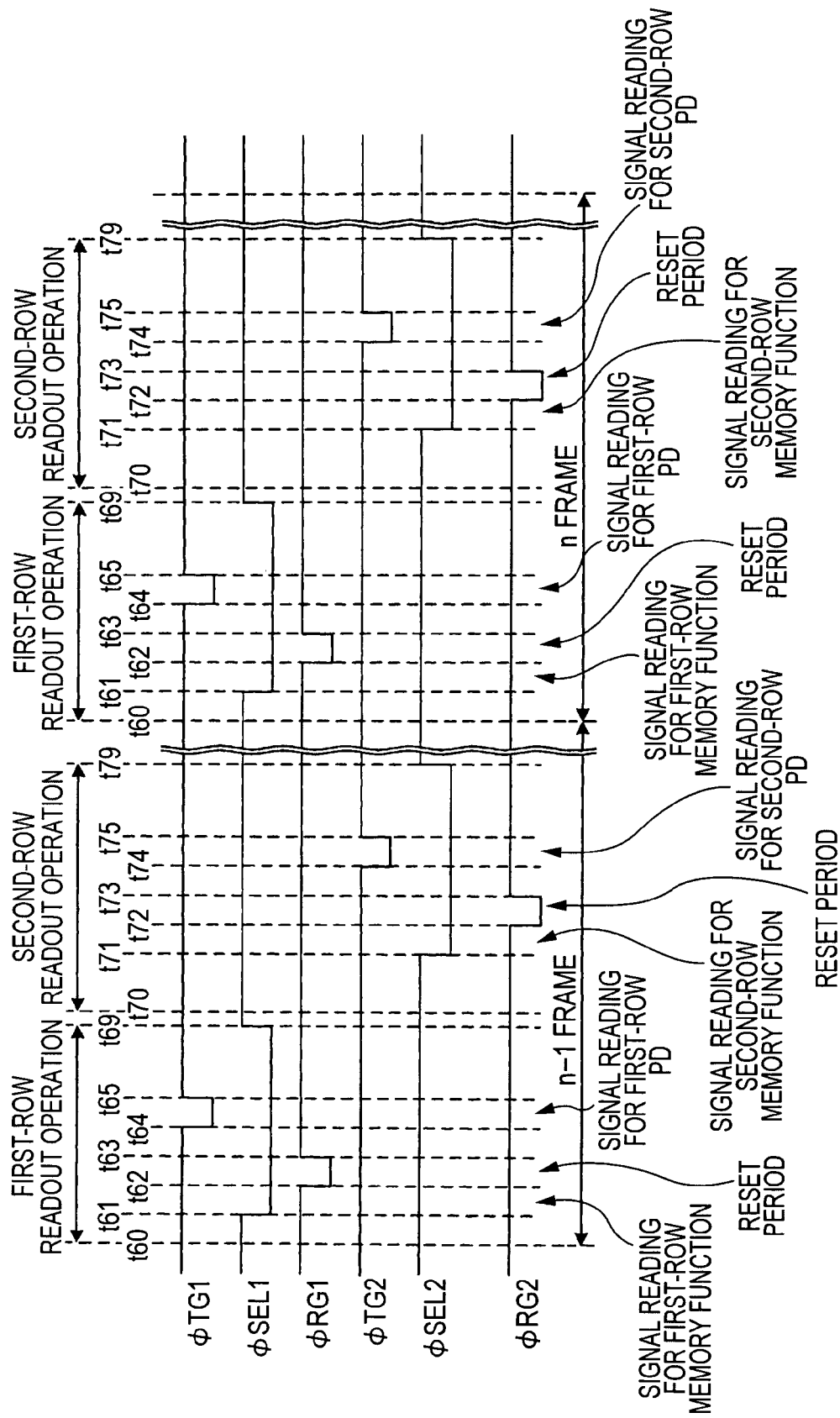
FIG. 28 is a timing chart illustrating the operation for driving unit pixels used in the ninth embodiment.

FIG. 28 is a timing chart illustrating the operation for driving the unit pixels 3 of the ninth embodiment. FIG. 28 illustrates the readout operation performed by one unit pixel 3 for detecting incident light at regular intervals in two continuous frames, i.e., the n−1 frame (previous frame), and the n frame (current frame).

Among the unit pixels 3 disposed in a matrix, the unit pixels 3 in the same row perform the same readout operation. In FIG. 28, the period t60 to t69 in the n−1 frame or the n frame indicates the readout operation of the unit pixels 3 of the first row, and the period t70 to t79 indicates the readout operation of the unit pixels 3 of the second row. A description is now given of, mainly, the readout operation of the unit pixels 3 of the first row in the n frame (current frame), from the period t60 of the n frame in the timing chart shown in FIG. 28. The readout operation of the n−1 frame is the same as that of the n frame.

Before the period elapses from t60 to t61 in the n frame (equivalent to the period after t75 of the n−1 frame), the drive pulse φTG in each row is maintained at the high level, the drive pulse φSEL in each row is maintained at the high level, and the drive pulse φRG in each row is maintained at the high level.

In this manner, before t61, since the drive pulse φTG in each row is at the high level, the transfer readout selection transistor 34 is OFF, and since the drive pulse φRG in each row is at the high level, the reset transistor 36 is OFF.

Accordingly, the gate (control region) of the amplifying transistor 42 is set in the floating state. However, due to the parasitic capacitance effect, the electric charge (first signal charge) corresponding to the incident light generated in the charge generator 32 and transferred to the gate (control region) of the amplifying transistor 42 via the readout selection transistor 34 when the transfer readout selection transistor 34 is ON in the previous n−1 frame is still retained in the gate (control region) of the amplifying transistor 42 even after the readout selection transistor 34 is OFF. The amplifying transistor 42 continues outputting the electric signal corresponding to the gate voltage by the source-follower operation until the electric charge accumulated in the gate (control region) is reset.

After the transfer readout selection transistor 34 is OFF, the electric charge (second signal charge) corresponding to the incident light is generated and accumulated in the charge generator 32. In this case, the first signal charge is electric charge corresponding to the incident light in the n−1 frame (previous frame) generated and accumulated in the charge generator 32, and the second signal charge is electric charge corresponding to the incident light in the n frame (current frame) generated and accumulated in the charge generator 32.

Before t61, since the drive pulses φSEL are at the high level, the pixel-separating vertical selection transistor 40 is OFF, and each unit pixel 3 is separated from the vertical signal line 19.

When the period reaches t61 after t60, the drive pulse φSEL1 of the first row is inverted to the low level, and the pixel-separating vertical selection transistor 40 of each unit pixel 3 of the first row is turned ON, and the source of the amplifying transistor 42 is connected to the vertical signal line 19 and is turned ON to select the vertical signal line 19. In this case, the first signal charge corresponding to the incident light has already been transferred to the gate (control region) of the amplifying transistor 42 of each unit pixel 3 of the first row in the previous frame (period t63 in the n−1 frame), and the first signal charge is retained even after the readout selection transistor 34 is turned OFF. Accordingly, the electric signal corresponding to the retained first signal charge is output to the vertical signal line 19.

At t61, the reset transistor 36 is OFF. Accordingly, when each amplifying transistor 42 of the first row selected at t61 performs the source-follower operation, the potential of the source of the amplifying transistor 42 is increased until the current (drain current) flowing between the source and the drain reaches the current value IB flowing in a constant current source by the load MOS transistor (not shown).

In this case, the first signal charge has also been transferred to the gate (control region) of each amplifying transistor 42 of the first row in the previous frame (period t63 in the n−1 frame), and the gate voltage is still retained after completing the transfer operation (after the transfer readout selection transistor 34 is OFF). Accordingly, the first output signal Vssn−1 corresponding to the first signal charge is output by the source-follower operation. The first output signal Vssn−1 is expressed by Equation 7. The output signal Vssn−1 in the n−1 frame detected as described above is output to the column AD circuit 25 of the corresponding vertical column.

Equation 7:

$$V\text{ssn}-1 = VRD + VS1 - VT = V\text{sig1} \qquad (7)$$

In Equation 7, VRD indicates the power supply voltage supplied when the reset transistor 36 is ON in the n−1 frame, VS1 represents an increase in the gate potential of the amplifying transistor 42 in accordance with the first signal charge in the n−1 frame, and VT designates the voltage between the gate and the source of the amplifying transistor 42 when the drain current of the amplifying transistor 42 reaches the load current IB defined by the load MOS transistor (not shown).

The value of VS1 is determined by the first signal charge corresponding to the incident light/gate capacitance. In actuality, by the reset operation for resetting the drive pulse φRG to the low level, the pixel signal contains, not only the true signal components, but also reset components and other variation components as discussed in the first or second embodiment. VRD-VT contains the reset components and other variation components, and correspond to variation components, for example, the reset component (hereinafter collectively referred to as ΔV1), of the first embodiment.

For each amplifying transistor 42 of the second row, since the drive pulse φSEL2 still remains at the low level, each pixel-separating vertical selection transistor 40 of the second row is OFF, and the source of each amplifying transistor 42 of the second row is not connected to the vertical signal line 19 (non-selecting state). Thereafter, when the period reaches t62, the drive pulse φRG1 is inverted to the low level.

By inverting the drive pulse φRG1 to the low level at t62, the reset transistor 36 of the first row is turned ON so that the power supply voltage VRD (readout level) is transferred to the gate (control region) of each amplifying transistor 42 of the first row. By turning ON the reset transistor 36, the first signal charge is discharged from the gate (control region) of the amplifying transistor 42, and at the same time, the gate of the amplifying transistor 42 (control region) is biased to the power supply voltage VRD (readout level).

When the period reaches t63, the drive pulse φRG1 is inverted to the high level. Accordingly, the reset transistor 36 of the first row is again turned OFF, and the gate (control region) of the amplifying transistor 42 of the first row is set in the floating state. However, due to the parasitic capacitance effect, the gate of the amplifying transistor 42 remains biased to the power supply voltage VRD (readout level).

When the period reaches t64, the drive pulse φTG1 is inverted to the low level, and the transfer readout selection transistor 34 of each unit pixel 3 in the first row is turned ON so that the electric charge (second signal charge) corresponding to the incident light generated and accumulated in the photodiode of each unit pixel 3 in the first row is transferred to the gate (control region) of the amplifying transistor 42 of each unit pixel 3 in the first row. The second signal charge serves as electric signal charge according to the incident light in the n frame.

As discussed above, when the electric charge (second signal charge) corresponding to the incident light in the n frame (current frame) is transferred to the gate (control region) of the amplifying transistor 42, the gate potential of the amplifying transistor 42 is increased by the transferred electric charge. Thus, the amplifying transistor 42 of the first row performs the source-follower operation, and the source potential of the amplifying transistor 42 is increased by the gate potential.

In this case, the second output signal (second electric signal) corresponding to the second signal charge is output from each amplifying transistor 42 of the first row performing the source-follower operation to the vertical signal line 19 via the pixel-separating vertical selection transistor 40 which is turned ON.

When the period reaches t65, the drive pulse φTG1 of the first row is inverted to the high level, and each transfer readout selection transistor 34 of the first row is turned OFF. Accordingly, the transfer of the electric charge (second signal charge) corresponding to the incident light generated and accumulated in the charge generator 32 of each unit pixel 3 of the first row to the gate (control region) of the amplifying transistor 42 is finished, and thus, the gate (control region) of the amplifying transistor 42 is set in the floating state. However, due to the parasitic capacitance effect, the gate potential remains at an increased level for the transferred electric charge (second signal charge).

In the n frame, the electric charge transferred to the gate (control region) as the second signal charge for the current frame is retained until the gate is reset in the subsequent n+1 frame (not shown), i.e., until the reset transistor 36 is turned ON. As a result, the electric charge accumulated in the gate is used as the first signal charge (electric charge for the previous frame) in the n+1 frame.

As discussed above, the transfer readout selection transistor 34 is turned ON so that the second signal charge is temporarily transferred to the gate (control region) of the amplifying transistor 42, and then, the second signal charge is retained in the gate (control region) even after the transfer readout selection transistor 34 is turned OFF. Accordingly, by the source-follower operation (after t65) until the gate is reset, the electric signal (second output signal Vssn) corresponding to the electric charge (second signal charge) accumulated in the gate is output from the amplifying transistor 42.

In the period from t64 to t65, when the current flowing between the source and the drain reaches the load current IB defined by the load MOS transistor (not shown) by the source-follower operation, the potential of the source (second output signal Vssn) of the amplifying transistor 42 becomes the value expressed by Equation 8. The n-frame output signal Vssn detected as described above is output to the column AD circuit 25 of the corresponding vertical column.

Equation 8:

$$V\text{ssn} = VRD + VS2 - VT = V\text{sig2} \qquad (8)$$

In Equation 8, VRD indicates the power supply voltage supplied when the reset transistor 36 is ON in the n frame, VS2 represents an increase in the gate potential of the amplifying transistor 42 in accordance with the second signal charge in the n frame, and VT designates the voltage between the gate and the source of the amplifying transistor 42 when the drain current of the amplifying transistor 42 reaches the load current IB defined by the load MOS transistor (not shown).

As in VS1, the value of VS2 is determined by the second signal charge corresponding to the incident light/gate capacitance. In actuality, by the reset operation for resetting the drive pulse φRG to the low level, the pixel signal contains, not only the true signal components, but also reset components and other variation components, as in the first or second embodiment. VRD-VT contains the reset components and other variation components, and correspond to variation components, for example, the reset component (hereinafter collectively referred to as ΔV2), of the first embodiment.

When the period reaches t69, the drive pulse φSEL1 is inverted to the high level, the pixel-separating vertical selection transistor 40 is turned OFF, and the unit pixels 3 of the first rows and the vertical signal line 19 are separated.

In the subsequent period t70 to t79, the operation similar to the readout operation of the unit pixels 3 of the first row in the period t60 to t69 is repeatedly performed on the unit pixels 3 of the second row, thereby performing the temporal difference operation in the n frame.

As discussed above, the output signals Vssn−1 and Vssn in the n−1 frame and the n frame, respectively, obtained between the two continuous frames (n−1 frame and n-frame) and representing the analog luminance output from the corresponding unit pixels 3 in accordance with the incident light are input into the column AD circuit 25.

By directly supplying the electric charge generated and accumulated in a photoelectric conversion device, such as a photodiode, to the control region of a JFET, the electric signal corresponding to the electric charge supplied to the gate can be output as two signals, such as the electric signal for the previous frame and the electric signal for the current frame. In this case, the pixel signals are read via the vertical signal line 19 in the form of voltage signals converted from the electric charge transferred to the gate. Accordingly, a deterioration in the signals caused by the charge distribution can be suppressed compared to when the pixel signals are output as the electric charge (in the current mode).

In the column AD circuit 25, the difference between the first analog output signal Vssn−1 and the second analog output signal Vssn for a plurality of frames obtained between the two continuous frames (n−1 frame and n frame) is detected, i.e., the temporal difference processing is performed, thereby detecting a moving part. By repeating the above-described operation, a moving part between another two or more continuous frames can be detected.

NINTH EMBODIMENT

Temporal Difference Processing Operation

Figure 29:
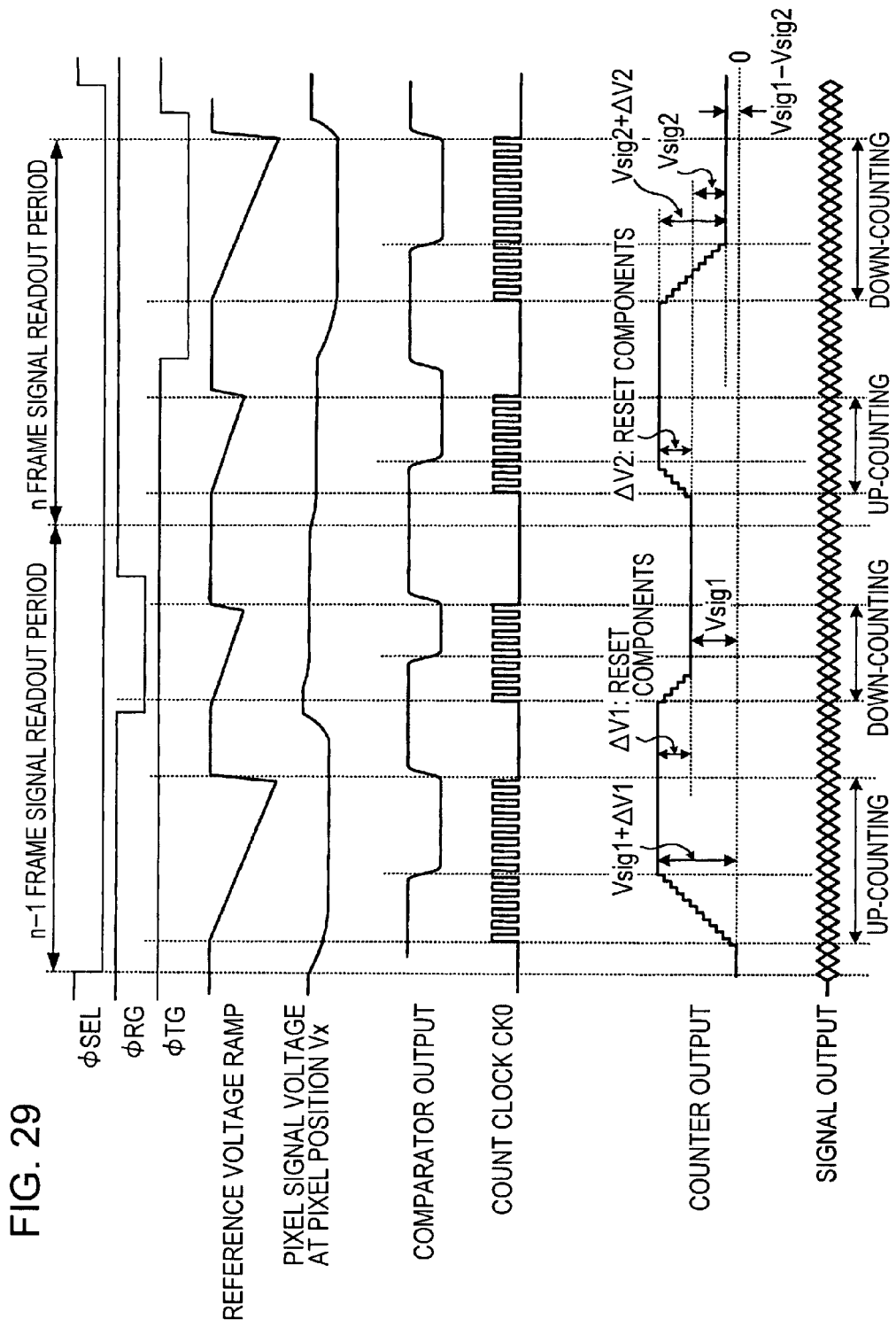
FIG. 29 is a timing chart illustrating the temporal difference processing operation in the column AD circuit of the solid-state imaging device of the ninth embodiment.
Figure 30:
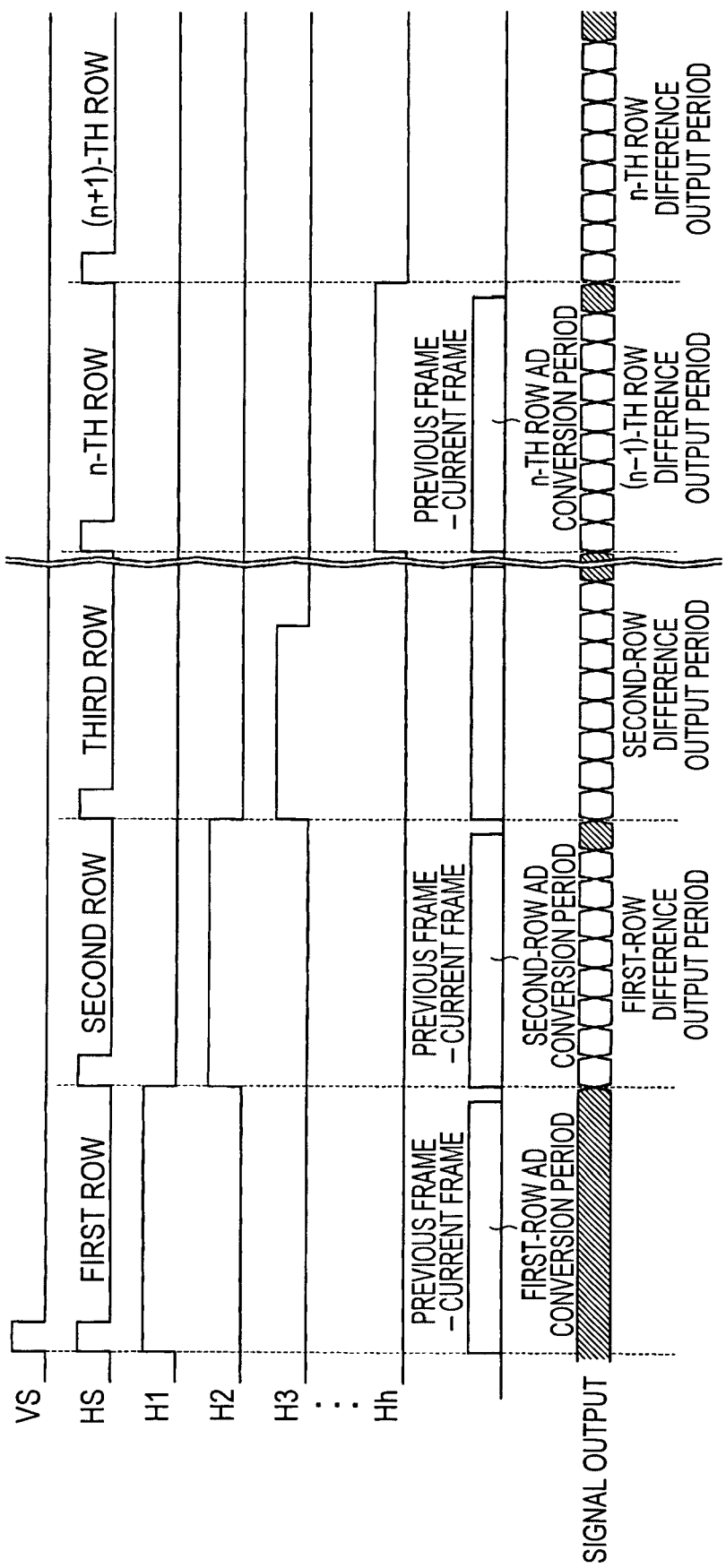
FIG. 30 is a timing chart illustrating the temporal difference processing in the ninth embodiment in relation to the frame rate.

FIG. 29 is a timing chart illustrating the temporal difference processing operation performed by the column AD circuit 25 of the solid-state imaging device 1 of the ninth embodiment shown in FIG. 26. FIG. 30 is a timing chart illustrating the temporal difference processing operation in the ninth embodiment in relation to the frame rate.

The temporal difference processing shown in FIG. 29 is performed by substituting the n−1 row (previous row) and the n row (current row) in the spatial difference processing of the second embodiment shown in FIG. 6 by the n−1 frame (previous frame) and the n frame (current frame), respectively.

The column AD circuit 25 sequentially reads at short intervals the pixel signal Vssn−1 of the previous frame n−1 accumulated in the amplifying transistor 42 and the pixel signal Vssn of the same row of the current frame n as that of the previous frame n−1 accumulated in the charge generator 32, and calculates the difference between the pixel signal Vssn−1 and the pixel signal Vssn.

More specifically, after completing the second counting operation for the pixel signal Vssn−1 of the previous frame, when starting the first up-counting operation for the pixel signal Vssn of the current frame, the counting operation is performed without resetting the count value stored in the counter 254. Accordingly, the temporal difference data D5, which is the count value stored in the counter 254 after completing the second counting operation for the pixel signal Vssn of the current frame, becomes the digital value indicating the temporal computation result (Vssn−1−Vssn) between the two pixel signals Vssn−1 and Vssn of the different frames, as expressed by Equation 9. Since difference computation between the two pixel signals Vssn−1 and Vssn of different frames, i.e., with different imaging times, is performed, the difference processing is not spatial difference processing, but is temporal difference processing.

Equation 9:

$$\begin{aligned} &= Vsig1 - Vsig2 \quad (9)\\ &= (n-1 \text{ frame signal } Vssn-n) - (n \text{ frame signal } Vssn)\\ &= (VRD + VS1 - VT) - (VRD + VS2 - VT)\\ &= VS1 - VS2 \end{aligned}$$

Unless the temporal difference data D5 found in Equation 9 is 0, a motion has occurred between the frames so that a moving part of the subject can be detected.

As is seen from the drive timing of the unit pixel 3 shown in FIG. 29, for the pixel signal of the n−1 frame (previous frame), the reset components and other variation components (ΔV1) based on the drive pulse φRG appear after the true signal components Vsig1, while, for the pixel signal of the n frame (current frame), the true signal components Vsig2 appear after the reset components and other variation components (ΔV2) based on the drive pulse φRG.

Accordingly, when performing the counting operation for the temporal difference processing, the communication/timing controller 20 controls the count modes in the counter 254 by considering the appearance of the above-described components. For example, as shown in FIG. 29, for the n−1 frame, the counting operation is performed by adding the signal components Vsig1 and ΔV1 in the up-counting mode, and then, the counting operation is performed for ΔV1 in the down-counting mode, thereby determining the count value (pixel data) of the signal components Vsig1 of the n−1 frame.

For the subsequent n frame, the counting operation is performed for ΔV2 in the up-counting mode, and then, the counting operation is performed by adding the signal components Vsig2 and ΔV2 in the down-counting mode. As a result, Vsig1−Vsig2, i.e., the difference between the true signal components in the two frames, can be determined as the counting result.

It can be considered that ΔV1 and ΔV2 are substantially the same since they are based on the drive pulse φRG at the same time point. Accordingly, even if the counting operation for ΔV1 and ΔV2 is omitted, Vsig1−Vsig2, i.e., the difference between the true signal components in the two frames, can be determined as the counting result. In this case, the power consumption can be reduced by an amount equal to the counting operation.

When a moving part is detected based on the count value obtained by the above-described temporal difference processing, threshold processing is preferably performed in order to prevent the erroneous determination due to the components, such as random noise. That is, it can be determined that a moving part is detected when the digital value obtained in Equation 9 is greater than or equal to a predetermined value.

However, if the depth of field is too bright or too dark, a motion signal cannot be generated with high precision. The shot noise caused by charge fluctuations is proportional to the square root of the magnitude of a signal. That is, if the luminance level is higher since the depth of field is bright, the level of the shot noise becomes higher. Accordingly, if the threshold for the determination processing is constant, a still subject having a higher luminance level is erroneously determined to be a moving part, or conversely, the motion of a low-contrast subject cannot be sufficiently detected. If the depth of field is dark, a still subject is erroneously determined to be a moving part since it is vulnerable to random noise.

In order to solve this problem, the threshold for the determination processing is adjusted according to the situation. For example, when the contrast of a subject is high or when the depth of field is dark, the threshold for the determination processing is increased. In contrast, when the contrast of a subject is low or when the depth of field is bright, the threshold for the determination processing is decreased. With this arrangement, the motion of a subject can be detected with high precision.

As described above, in this embodiment, since the temporal difference data D5 indicating a moving part is output as n-bit multi-level digital data. Thus, a determination as to whether a subject is a moving part can be made with high precision based on the difference between the electric signal of the previous frame and the electric signal of the current frame in accordance with environment conditions, such as the contrast of the subject or illumination.

Although a detailed explanation is not given, during the normal operation, only video signals can be extracted by performing the operation only during the readout period of the n frame (current frame) shown in FIG. 29. The sign of the pixel signal during the readout period of the n frame (current frame) shown in FIG. 29 is negative. However, by setting the down-counting mode for the reset levels Δ2 and the up-counting mode for the signal levels Vssn (true signal components Vsig2), the positive-sign pixel signal can be obtained.

The temporal difference computation is performed in a manner similar to that in the first or second embodiment. By using the voltage comparator 252 and the counter 254, a voltage signal in accordance with the pixel signal of each frame is compared with the reference signal which changes at a predetermined gradient. Then, the period from when the reference signal is generated to when the voltage signal coincides with the reference signal is counted with the count clock, thereby obtaining the count value corresponding to the difference between the voltage signals in accordance with the pixel signals of the frames. It is thus possible to easily obtain a difference signal representing a moving part while performing AD conversion without the need to provide an additional difference circuit after an AD converter.

Additionally, as in the first and second embodiments, the circuit scale or the circuit area can be decreased, and the power consumption can be reduced. The number of wirings for interfacing with other functions can be reduced, and the noise or the consumed current caused by the wirings is not increased.

In the above-described embodiment, the plurality of column AD circuits 25 are disposed in the vertical columns, and the pixel signals for one row transmitted from the pixel portion 10 are simultaneously processed in the corresponding column AD circuits 25. In this configuration, by conducting AD conversion by combining the comparison processing and the counting operation, the temporal difference processing is performed. The basic mechanism for performing the temporal difference processing by conducting AD conversion with a combination of the comparison processing and the counting operation can be applied to a device for extracting and processing the pixel signals one by one.

The application of this mechanism to a device having the unit pixels 3, each provided with an inter-pixel memory, such as a JFET or a floating diffusion, has been discussed. However, the application of the mechanism is not restricted to a device having an inter-pixel memory. For example, if an inter-pixel memory is not provided, a pixel signal in the previous frame is read and is compared with the reference signal, and simultaneously with this comparison processing, the counting operation is performed. The count value when the comparison processing is finished is obtained and is temporarily stored in a frame memory outside the device, thereby completing the AD conversion for the previous frame.

That is, the pixel signal of one frame (previous frame) subjected to the difference processing has been formed into digital data. In this case, it is not essential that the column AD circuit 25 be used for forming the pixel signal of the previous frame into digital data. Another AD converter may be used for obtaining the pixel data of the previous frame and storing it in a frame memory.

Thereafter, during the AD conversion for the current frame, by using the count value (pixel data) of the previous frame at the same position as that of the current frame as the initial value of the counting operation, the pixel signal is compared with the reference signal, and at the same time, the counting operation is performed, and then, count value when the comparison processing is finished is obtained, thereby performing the temporal difference processing. If the count value (pixel data) of the previous frame stored in the frame is positive-sign data, the counting operation for the current frame is performed in the down-counting mode.

TENTH EMBODIMENT

Application to Electronic Apparatus

Figure 31:
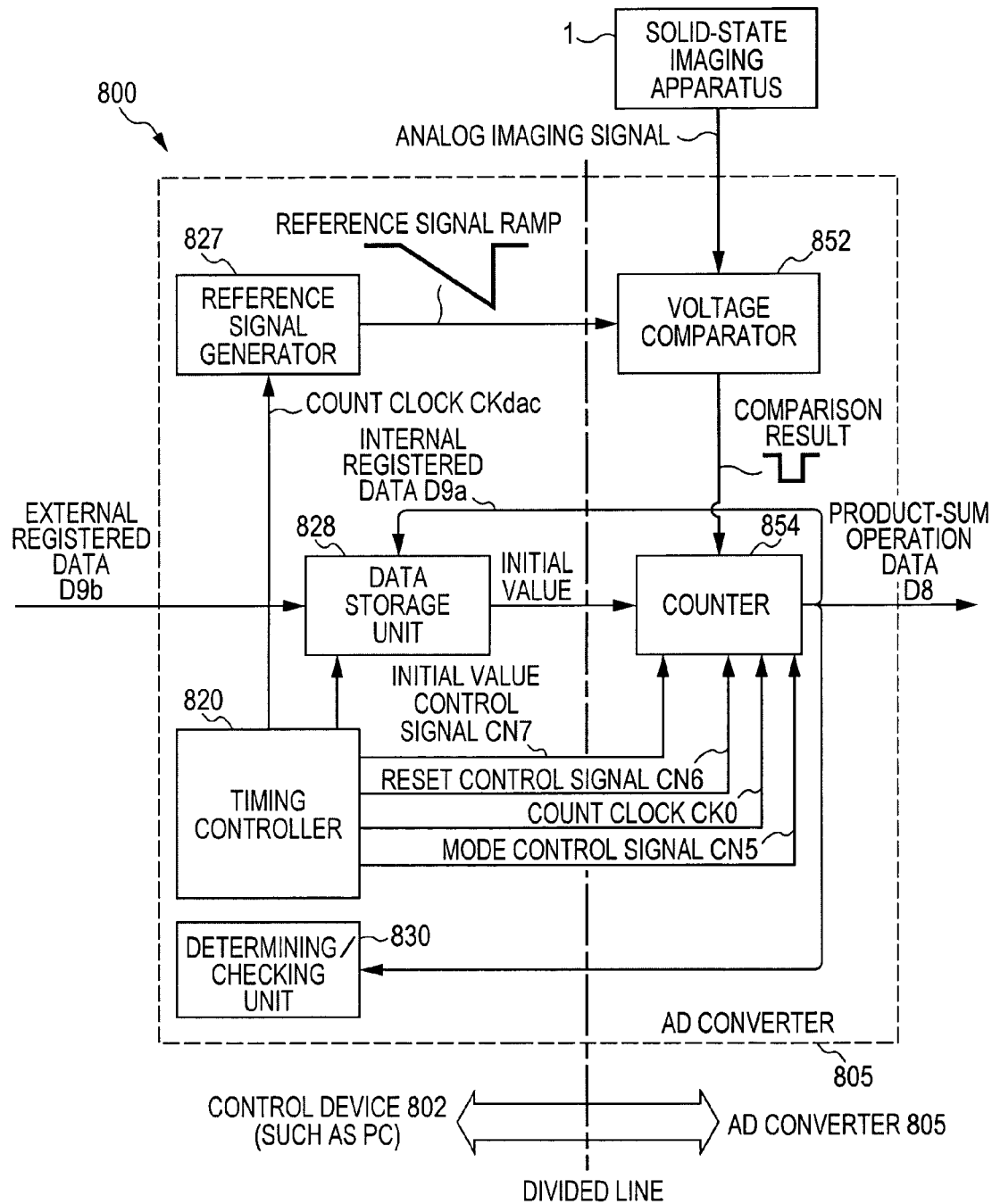
FIG. 31 is a schematic diagram illustrating an electronic apparatus according to a tenth embodiment of the present invention.

FIG. 31 is a schematic diagram illustrating an electronic apparatus according to a tenth embodiment of the present invention. In the first through ninth embodiments, the following type of AD conversion circuit (AD conversion device; column AD circuit in the foregoing embodiments), which serves as a data processing unit, is applied to the solid-state imaging device 1. The AD conversion circuit includes a comparator for comparing an electric signal corresponding to a signal to be processed with an AD conversion reference signal and a counter for performing a counting operation in one of the down-counting mode and the up-counting mode while the comparison processing is being performed by the comparator and for retaining the count value when the comparison processing is finished. However, the mechanisms of the AD conversion circuit or the data processing unit discussed through the first through ninth embodiments may be applied, not only to a solid-state imaging device, but also to any electronic apparatus requiring a data processing mechanism for obtaining digital data representing a product-sum operation result between a plurality of signals having the same physical property.

In the tenth embodiment, the case in which the data processing method or the data processing apparatus of the present invention is applied to an electronic apparatus other than a solid-state imaging device is discussed. As in the first though ninth embodiments, in this embodiment, signals to be processed are pixel signals output from the pixel portion 10 of the solid-state imaging device 1. However, signals other than pixel signals may be subjected to processing as long as they have the same physical property so that they can be subjected to a product-sum operation.

An electronic apparatus 800 shown in FIG. 31 has various processing functions based on product-sum operation results, such as a function of checking for defective pixels of the solid-state imaging device 1 or of detecting moving parts. More specifically, the electronic apparatus 800 includes a control device 802 using, for example, a personal computer, for controlling the overall operation of the electronic apparatus 800, disposed at the left side of the separating line at the central portion of FIG. 31, and an AD converter 805 disposed at the right side of the separating line. Instead of dividing the control device 802 and the AD converter 805 by the separating line, the electronic apparatus 800 may be formed as the single AD converter 805 incorporating the control device 802 and serving as a data processing unit for obtaining digital data representing a product-sum operation result between a plurality of signals.

The AD converter 805, which serves as a data processing unit, includes a voltage comparator 852 and a counter 854 for converting an analog pixel signal read from the solid-state imaging device 1 into digital data. The voltage comparator 852 and the counter 854 correspond to the voltage comparator 252 and the counter 254, respectively, and the basic operation thereof are similar to those of the voltage comparator 252 and the counter 254 of the first through ninth embodiments.

The control device 802 includes, as a function element for controlling the AD converter 805, a reference signal generator 827 for supplying an AD conversion reference voltage to the voltage comparator 852 of the AD converter 805 and the output circuit 28 for controlling the reference signal generator 827 and the counter 854. A timing controller 820 and the reference signal generator 827 correspond to the communication/timing controller 20 and the reference signal generator 27, respectively, and the basic operation thereof are similar to those of the communication/timing controller 20 and the reference signal generator 27 of the first through ninth embodiments.

In the configuration unique to this embodiment, the control device 802 includes a data storage unit 828 for storing data of one of product-sum operation subjects and a determining/checking unit 830 for checking the solid-state imaging device 1 based on data D8 indicating a product-sum operation result obtained in the counter 854 and for performing other determination processing.

With this configuration, to implement the function of checking for defective pixels of the solid-state imaging device 1, pixel data (hereinafter referred to as the "correct data") of the normal solid-state imaging device 1 without defective pixels to be subjected to comparison is first obtained, and then, a pixel signal is read from the solid-state imaging device 1 to be checked, thereby performing difference processing between the correct data and the pixel signal. Based on the processing result, the presence or the absence of defects is determined. It is preferable to check whether defective pixels are dark defective pixels or bright defective pixels. For checking for dark defective pixels, the correct data is obtained and pixels are checked under the condition that the solid-state imaging device 1 is in a non-exposure state. For checking for bright defective pixels, the correct data is obtained and pixels are checked under the condition that the solid-state imaging device 1 is in the full-white photographing state.

To obtain the correct data, the AD converter 805 obtains an analog imaging signal from the normal solid-state imaging device 1 to be compared, and in a manner similar to the basic operation of the first embodiment, the voltage comparator 852 compares each pixel signal of the imaging signal with a reference signal RAMP which is changed with a predetermined gradient supplied from the reference signal generator 827, and searches for the point at which the pixel signal coincides with the reference signal RAMP.

To obtain the correct data under the dark condition, the timing controller 820 instructs the reference signal generator 827 to decrease the gradient of the reference signal RAMP than a normal gradient. This means that a low-level pixel signal under the dark condition is converted into digital data with a high gain.

Simultaneously with the start of the generation of the reference signal RAMP by the reference signal generator 827, the counter 854 starts counting based on the count clock CK0 in the count mode designated by the timing controller 820. In this case, the timing controller 820 sets the counts modes of the counter 854 such that the down-counting mode is set for the reset components $\Delta V$ and the up-counting mode is set for the signal components Vsig. This means that positive data is obtained for pixel data corresponding to the signal components Vsig.

The counter 854 counts the count clocks CK0 from the point at which the reference signal RAMP used for comparison processing in the voltage comparator 852 is generated to the point at which the pixel signal coincides with the reference signal RAMP, and registers the counting result in the data storage unit 828 as internal registered data D9a in association with the pixel position. The AD converter 805 repeats such processing for all the pixels of the imaging signal.

The correct data does not have to be obtained by using the AD converter 805. For example, correct data may be obtained from an external device, and registered data D9b input from this external device may be registered in the data storage unit 828 in association with the pixel position. Alternatively, it can be assumed that the correct data is constant (uniform) regardless of the pixel position, in which case, the acquisition of the correct data is not necessary.

To check for dark defective pixels or bright defective pixels, the solid-state imaging device 1 is set in a predetermined exposure state. The timing controller 820 sets the count modes of the counter 854 such that the up-counting mode is set for the reset components $\Delta V$ and the down-counting mode is set for the signal components Vsig. This means that negative data is obtained as pixel data corresponding to the signal components Vsig.

The timing controller 820 instructs the reference signal generator 827 to set the gradient of the reference signal RAMP as that when the correct data is obtained. This means that the pixel signal is converted into digital data with the same gain as that when the correct data is obtained.

The timing controller 820 supplies the initial-value control signal CN7 to the counter 854, and instructs the counter 854 to read the correct pixel data at the same pixel position as that of the pixel to be processed from the data storage unit 828 and to set the read pixel data as the initial value for the counting operation.

The AD converter 805 obtains an analog imaging signal from the solid-state imaging device 1 to be checked, and the voltage comparator 852 compares each pixel signal of the imaging signal with the reference signal RAMP which is changed at a predetermined gradient supplied from the reference signal generator 827, and searches for the point at which the pixel signal coincides with the reference signal RAMP.

Simultaneously with the start of the generation of the reference signal RAMP by the reference signal generator 827, the counter 854 starts counting based on the count clock CK0 in the count mode designated by the timing controller 820. Then, the counter 854 counts the number of count clocks CK0 from the point at which the reference signal RAMP used for comparison processing in the voltage comparator 852 is generated to the point at which the pixel signal coincides with the reference signal RAMP.

The determining/checking checking unit 830 determines the presence or the absence of defective pixels by using the product-sum operation data D8 indicating the difference between the correct data and the actual data and represented by the count value obtained in the counter 854 as the defect determining data.

As the counting result, the value obtained by subtracting the actual pixel data from the normal pixel data is obtained. If there is no defective pixel, the resulting count value contains only error components or noise components, and is sufficiently small. In contrast, if there is any defective pixel, a large difference between the correct pixel data and the actual pixel data can be observed.

Accordingly, in checking for defective pixels, to prevent erroneous determination due to error components or noise components, it is preferable that the determining/checking unit 830 determines that there is a defective pixel when the product-sum operation data D8 obtained in the counter 854 reaches a predetermined value.

In this manner, when the electronic apparatus 800 is used for checking for defective pixels, difference processing of pixel data between a correct device and a subject device to be checked is performed by using the AD converter 805 formed of a combination of the voltage comparator 852 and the counter 854. Accordingly, as discussed in the first through ninth embodiments, digital data indicating the difference between the correct state and the actual state can be directly output from the counter 254 when conducting AD conversion for the pixel signal in the actual state.

By utilizing the data storage unit 828 functioning as a frame memory for storing correct data, defective pixels can be found without using a frame memory for a pixel signal in the actual state or an additional circuit for performing difference processing of pixel data between a correct device and a subject device to be checked. Thus, AD conversion for a pixel signal in the actual state and computation processing (difference processing in this embodiment) for checking for defective pixels can be efficiently performed. If correct data is constant regardless of the pixel position, the data storage unit 828 functioning as a frame memory for storing correct data is not necessary.

In the configuration shown in FIG. 26, to implement a moving-part detecting function, pixel data is obtained by reading a pixel signal of the previous frame to be compared from the solid-state imaging device 1, and then, a pixel signal of the current frame is read from the solid-state imaging device 1. Then, difference processing between the pixel data of the previous frame and the pixel data of the current frame is performed, thereby detecting a moving part based on the processing result.

When obtaining pixel data of the previous frame, the AD converter 805 obtains an analog imaging signal from the solid-state imaging device 1, and, in a manner similar to the basic operation of the first embodiment, the voltage comparator 852 compares each pixel signal of the imaging signal with the reference signal RAMP which changes at a predetermined gradient supplied from the reference signal generator 827, and searches for the point at which the pixel signal coincides with the reference signal RAMP.

Simultaneously with the start of the generation of the reference signal RAMP used for comparison processing in the voltage comparator 852, the counter 854 starts counting based on the count clock CK0 in the counting mode designated by the timing controller 820. In this case, the timing controller 820 sets the count modes in the counter 854 such that the down-counting mode is set for the reset components ΔV and the up-counting mode is set for the signal components Vsig. This means that positive data is obtained for the pixel data corresponding to the signal components Vsig.

The counter 854 counts the number of count clocks CK0 from the point at which the reference signal RAMP used for comparison processing in the voltage comparator 852 to the point at which the pixel signal coincides with the reference signal RAMP, and registers the counting result in the data storage unit 828 as the internal registered data D9a in association with the pixel position. The AD converter 805 repeats such processing for all the pixels of the imaging signal. This makes it possible to obtain and store pixel data of the previous frame even if the unit pixel 3 forming the pixel portion 10 of the solid-state imaging device 1 does not have an inter-pixel memory.

To obtain the data of the current frame, the timing controller 820 sets the count modes in the counter 854 such that the up-counting mode is set for the reset components ΔV and the down-counting mode is set for the signal components Vsig. This means that negative data is obtained for the pixel data corresponding to the signal components Vsig.

The timing controller 820 instructs the reference signal generator 827 to generate the reference signal RAMP having the same gradient as that when the pixel data of the previous frame is obtained. This means that the pixel signal of the current frame is converted into digital data with the same gain as that when the pixel signal of the previous frame is obtained.

The timing controller 820 also supplies the initial-value control signal CN7 to the counter 854, and instructs the counter 854 to read the pixel data of the previous frame of the same pixel position as that of the pixel signal to be processed from the data storage unit 828 and to set the pixel data as the initial value for the counting operation.

The AD converter 805 obtains an analog imaging signal of the current frame from the solid-state imaging device 1, and the voltage comparator 852 compares each pixel signal of the imaging signal with the reference signal RAMP which changes at a predetermined gradient supplied form the reference signal generator 827, and searches for the point at which the pixel signal coincides with the reference signal RAMP.

Simultaneously with the start of the generation of the reference signal RAMP by the reference signal generator 827, the counter 854 starts counting based on the count clock CK0 in the count mode designated by the timing controller 820. Then, the counter 854 counts the number of count clocks CK0 from the point at which the reference signal RAMP used for comparison processing in the voltage comparator 852 is generated to the point at which the pixel signal coincides with the reference signal RAMP. The AD converter 805 repeats such processing for all the pixels of the imaging signal.

The determining/checking unit 830 determines the presence or the absence of moving parts by using, as the moving-part determining data, the product-sum operation data D8 indicating the difference between pixel signals of two frames whose imaging times are different by a predetermined time (one frame) and represented by the count value obtained in the counter 854.

As the counting result, the value obtained by subtracting the pixel data of the current frame from the pixel data of the previous frame at the same position as that of the current frame is obtained. If the subject has no motion, the resulting count value contains only error components or noise components, and is sufficiently small. In contrast, if the subject has a motion, a large difference between the pixel data of the two frames can be observed.

Accordingly, in checking for moving parts by the determining/checking unit 830, to prevent erroneous determination due to error components or noise components, it is preferable that the determining/checking unit 830 determines that there is a moving part when the product-sum operation data D8 obtained in the counter 854 reaches a predetermined value.

As described above, when the electronic apparatus 800 is used for detecting moving parts, difference processing of pixel data between two frames is performed by using the AD converter 805 formed of a combination of the voltage comparator 852 and the counter 854. Accordingly, as in checking for defective pixels, digital data indicating the difference between the current frame and the previous frame can be directly obtained as the output of the counter 854 when conducting AD conversion of the pixel signal of the current frame.

By utilizing the data storage unit 828 functioning as a frame memory for a previous frame, a device without an inter-pixel memory can implement a moving-part detection function without using a frame memory for a current frame or an additional circuit for performing difference processing for pixel data between two frames. Thus, AD conversion for a pixel signal in the current frame and computation processing (difference processing in this embodiment) for detecting a moving part can be efficiently performed.

While the present invention has been described with reference to the disclosed embodiments, it is to be understood that the technical scope of the invention is not limited to the disclosed embodiments. On the contrary, the invention is intended to cover various modifications and equivalent arrangements without departing from the spirit of the invention, and the various modifications and arrangements are encompassed within the technical scope of the invention.

The above-described embodiments do not restrict the claimed invention, and all the combinations of the features disclosed in the embodiments are not necessarily essential as the solving means for the invention. The above-described embodiments include various modes of the invention, and by suitably combining a plurality of features disclosed in the embodiments, various inventions can be extracted. Even if some of the features disclosed in the embodiments are deleted, the resulting features can be extracted as the invention as long as they offer advantages.

For example, in the foregoing embodiments, although AD conversion functions are disposed in the column regions located at positions to read out signals from the pixel portion 10, they may be provided at another portion. For example, analog pixel signals may be output to the horizontal signal line 18, and then, they are converted into digital signals and are delivered to the output circuit 28.

Also in this case, a plurality of pixel signals subjected to the product-sum operation are compared with the AD conversion reference signal, and while the comparison processing is being performed, the counting operation is performed in one of the down-counting mode and the up-counting mode. Then, the count value when the comparison processing is finished is stored. In this case, the digital data obtained for one of the plurality of pixel signals subjected to the product-sum operation is used as the initial value for the counting operation, and thus, when AD conversion is conducted for the other pixel signal, the digital data representing the product-sum operation result can be obtained as the counting result.

As a result, a memory device for storing the counting result of each of the plurality of pixel signals subjected to the product-sum operation can be implemented by a latch function of the counter, and it is not necessary to provide, separately from the counter, a dedicated memory device for retaining the AD converted data. Only one AD conversion function is required for all the vertical columns, and the circuit scale can be reduced compared to that in the foregoing embodiments although fast conversion processing is required.

In the aforementioned embodiments, the counting operation after switching the count modes is started from the final count value before switching the count modes. In this case, a special arrangement is not required for switching the modes if an up/down counter for outputting the count value in synchronization with the count clock CK0 is used.

However, if an asynchronous up/down counter suitable for a fast operation since the operation limit frequency is determined by only the limit frequency of the first flip-flop (counter basic element) is used, the count value is lost when switching the count modes, and thus, the correct counting operation cannot be performed while maintaining the same value before and after switching the count modes. Accordingly, an adjustment processor for allowing the counting operation after switching the count modes to start from the count value before switching the count modes is preferably disposed. Details of the adjustment processor are not given here. If addition processing between a plurality of signals is performed, the count modes are the same for the first and second counting operations, and thus, the above-described arrangement is not necessary.

In the above-described embodiments, it is now assumed that, concerning a pixel in which the signal components Vsig appear after the reset components ΔV (reference components) in the time sequential order, and the second-stage processor processes a signal having a positive sign (a signal having a higher level has a greater positive value), true components of the pixel are determined. In this case, as the first processing operation, the comparison processing and the down-counting operation are performed for the reset components ΔV (reference components), and as the second processing operation, the comparison processing and the up-counting operation are performed for the signal components Vsig. However, regardless of the time-sequential order in which the reference components and the signal components appear, the combination of the signal components and the count mode and the processing order are arbitrary. Depending on the processing order, the digital data obtained as a result of the second operation may be a negative value. In this case, sign inversion or correction computation can be performed.

According to the device architecture of the pixel portion 10, the reset components ΔV (reference components) must be read after the signal components Vsig. If the second-stage processor processes signals having positive sings, it is more efficient to perform the comparison processing and the down-counting operation for the signal components Vsig as the first operation and to perform the comparison processing and the up-counting operation for the reset components ΔV (reference components) as the second operation.

In the foregoing embodiments, assuming that signal components Vsig appear after reset components ΔV (reference components) for the same pixel, difference processing for finding true signal components is performed when performing the product-sum operation between a plurality of pixel signals. If only signal components Vsig can be subjected to the processing without considering the reset components ΔV (reference components), the difference processing for finding the true signal components can be omitted.

In the aforementioned embodiments, the up/down counter is used in common to perform the counting operation by switching the operation modes regardless of the operation mode. The counter is not restricted to an up/down counter that can switch the modes as long as it performs the counting operation by a combination of the down-counting mode and the up-counting mode.

Figure 32A:
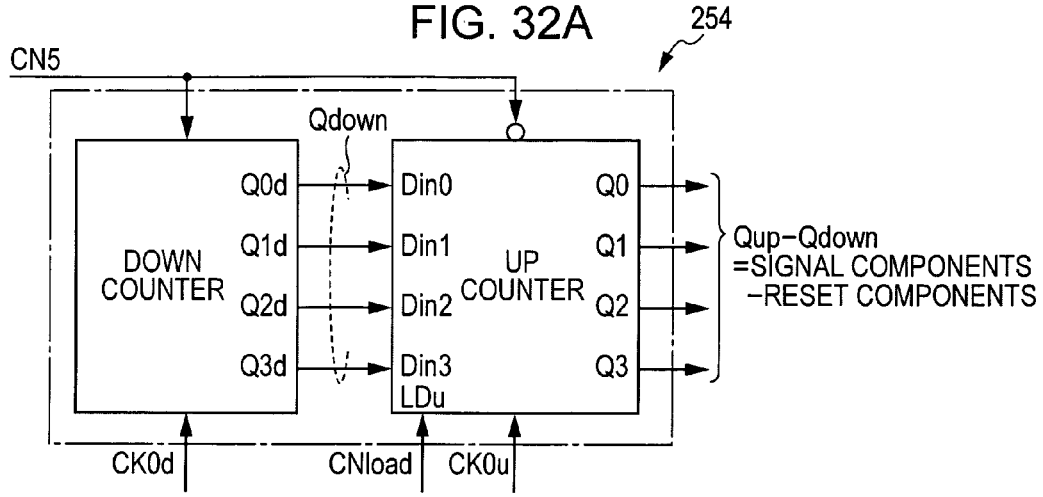
FIGS. 32A, 32B, and 32C are circuit block diagrams illustrating modified examples of a counter.

For example, the counter may be formed by a combination of a down counter circuit for performing down-counting and an up counter circuit for performing up-counting. In this case, counter circuits that can receive a desired initial value by using known art are preferably used. For example, if up-counting is performed after down-counting, as shown in FIG. 32A, the down counter circuit is operated for the first counting operation, and then, the up counter circuit is operated for the second counting operation. In this case, before starting the up-counting operation after switching the count modes by the count-mode-switching control signal CN5, the load control signal CNld for setting the initial value is supplied to the load terminal LDu of the up counter circuit, thereby setting the down count value obtained in the down counting operation as the initial value in the up counter circuit.

Figure 32B:
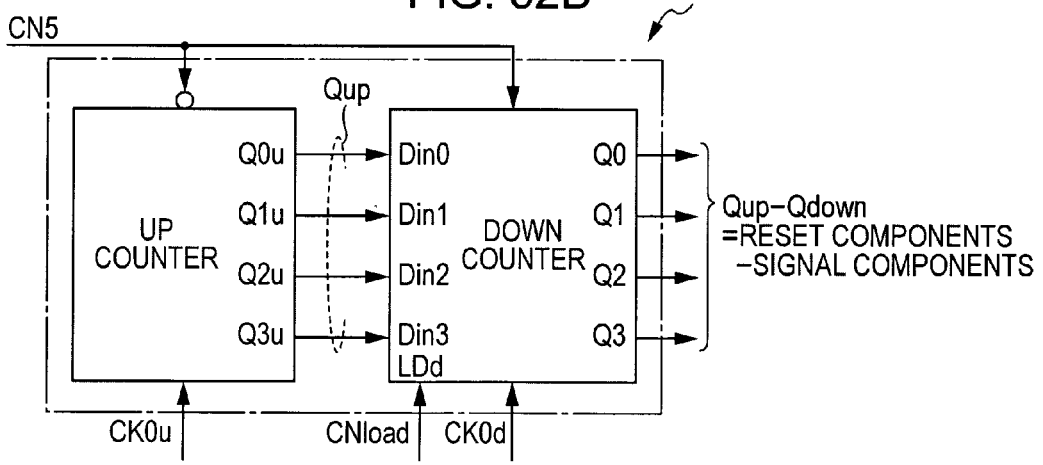

If, for example, down-counting is performed after up-counting, as shown in FIG. 32B, an up counter circuit is operated for the first counting operation, and then, a down counter circuit is operated for the second counting operation. In this case, before starting the down-counting operation after switching the count modes by the count-mode-switching control signal CN5, the load control signal CNld for setting the initial value is supplied to the load terminal LDd of the down counter circuit, thereby setting the up count value obtained in the up-counting operation in the down counter circuit.

In performing addition processing between a plurality of signals, before starting the counting operation in the second-stage count circuit, the initial value is set in a manner similar to the subtraction processing between a plurality of signals while maintaining the same count modes for the first and second counting operations.

With the above-described arrangements, in either of the configuration shown in FIG. 32A or 32B, to obtain the output of the second-stage counter circuit, the subtraction processing between a plurality of signals (including the reference components and the signal components) can be directly performed. This eliminates the need to provide a special addition circuit for calculating the difference between a plurality of signals. Additionally, the transferring of data to a subtractor is not necessary, and thus, an increase in noise, the current, or the power consumption can be suppressed.

If a counter configured by a combination of a down counter circuit and an up counter circuit is used, instead of setting the count value obtained in the first counting operation as the initial value for the second counting operation, the second counting operation may be started from zero.

Figure 32C:
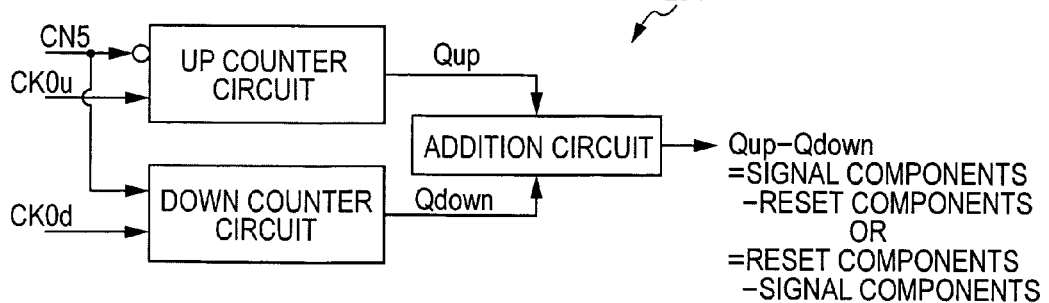

In this case, if, for example, the difference processing is performed, as shown in FIG. 32C, an addition circuit for adding the output Qup (positive value) of the up counter circuit and the output Qdown (negative value) of the down counter circuit is required. In this case, an addition circuit is provided for each AD converter formed of a comparator and a counter. Thus, the wiring length can be small, and an increase in noise, the current, or the power consumption caused by data transfer can be prevented.

In any of the configurations shown in FIGS. 32A, 32B, and 32C, an instruction to operate the down counter circuit and the up counter circuit can be given by the communication/timing controller 20, as in the above-described embodiments. The down counter circuit and the up counter circuit can be both operated by the count clock CK0.

In the foregoing embodiments, NMOS or PMOS unit pixels disposed in a matrix are used in a sensor. However, the sensor is not restricted to this type, and a line sensor may be used, in which case, operations and advantages similar to those of the above-described embodiments can be achieved.

In the above-described embodiments, as a solid-state imaging device that can selectively read signals from desired unit pixels by address control, a CMOS sensor provided with a pixel portion that generates signal charge by receiving light is used. The generation of signal charge is not restricted to light, but may be to electromagnetic waves in general, such as infrared, ultraviolet, or X rays. The above-described features disclosed in the foregoing embodiments can be applied to a semiconductor device having unit elements in which many devices for outputting an analog signal in accordance with the quantity of electromagnetic waves are disposed.

Although in the above-described embodiments the square unit pixels 3 are disposed, the arrangement of the unit pixels 3 are not restricted to a square lattice, and may be an oblique lattice in which the pixel portion 10 shown in FIG. 1 is obliquely tilted at 45 degrees.

Although in the foregoing embodiments the shape of the unit pixels 3 when viewed from the top is a square, it is not restricted to a square, and may be a hexagon (honeycomb). In this case, the arrangement of the unit pixels 3 is as follows such that one unit pixel column and one unit pixel row each includes a plurality of unit pixels.

A plurality of unit pixels forming an even-numbered column are displaced in the column direction from a plurality of unit pixels forming an odd-numbered column by about ½ of the pitch between unit pixels in each unit pixel column. Similarly, a plurality of unit pixels forming an even-numbered row are displaced in the row direction from a plurality of unit pixels forming an odd-numbered row by about ½ of the pitch between unit pixels in each unit pixel row. Each unit pixel column includes unit pixels only in the odd-numbered rows or in the even-numbered rows.

Row control lines 15 are provided for reading the pixel signals based on the signal charge accumulated in the charge generators of the unit pixels 3 to the column processor 26. The row control lines 15 are arranged around the honeycomb unit pixels 3 in a meandering manner. In other words, when viewed from the top, in hexagon spaces formed by disposing the row control lines 15 in a honeycomb shape, the unit pixels 3 are disposed. With this arrangement, on the whole, pixel signals can be read vertically while the unit pixels are displaced by about ½ pitches therebetween.

By arranging the unit pixels 3 and the row control lines 15 in a honeycomb shape, the surface element density can be improved while preventing a decrease in the area of the light-receiving surface of the charge generator of each unit pixel 3.

If the pixel portion 10 is compatible with color imaging, regardless of the shape or arrangement of the unit pixels 3, the pixels 3 should be selected so that the same color components are subjected to the product-sum operation. That is, based on the arrangement of color filters of a color separation filter, the positions of a plurality of unit elements are specified so that a plurality of unit signals subjected to the product-sum operation have the same color filter.

As described above, "a plurality of signals" means a plurality of signals having the same physical property, for example, pixel signals, such as signals located at different positions in the same spatial plane or signals located at the same position in the same spatial plane and obtained at different time points, for example, pixel signals output from a plurality of adjacent pixels. A plurality of signals to be processed do not mean two signal components having different physical properties forming one signal output from the same unit element, such as reset components and signal components forming a pixel signal In the description above, the AD conversion circuits discussed as an example of data processors in the above-described embodiments are provided by being integrated in a solid-state imaging device or electronic apparatus. However, also the AD conversion circuits may be singly provided as ICs (Integrated Circuits), AD conversion modules, or data processing modules having a product-sum operation function (data processing function) of performing an operation between a plurality of pixels.

In this case, the AD conversion circuits (or data processors) including comparators and counters may be provided. Alternatively, they may be integrated into an IC or a module formed of a combination of individual chips in which a reference signal generator for generating an AD conversion reference signal and supplying it to the comparators and a controller for controlling the counting operation modes in the counters are mounted on the same semiconductor substrate.

By providing the AD conversion circuits into an IC or a module, the functions required for controlling the operations of the comparators and the counters can be collectively handled, thereby facilitating the handling or management of the components. Additionally, since the elements required for AD conversion are integrated as an IC or a module, the manufacturing of solid-state imaging devices or other electronic apparatuses as finished products can be facilitated.

What is claimed is:

1. A data processing method for obtaining digital data for a plurality of signals to be processed, comprising:
   comparing, by using digital data for a first signal of the plurality of signals, an electric signal corresponding to a second signal of the plurality of signals with a reference signal, said reference signal being a ramp reference voltage produced, independently of said second signal, by a reference signal generator;
   obtaining digital data for the second signal based on the comparing step;
   performing a counting operation in one of a down-counting mode and an up-counting mode while the comparing step is being performed; and
   storing a first count value;
   wherein,
      each of the plurality of signals has a same physical property and is associated with one of (a) a different pixel position and (b) a same pixel position imaged at a different time.

2. The data processing method according to claim 1, further comprising the step of comparing an electric signal corresponding to the first signal with the reference signal which obtains the digital data for the first signal; and
   storing a second count value.

3. The data processing method according to claim 2, further comprising the step of setting a first count mode for the first signal and a second count mode for the second signal to be opposite.

4. The data processing method according to claim 1, further comprising the step of switching between the down-counting mode and the up-counting mode of the counting operation by switching a processing mode of an up/down counter.

5. The data processing method according to claim 1, further comprising the step of adjusting the number of bits for the counting operation based on the number of signals to be processed.

6. The data processing method according to claim 5, wherein, when the number of signals to be processed is $2^m$, where m is the number of bits by which the counting operation is reduced.

7. The data processing method according to claim 2, further comprising the step of setting a coefficient for the plurality of signals to be processed based on an amount by which the reference signal is changed over time.

8. The data processing method according to claim 1, further comprising the steps of storing a resulting count value based on a previous counting operation in a predetermined data storage unit, and reading the resulting count value from the data storage unit.

9. The data processing method according to claim 1, further comprising the steps of generating and output a plurality of analog unit signals, wherein each analog unit signal corresponds to one of a plurality of unit element disposed in a matrix.

10. The data processing method according to claim 9, wherein the counting operation is performed on the analog unit signals corresponding to the unit elements in a column and in a plurality of rows; and wherein the outputting step comprises outputting the analog unit signals in the column direction.

11. The data processing method according to claim 9, wherein the counting operation is performed on the analog unit signals corresponding to the unit elements in a row and in a plurality of columns; and wherein the outputting step comprises outputting the analog unit signals in the column direction.

12. The data processing method according to claim 9, wherein the counting operation is performed on the analog unit signals corresponding to the unit elements in a column and in a plurality of rows, and signals corresponding to the unit elements in a row and in a plurality of columns; and wherein the outputting step comprises outputting the analog unit signals in the column direction.

13. The data processing method according to claim 9, wherein the counting operation is performed for the plurality of analog unit signals corresponding to unit elements located at the same position and obtained at different times in the unit elements.

14. A data processing apparatus, comprising:
   a comparator which compares an electric signal corresponding to one of a plurality of signals with a reference signal, said reference signal being a ramp reference voltage produced, independently of said plurality of signals, by a reference signal generator, to produce digital data for the one of the plurality of signals; and
   a counter which performs a counting operation in one of a down-counting mode and an up-counting mode while the comparison processing by the comparator is being performed, and which stores a count value when the comparison processing by the comparator is finished;
wherein,
the plurality of signals are processed to produce one digital signal, and
each of the plurality of signals have has a same physical property and is associated with one of (a) a different pixel position and (b) a same pixel position imaged at a different time.

15. The data processing apparatus according to claim 14, wherein the comparator compares an electric signal corresponding to a first signal of the plurality of signals with the reference signal which obtains the digital data for the first signal, and the counter performs the counting operation in one of the down-counting mode and the up-counting mode while the comparison processing by the comparator is being performed, and stores a count value when the comparison processing by the comparator is finished.

16. The data processing apparatus according to claim 14, wherein the counter is formed of a common counter circuit that is capable of switching between the up-counting mode and the down-counting mode.

17. The data processing apparatus according to claim 14, further comprising a reference signal generator which generates the reference signal which converts the signals into the digital data and supplies the reference signal to the comparator.

18. The data processing apparatus according to claim 17, wherein the reference signal generator is configured to adjust an amount by which the reference signal is changed over time.

19. The data processing apparatus according to claim 14, further comprising a controller which controls the mode of the counting operation.

20. The data processing apparatus according to claim 19, wherein the controller set a count mode for a first signal of the plurality of signals and a count mode for a second signal of the plurality of signals to be opposite.

21. The data processing apparatus according to claim 19, wherein the number of bits for the counting operation in the counter is adjusted based on the number of signals to be processed by the product-sum operation operations.

22. The data processing apparatus according to claim 21, wherein, when the number of signals to be processed by the product-sum operation is $2^m$ (^ is an exponent), where m is the number of bits by which the counting operation is reduced.

23. The data processing apparatus according to claim 14, further comprising:
a data storage unit which stores a count value representing a result of the product-sum operation obtained in a previous counting operation; and
a readout scanner which reads out the count value from the data storage unit simultaneously with corresponding current counting operations assigned to the comparator and the counter.

24. A semiconductor device comprising:
a plurality of unit elements, each of which includes a charge generator which generates charge corresponding to applied electromagnetic waves;
a unit signal generator which generates an analog unit signal in accordance with the charge generated by the charge generator;
a comparator which compares an electric signal corresponding to the unit signal with a reference signal said reference signal being a ramp reference voltage produced, independently of said electric signal, by a reference signal generator; and
a counter which performs a counting operation in one of a down-counting mode and an up-counting mode while the comparison processing by the comparator is being performed, and stores a count value when the comparison processing by the comparator is finished;
wherein,
the plurality of unit signals have a same physical property and are processed to produce one digital signal.

25. The semiconductor device according to claim 24, further comprising a reference signal generator which generates the reference signal which converts signals into the digital data and supplies the reference signal to the comparator.

26. The semiconductor device according to claim 24, further comprising a controller which controls the mode of the counting operation in the counter.

27. The semiconductor device according to claim 24, wherein a plurality of sets of the comparator and the counter are arranged in a direction of a row of the unit elements.

28. The semiconductor device according to claim 24, further comprising a unit signal selection processor which inputs each of the plurality of unit signals from the unit signal generator into the comparator by specifying the position of each of the plurality of unit elements to be processed by the comparator and the counter.

29. The semiconductor device according to claim 28, wherein the unit elements are disposed in a matrix, and the unit signal selection controller comprises a column selection controller which inputs the unit signals output from the unit signal generators of the unit elements in the same column into the comparator by switching the unit signals column by column.

30. The semiconductor device according to claim 28, wherein the unit elements are disposed in a matrix, and the comparator and the counter perform, under the control of the unit signal selection controller, corresponding operations assigned to the comparator and the counter by using, as the plurality of unit signals, the unit signals of the same column and of the plurality of rows generated by the unit signal generators and output in the column direction.

31. The semiconductor device according to claim 28, wherein the unit elements are disposed in a matrix, and the comparator and the counter perform, under the control of the unit signal selection controller, the counting operation by using, as the plurality of unit signals, the unit signals of the same row and of the plurality of columns generated by the unit signal generators and output in the column direction.

32. The semiconductor device according to claim 28, wherein the unit elements are disposed in a matrix, and the comparator and the counter perform, under the control of the unit signal selection controller, the counting operation by using, as the plurality of unit signals, the signals of the same column and of a plurality of rows generated by the unit signal generators and output in the column direction and the signals of the same row and of a plurality of columns generated by the unit signal generators and output in the column direction.

33. The semiconductor device according to claim 28, wherein:
the unit elements are disposed in a matrix;
a plurality of sets of the comparator and the counter are arranged in a direction of row of the matrix; and
the unit signal selection controller controls digital data representing a result of a product-sum operation indicated by the count value stored in the counter of a first set of the comparator and the counter to be an initial value for the counting operation by a second set of the comparator and the counter.

34. The semiconductor device according to claim 28, wherein the unit elements are disposed in a matrix, and a first set of the comparator and the counter perform, under the control of the unit signal selection controller, corresponding operations assigned to the comparator and the counter by using, as the plurality of unit signals, the unit signals of the same column and of a plurality of rows generated by the unit signal generators and output in the column direction.

35. The semiconductor device according to claim 28, wherein:
one of a plurality of color filters forming a color separation filter which performs color imaging is disposed on a surface of each charge generator on which the electromagnetic waves are incident; and
the unit signal selection controller specifies a position of each of the plurality of unit pixels based on the positions of the color filers of the color separation filter so that the unit pixels to be subjected to a product-sum operation have the same color filter.

36. The semiconductor device according to claim 24, wherein the comparator and the counter perform corresponding operations assigned to the comparator and the counter for the plurality of signals of the unit elements located at the same position and obtained at different time points.

37. The semiconductor device according to claim 33, wherein:
the unit element has a memory function element which stores charge generated by the charge generator at a relatively prior time; and
the comparator and the counter perform corresponding operations for at least one of the plurality of signals generated by the charge signal generator based on the charge stored in the memory function element.

38. The semiconductor device according to claim 24, wherein the unit elements are disposed in a matrix, the semiconductor device further comprising a computing unit which receives a plurality of digital data representing a result of the product-sum operation in one of the row direction or the column direction and indicated by the count value stored in the counter, and performing a product-sum operation in the other one of the row direction and the column direction based on the plurality of digital data.

39. The semiconductor device according to claim 24, wherein the unit signal generator includes a semiconductor device which generates an analog voltage signal corresponding to the charge generated by the charge generator as the unit signal and which supplies the analog voltage signal to the comparator.

40. The semiconductor device according to claim 24, each of the plurality of signals is associated with one of (a) a different pixel position and (b) a same pixel position imaged at a different time.

41. An electronic apparatus comprising:
a reference signal generator which converts an analog signal, of each of a plurality of unit elements, to be processed into digital data, by generating, independently of said analog signal, a ramp reference signal;
a comparator which compares the analog signal with the ramp reference signal generated by the reference signal generator;
a counter which performs a counting operation in one of a down-counting mode and an up-counting mode while the comparison processing by the comparator is being performed, and which stores a count value when the comparison processing by the comparator is finished; and
a controller which controls the mode of the counting operation by the counter;
wherein,
the plurality of analog signals have a same physical property and are processed to produce one digital signal.

42. The electronic apparatus according to claim 41, each of the plurality of signals is associated with one of (a) a different pixel position and (b) a same pixel position imaged at a different time.

* * * * *